US00RE50161E

(19) United States
(12) Reissued Patent
Si et al.

(10) Patent Number: US RE50,161 E
(45) Date of Reissued Patent: Oct. 1, 2024

(54) METHOD AND APPARATUS FOR NR-DMRS SEQUENCE DESIGN

(71) Applicant: Samsung Electronics Co., Ltd., Suwon-si (KR)

(72) Inventors: Hongbo Si, Plano, TX (US); Le Liu, Fremont, CA (US); Eko Onggosanusi, Coppell, TX (US)

(73) Assignee: Samsung Electronics Co., Ltd., Suwon-si (KR)

(21) Appl. No.: 17/724,375

(22) Filed: Apr. 19, 2022

Related U.S. Patent Documents

Reissue of:
(64) Patent No.: 10,484,153
Issued: Nov. 19, 2019
Appl. No.: 15/913,670
Filed: Mar. 6, 2018

U.S. Applications:
(60) Provisional application No. 62/573,279, filed on Oct. 17, 2017, provisional application No. 62/569,137, (Continued)

(51) Int. Cl.
*H04L 5/00* (2006.01)
*H04L 27/26* (2006.01)
*H04W 56/00* (2009.01)

(52) U.S. Cl.
CPC ..... *H04L 5/0051* (2013.01); *H04L 5/0048* (2013.01); *H04L 5/0053* (2013.01); (Continued)

(58) Field of Classification Search
None
See application file for complete search history.

(56) References Cited

U.S. PATENT DOCUMENTS

2011/0103324 A1 5/2011 Nam et al.
2013/0244653 A1 9/2013 Song et al.
(Continued)

FOREIGN PATENT DOCUMENTS

CN 102598526 A 7/2012
CN 103581092 A 2/2014
(Continued)

OTHER PUBLICATIONS

Indian Patent Office, Hearing Notice issued Dec. 20, 2023 regarding Application No. 201937035972, 3 pages.
(Continued)

*Primary Examiner* — John M Hotaling, II

(57) ABSTRACT

A method of a user equipment (UE) for controlling reference signal in a wireless communication system is provided. The method comprises receiving, from a base station (BS), a demodulation reference signal (DMRS) of a physical broadcasting channel (PBCH) over a downlink channel and determining resources to be used for the DMRS of the PBCH. A pseudo-noise (PN) sequence that is mapped to the resources to be used for the DMRS of the PBCH is generated by a base station (BS). The PN sequence is generated based on an initial condition including a physical cell identification (ID) and timing information comprising at least one of an index of synchronization signal block (SSB) or an index of a half frame within a frame based on a carrier frequency range. The index of SSB comprises at least one of a partial or whole index of SSB.

46 Claims, 12 Drawing Sheets

Related U.S. Application Data filed on Oct. 6, 2017, provisional application No. 62/556,724, filed on Sep. 11, 2017, provisional application No. 62/537,692, filed on Jul. 27, 2017, provisional application No. 62/524,004, filed on Jun. 23, 2017, provisional application No. 62/519,528, filed on Jun. 14, 2017, provisional application No. 62/510,522, filed on May 24, 2017, provisional application No. 62/507,521, filed on May 17, 2017, provisional application No. 62/469,040, filed on Mar. 9, 2017.

(52) U.S. Cl.
CPC ..... *H04L 27/2613* (2013.01); *H04W 56/0005* (2013.01); *H04L 27/26132* (2021.01)

(56) References Cited

U.S. PATENT DOCUMENTS

| | | | | |
|---|---|---|---|---|
| 2015/0208372 | A1* | 7/2015 | You | H04J 11/0069 370/350 |
| 2017/0099174 | A1 | 4/2017 | Kim et al. | |
| 2018/0234931 | A1* | 8/2018 | Ly | H04L 5/0051 |
| 2018/0262308 | A1* | 9/2018 | Si | H04L 5/0053 |
| 2019/0150110 | A1* | 5/2019 | Ko | H04J 11/00 |
| 2019/0200306 | A1 | 6/2019 | Ko et al. | |
| 2020/0337002 | A1* | 10/2020 | Ko | H04L 5/0016 |
| 2021/0092696 | A1* | 3/2021 | Ko | H04W 4/40 |

FOREIGN PATENT DOCUMENTS

| | | | |
|---|---|---|---|
| CN | 109478943 | A | 3/2019 |
| EP | 3402100 | A1 | 11/2018 |
| KR | 10-2016-0135171 | A | 11/2016 |
| WO | 2014/098395 | A1 | 6/2014 |
| WO | 2018129123 | A1 | 7/2018 |

OTHER PUBLICATIONS

Korean Intellectual Property Office, Decision to Grant issued May 1, 2023 regarding Application No. 10-2019-7026479, 9 pages.
LG Electronics, "Discussions on uplink narrowband DMRS for NB-IoT", 3GPP TSG RAN WG1 NB-IoT Ad-Hoc Meeting, R1-161971, Mar. 2016, 14 pages.
Extended European Search Report issued Jan. 27, 2020 regarding Application No. 18763954.7, 9 pages.
Chinese National Intellectual Property Administration, First Office Action issued Nov. 10, 2021 regarding Application No. 201880017248.5, 13 pages.
Vivo, "Remaining aspects on NR-PBCH", 3GPP TSG RAN WG1 Meeting #92, R1-1801507, Feb. 2018, 5 pages.
Intel Corporation, "NR PBCH Design", 3GPP TSG RAN WG1 Meeting #90, R1-1712526, Aug. 2017, 10 pages.
Huawei et al., "Discussion and evaluation on broadcast channel/signals transmission for beam based initial access", 3GPP TSG RAN WG1 Meeting #88, R1-1701722, Feb. 2017, 6 pages.
NTT Docomo, Inc., "Discussion on broadcast signal/channel design for NR", 3GPP TSG RAN WG1 AH_NR Meeting, R1-1700611, Jan. 2017, 6 pages.
"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.
"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.
"3rd Generation Partnership Project; Technical Specification Group Radio Access Network; Evolved Universal Terrestrial Radio Access (E-UTRA); Physical Layer Procedures (Release 13)," 3GPP TS 36.213, V13.2.0, Jun. 2016, 381 pages.
"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.
"3rd Generation Partnership Project; Technical Specification Group Radio Access Network; Evolved Universal Terrestrial Radio Access (E-UTRA); Radio Resource Control (RRC) Protocol Specification (Release 13)," 3GPP TS 36.331, V13.2.0, Jun. 2016, 623 pages.
International Search Report dated Jun. 22, 2018 in connection with International Patent Application No. PCT/KR2018/002852.
Qualcomm Incorporated, "PBCH design considerations", 3GPP TSG-RAN WG1 #88, Feb. 13-17, 2017, 9 pages, R1-1702589.
Nokia et al., "NR-PBCH Design", 3GPP TSG RAN WG1 Meeting #88, Feb. 13-17, 2017, 9 pages, R1-1703094.
Nokia et al., "DL Signals for Mobility Measurements and mobility schemes in NR", 3GPP TSG-RAN WG1 #87, Nov. 14-18, 2016, 6 pages, R1-1612811.
ZTE et al., "NR-PBCH Design", 3GPP TSG RAN WG1 Meeting #88, Feb. 13-17, 2017, 11 pages, R1-1701577.

* cited by examiner

METHOD AND APPARATUS FOR NR-DMRS SEQUENCE DESIGN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S) AND CLAIM OF PRIORITY

The present application claims priority to:

U.S. Provisional Patent Application Ser. No. 62/469,040, filed on Mar. 9, 2017;

U.S. Provisional Patent Application Ser. No. 62/507,521, filed on May 17, 2017;

U.S. Provisional Patent Application Ser. No. 62/510,522, filed on May 24, 2017;

U.S. Provisional Patent Application Ser. No. 62/519,528, filed on Jun. 14, 2017;

U.S. Provisional Patent Application Ser. No. 62/524,004, filed on Jun. 23, 2017;

U.S. Provisional Patent Application Ser. No. 62/537,692, filed on Jul. 27, 2017;

U.S. Provisional Patent Application Ser. No. 62/556,724, filed on Sep. 11, 2017;

U.S. Provisional Patent Application Ser. No. 62/569,137, filed on Oct. 6, 2017; and U.S. Provisional Patent Application Ser. No. 62/573,279, filed on Oct. 17, 2017.

The content of the above-identified patent documents is incorporated herein by reference.

TECHNICAL FIELD

The present disclosure relates generally to wireless communication systems and, more specifically, to the DMRS sequence design in an advanced wireless communication system.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an NR-SS burst set design in an advanced wireless communication system.

In one embodiment, a user equipment (UE) for controlling reference signal in a wireless communication system, the UE includes a transceiver configured to receive, from a base station (BS), a demodulation reference signal (DMRS) of a physical broadcasting channel (PBCH) over a downlink channel; and a processor operably connected to the transceiver, the processor configured to determine resources to be used for the DMRS of the PBCH, wherein a pseudo-noise (PN) sequence that is mapped to the resources to be used for the DMRS of the PBCH is generated by a base station (BS), and wherein the PN sequence is generated based on an initial condition including a physical cell identification (ID) and timing information comprising at least one of an index of synchronization signal block (SSB) or an index of a half frame within a frame based on a carrier frequency range, wherein the index of SSB comprises at least one of a partial or whole index of SSB.

In another embodiment, a BS for controlling reference signal in a wireless communication system is provided. The BS includes a processor configured to determine resources to be used for a DMRS of a PBCH; generate a PN sequence based on an initial condition including a physical cell ID and timing information comprising at least one of an index of SSB or an index of a half frame within a frame based on a carrier frequency range, wherein the index of SSB comprises at least one of a partial or whole index of SSB; and map the PN sequence to the resources to be used for the DMRS of the PBCH. The BS further includes a transceiver operably connected to the processor, the transceiver configured to transmit, to a UE, the DMRS of the PBCH over a downlink channel.

In yet another embodiment, a method of a UE for controlling reference signal in a wireless communication system is provided. The method comprises receiving, from a BS, a DMRS of a PBCH over a downlink channel; and determining resources to be used for the DMRS of the PBCH, wherein a PN sequence that is mapped to the resources to be used for the DMRS of the PBCH is generated by a BS, and wherein the PN sequence is generated based on an initial condition including a physical cell ID and timing information comprising at least one of an index of SSB or an index of a half frame within a frame based on a carrier frequency range, wherein the index of SSB comprises at least one of a partial or whole index of SSB.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0 "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
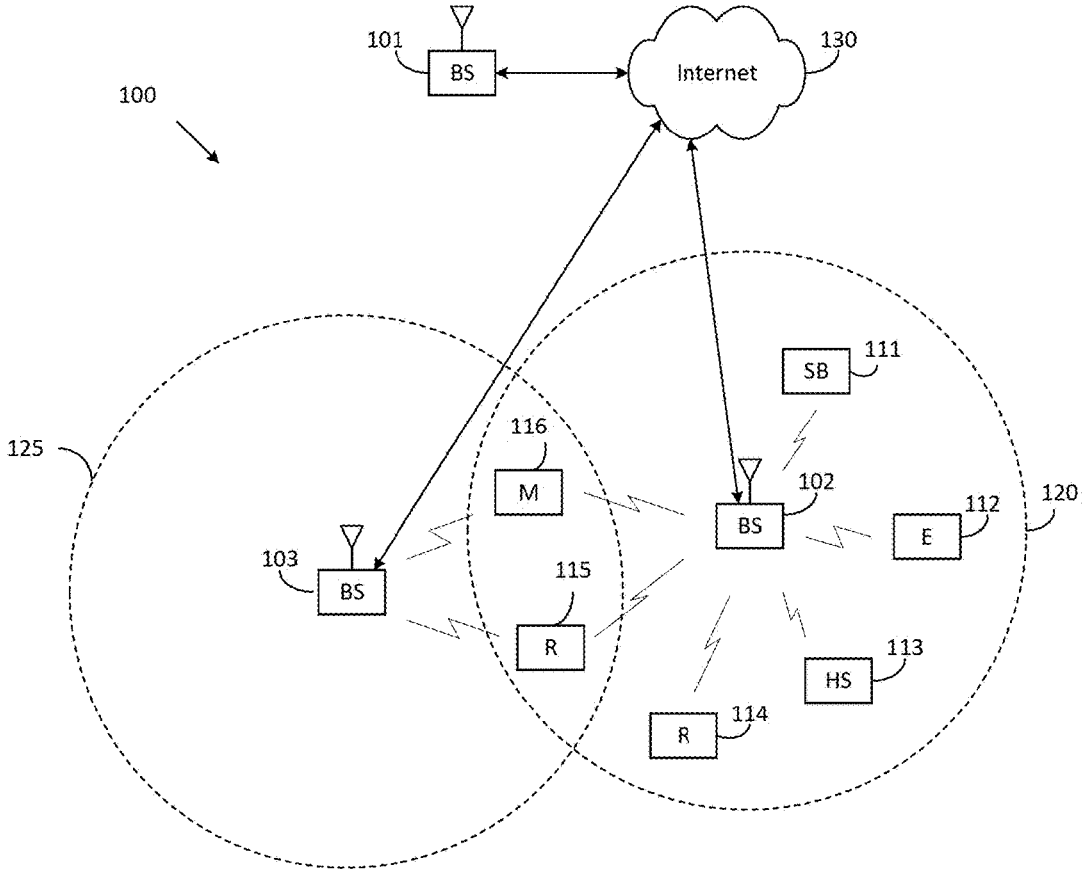
FIG. 1 illustrates an example wireless network according to embodiments of the present disclosure.
Figure 2:
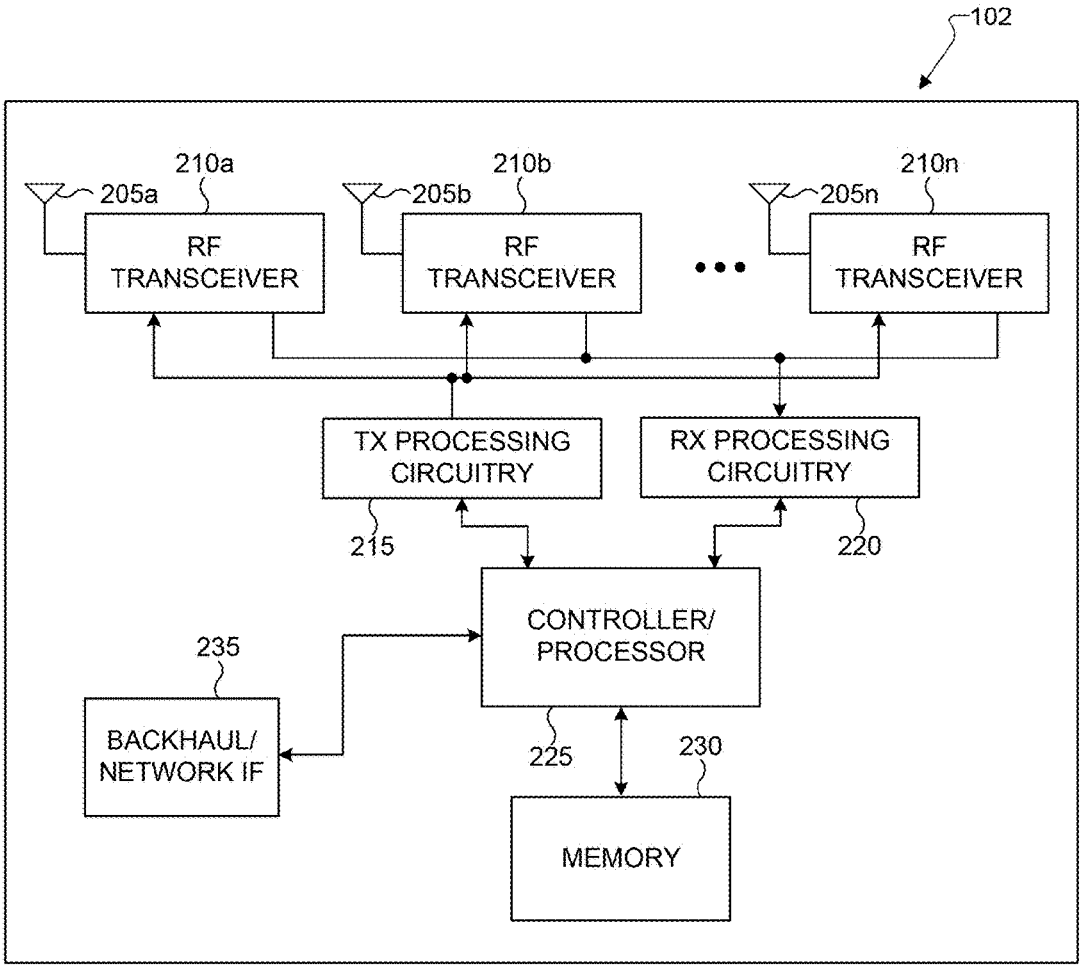
FIG. 2 illustrates an example eNB according to embodiments of the present disclosure.
Figure 3:
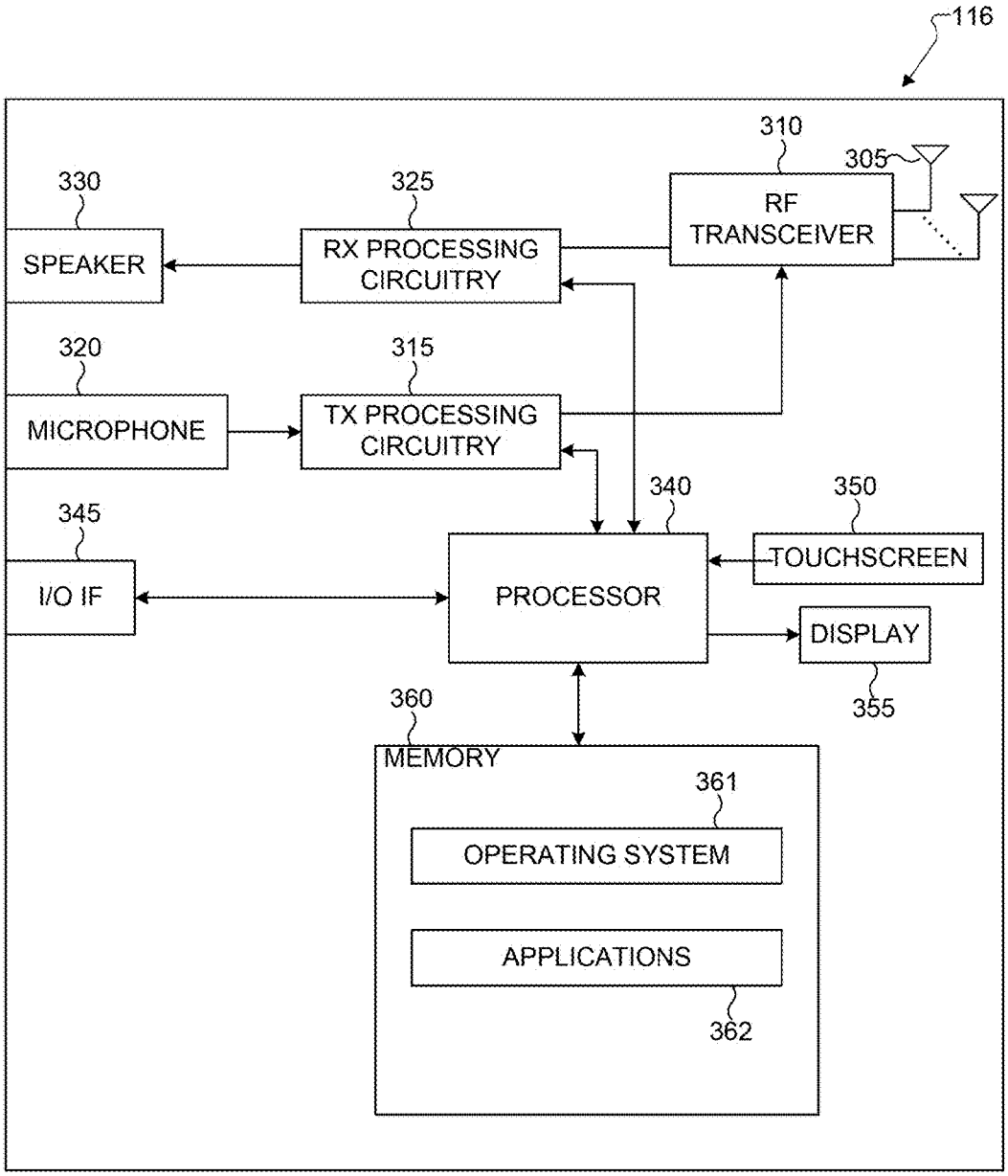
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient NR-DMRS sequence design in an advanced wireless communication system. In certain embodiments, and one or more of the eNBs 101-103 includes circuitry, programing, or a combination thereof, for receiving efficient NR-DMRS sequence design in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
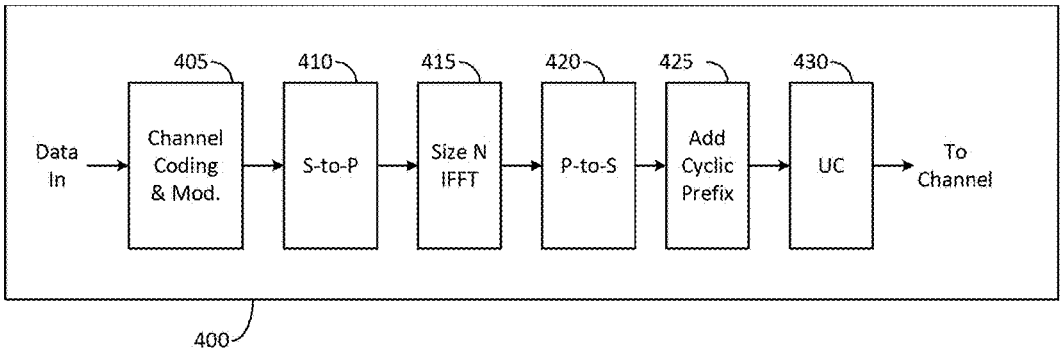
FIG. 4A illustrates a high-level diagram of an orthogonal frequency division multiple access transmit path according to embodiments of the present disclosure.
Figure 4B:
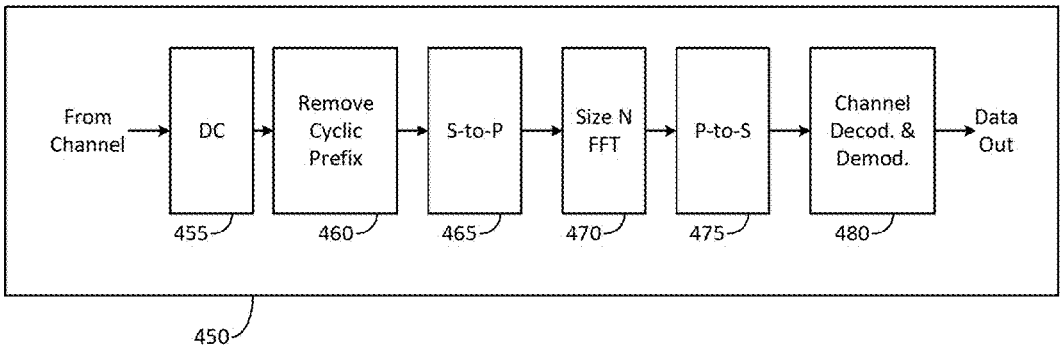
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH}\cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, it may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB}\cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
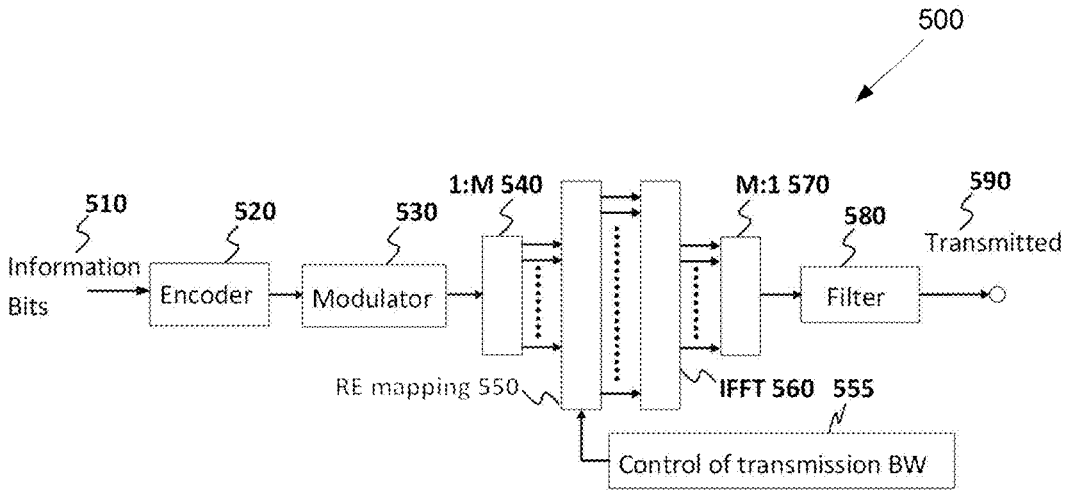
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
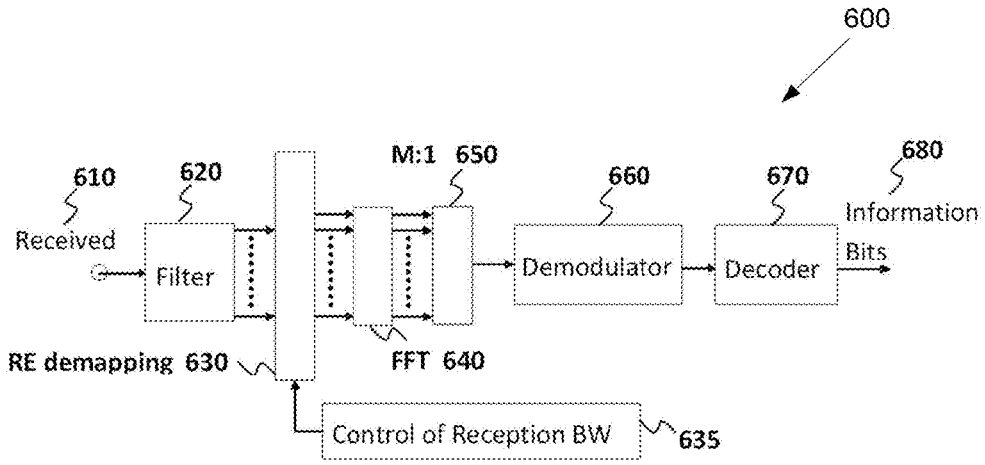
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
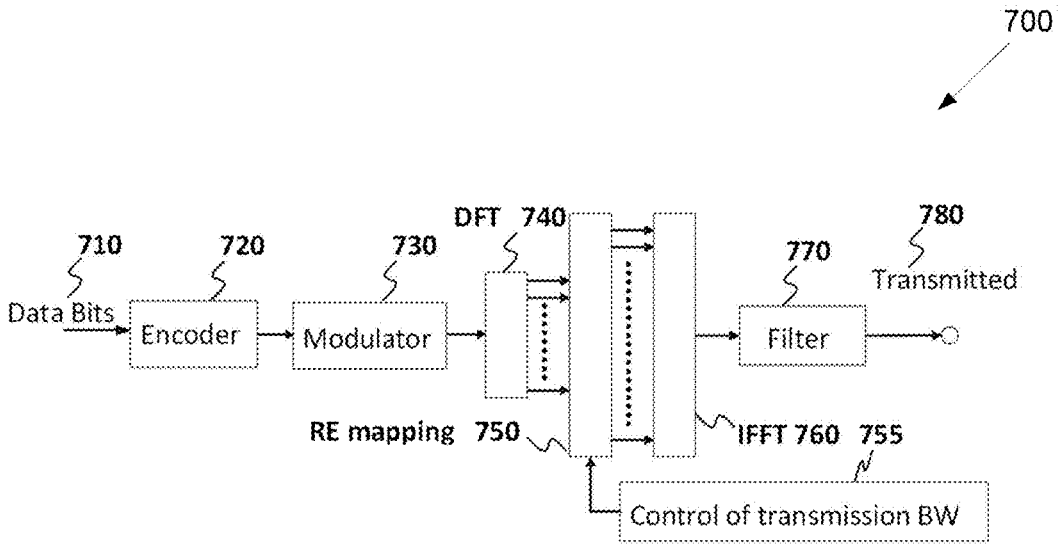
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
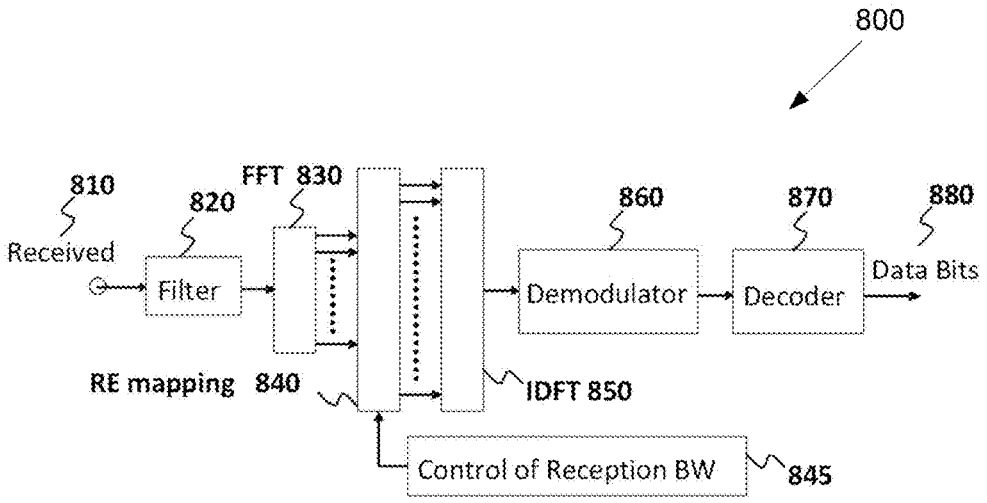
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
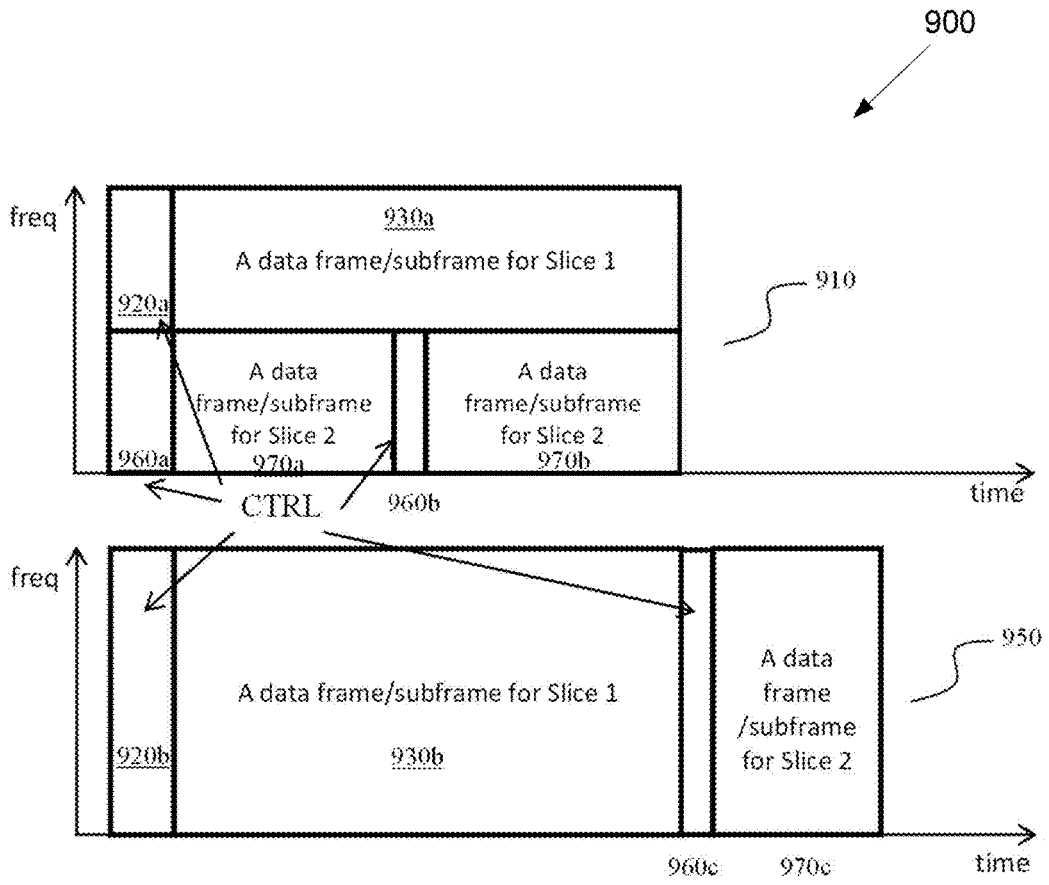
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
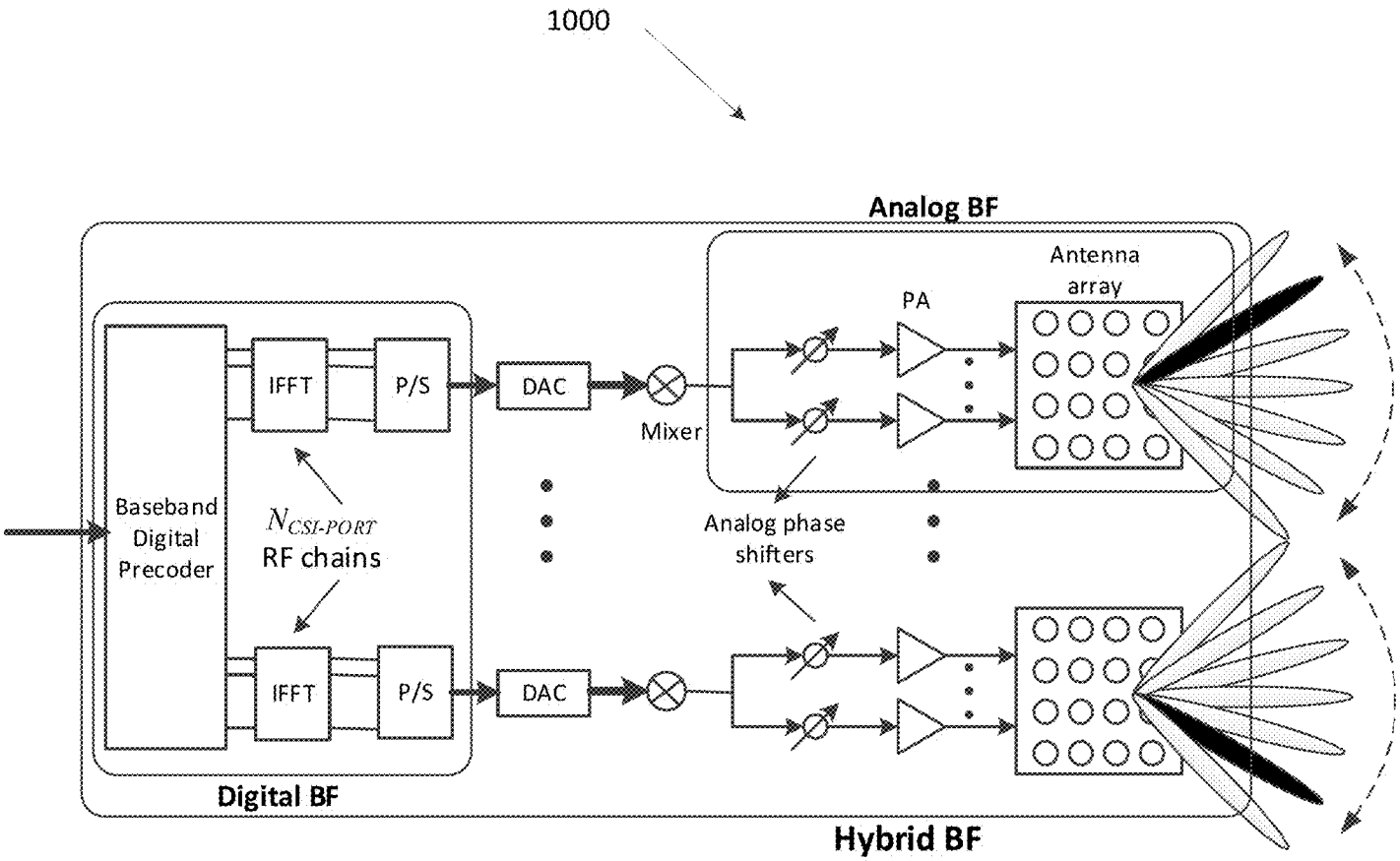
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
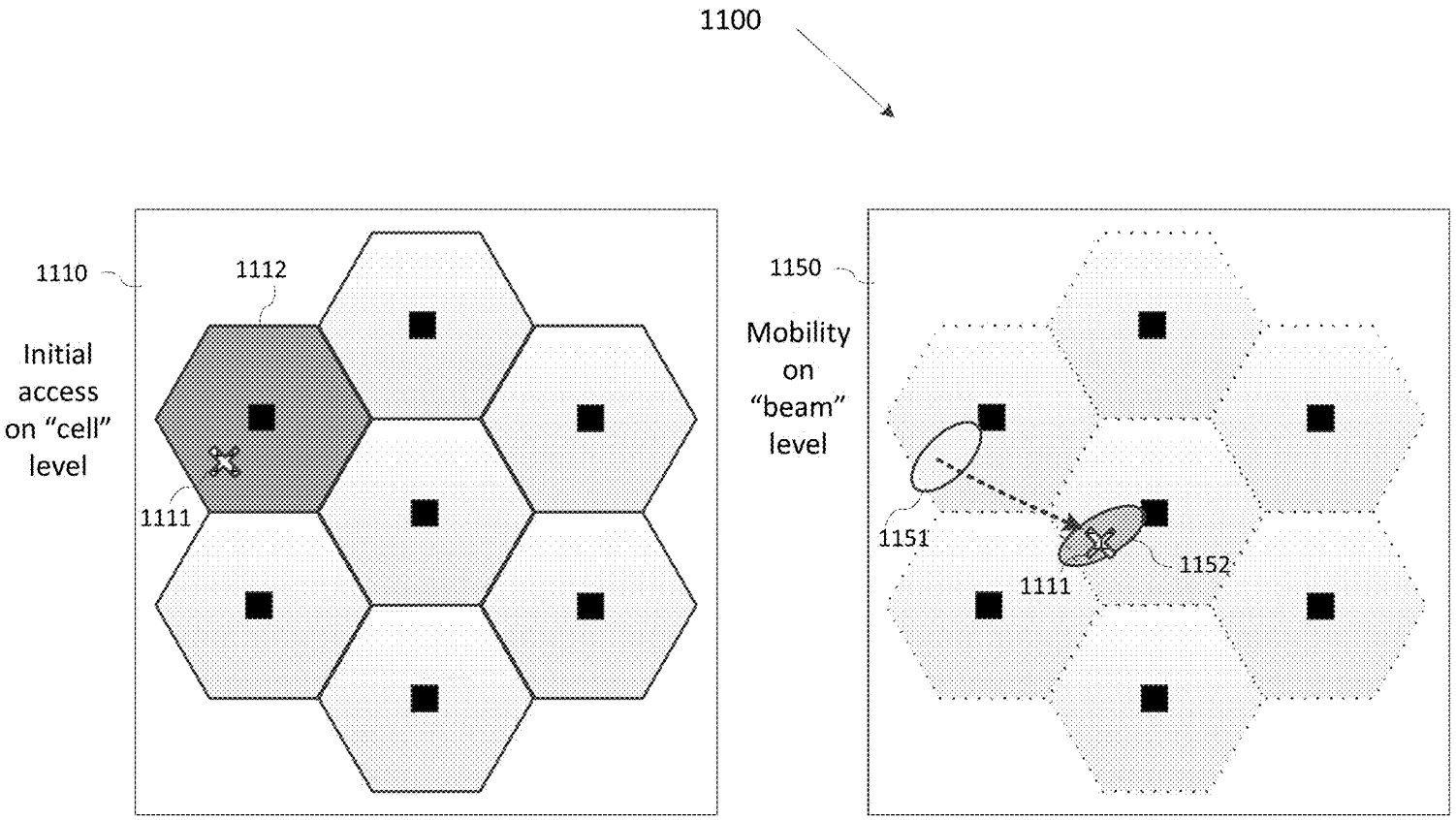
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with Nbeams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring Mbeam (or RR) acquisition signals.

Figure 12:
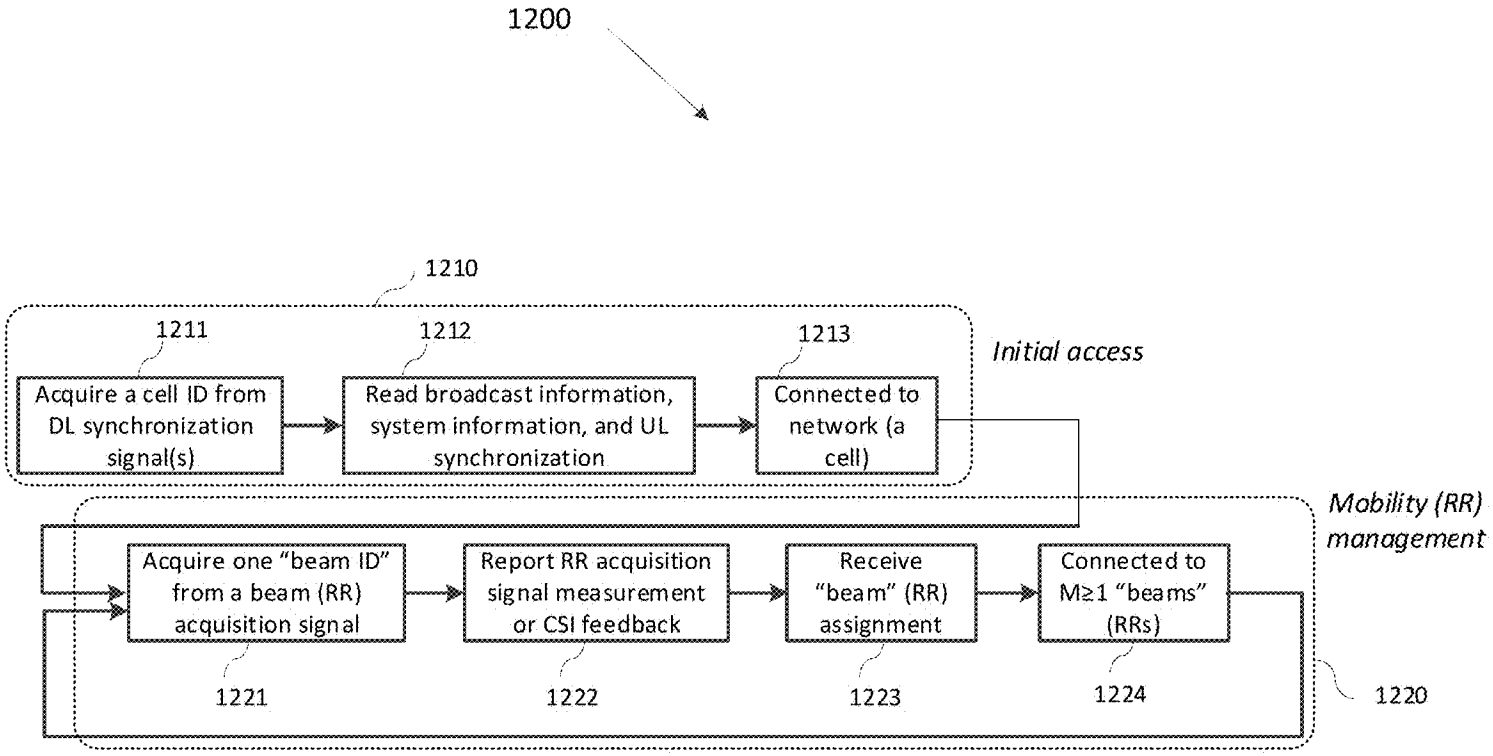
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

In some embodiments of component I for design aspects of NR-DMRS, the following design aspects can be considered for NR-DMRS sequence. Note that combination of the design aspects is also covered in the present disclosure.

In one embodiment of aspect I for functionality of NR-DMRS, NR-DMRS is only utilized for demodulation of NR-PBCH. In another embodiment of, NR-DMRS is only utilized for carrying timing hypotheses, e.g. SS block index (whole or part of), and/or SS burst index (whole or part of), and/or LBS of SFN (e.g. one or two bits). In yet another embodiment, NR-DMRS is utilized for both demodulation of NR-PBCH and carrying timing hypotheses, e.g. SS block index (whole or part of), and/or SS burst index (whole or part of), and/or LBS of SFN (e.g. one or two or three bits), and/or half frame timing location in a radio frame (i.e., first or second 5 ms within 10 ms radio frame).

In one embodiment of aspect II for cell-specific or UE-specific, NR-DMRS is cell-specific, and its sequence is generated using at least cell ID or part of the cell ID information. In another embodiment, NR-DMRS is UE-specific, and its sequence is generated using both cell ID (or part of the cell ID) and UE ID information.

In one embodiment of aspect III for numerology of NR-DMRS. the numerology of NR-DMRS is the same as NR-SS and NR-PBCH.

In one embodiment of aspect IV for port of NR-DMRS, the NR-DMRS is transmitted on the same port as NR-SS and NR-PBCH (one port design for all). In another embodiment, the NR-DMRS is transmitted on two ports, which are the same as NR-PBCH (can be different from NR-SS). In yet another embodiment, the NR-DMRS is transmitted on two ports, where one of them is the same as NR-SS, and the remaining one is the same as one of the ports for NR-PBCH transmission.

In one embodiment of aspect V for carrier frequency dependent or independent. the sequence for NR-DMRS is independent of/common for all carrier frequency ranges. Although different number of timing hypotheses (e.g. SS block index (whole or part of), and/or SS burst index (whole or part of), and/or LSB of SFN (e.g. one or two or three bits), and/or half frame timing location in a radio frame (e.g., first or second 5 ms within 10 ms radio frame)) are carried within the SS block for different carrier frequency, the same number of timing hypotheses are carried by NR-DMRS, such that the sequence design is common for all carrier frequency ranges.

In one example, for a given cell, if 4 timing hypotheses for frequency range A (e.g. [0, 3] GHz), 8 timing hypotheses for frequency range B (e.g. [3, 6] GHz), 64 hypotheses for frequency range C (e.g. [6, 52.6] GHz), the common design of DMRS can carry 4 timing hypotheses for all carrier frequency ranges (e.g. the 4 timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information), and the remaining hypotheses for carrier frequency range B and C are carried by other signal/channel in SS block.

In another example, for a given cell, if 8 timing hypotheses for frequency range A (e.g. [0, 3] GHz), 16 timing hypotheses for frequency range B (e.g. [3, 6] GHz), 128 hypotheses for frequency range C (e.g. [6, 52.6] GHz), the common design of DMRS can carry 8 timing hypotheses for all carrier frequency ranges (e.g. the 8 timing hypotheses can refer to 3 bits SS block index within a SS burst, or 3 bits SS block burst index within a SS block burst set, or 3 LSBs of SS block index within a SS burst set, or 3 MSBs of SS block index within a SS burst set, or 3 LSBs of SFN, or 2 bits from the above timing information combined with 5 ms indication within a radio subframe, and the 3 bits timing information can be different for different carrier frequency ranges), and the remaining hypotheses for carrier frequency range B and C are carried by other signal/channel in SS block (e.g. NR-PBCH payload or NR-PBCH scrambling or the combination).

In yet another example, for a given cell, if 16 timing hypotheses for frequency range A (e.g. [0, 3] GHz), 32 timing hypotheses for frequency range B (e.g. [3, 6] GHz), 256 hypotheses for frequency range C (e.g. [6, 52.6] GHz), the common design of DMRS can carry 16 timing hypotheses for all carrier frequency ranges (e.g. the 16 timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information), and the remaining hypotheses for carrier frequency range B and C are carried by other signal/channel in SS block.

In yet another example, for a given cell, if 32 timing hypotheses for frequency range A (e.g. [0, 3] GHz), 64 timing hypotheses for frequency range B (e.g. [3, 6] GHz), 512 hypotheses for frequency range C (e.g. [6, 52.6] GHz), the common design of DMRS can carry 32 timing hypotheses for all carrier frequency ranges (e.g. the 32 timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information), and the remaining hypotheses for carrier frequency range B and C are carried by other signal/channel in SS block.

In yet another example, for a given cell, if 64 timing hypotheses for frequency range A (e.g. [0, 3] GHz), 128 timing hypotheses for frequency range B (e.g. [3, 6] GHz), 1024 hypotheses for frequency range C (e.g. [6, 52.6] GHz), the common design of DMRS can carry 64 timing hypotheses for all carrier frequency ranges (e.g. the 64 timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information), and the remaining hypotheses for carrier frequency range B and C are carried by other signal/channel in SS block.

In one embodiment, the sequence for NR-DMRS is dependent on the carrier frequency range. For example, if NR-DMRS is utilized for indicating the timing information, e.g. SS block index (whole or part of), and/or SS burst index (whole or part of), and/or LBS of SFN (e.g. one or two or three bits), and/or half frame timing location in a radio frame (i.e., first or second 5 ms within 10 ms radio frame), the number of hypotheses for the timing information can be different for different carrier frequency ranges (e.g. smaller number for carrier frequency ranges from 0 to 6 GHz, and larger number for carrier frequency ranges from 6 to 60 GHz).

In one example, for a given cell, if 4 timing hypotheses considered for frequency range A (e.g. [0, 3] GHz), 8 timing hypotheses considered for frequency range B (e.g. [3, 6] GHz), 64 hypotheses considered for frequency range C (e.g. [6, 52.6] GHz), then DMRS can carry 4 (or 2 or 1) timing hypotheses for carrier frequency range A, carry 8 (or 4 or 2) timing hypotheses for carrier frequency range B, and carry 64 (or 32 or 16) timing hypotheses for carrier frequency range C (note that the radio of timing hypotheses for different ranges is fixed, and the timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information).

To support the different number of hypotheses for different carrier frequencies, the DMRS sequences of carrier frequency range A can be a subset of the ones for carrier frequency range B (e.g. choosing the initial conditions as a subset, or choosing the cyclic shifts as a subset, or choosing the sequence generators/roots as a subset, or choosing both cyclic shifts and the sequence generators/roots as a subset) or the sequences for carrier frequency range B can be a product of the sequences for carrier frequency range A with an additional sequence; and the DMRS sequences of carrier frequency range B can be a subset of the ones for carrier frequency range C (e.g. choosing the initial conditions as a subset, or choosing the cyclic shifts as a subset, or choosing the sequence generators/roots as a subset, or choosing both cyclic shifts and the sequence generators/roots as a subset) or the sequences for carrier frequency range C can be a product of the sequences for carrier frequency range B with an additional sequence. If taking the hypotheses number in the bracket (i.e., not taking the complete timing information), the remaining timing hypotheses are carried by other signal/channel in SS block (e.g. NR-SSS and/or PBCH) and the design is common for all carrier frequencies.

In one example, for a given cell, if 8 timing hypotheses considered for frequency range A (e.g. [0, 3] GHz), 16 timing hypotheses considered for frequency range B (e.g. [3, 6] GHz), 128 hypotheses considered for frequency range C (e.g. [6, 52.6] GHz), then DMRS can carry 8 (or 4 or 2 or 1) timing hypotheses for carrier frequency range A, carry 16 (or 8 or 4 or 2) timing hypotheses for carrier frequency range B, and carry 128 (or 64 or 32 or 16) timing hypotheses for carrier frequency range C (note that the radio of timing hypotheses for different ranges is fixed, and the timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information).

To support the different number of hypotheses for different carrier frequencies, the DMRS sequences of carrier frequency range A can be a subset of the ones for carrier frequency range B (e.g. choosing the initial conditions as a subset, or choosing the cyclic shifts as a subset, or choosing the sequence generators/roots as a subset, or choosing both cyclic shifts and the sequence generators/roots as a subset) or the sequences for carrier frequency range B can be a product of the sequences for carrier frequency range A with an additional sequence; and the DMRS sequences of carrier frequency range B can be a subset of the ones for carrier frequency range C (e.g. choosing the initial conditions as a subset, or choosing the cyclic shifts as a subset, or choosing the sequence generators/roots as a subset, or choosing both cyclic shifts and the sequence generators/roots as a subset) or the sequences for carrier frequency range C can be a product of the sequences for carrier frequency range B with an additional sequence. If taking the hypotheses number in the bracket (i.e., not taking the complete timing information), the remaining timing hypotheses are carried by other signal/channel in SS block (e.g. NR-SSS and/or PBCH) and the design is common for all carrier frequencies.

In another, for a given cell, if 16 timing hypotheses for frequency range A (e.g. [0, 3] GHz), 32 timing hypotheses for frequency range B (e.g. [3, 6] GHz), 256 hypotheses for frequency range C (e.g. [6, 52.6] GHz), then DMRS can carry 16 (or 8 or 4 or 2 or 1) timing hypotheses for carrier frequency range A, carry 32 (or 16 or 8 or 4 or 2) timing hypotheses for carrier frequency range B, and carry 256 (or 128 or 64 or 32 or 16) timing hypotheses for carrier frequency range C (note that the radio of timing hypotheses for different ranges is fixed, and the timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information).

To support the different number of hypotheses for different carrier frequencies, the DMRS sequences of carrier frequency range A can be a subset of the ones for carrier frequency range B (e.g. choosing the cyclic shifts as a subset, or choosing the sequence generators/roots as a subset, or choosing both cyclic shifts and the sequence generators/roots as a subset) or the sequences for carrier frequency range B can be a product of the sequences for carrier frequency range A with an additional sequence; and the DMRS sequences of carrier frequency range B can be a subset of the ones for carrier frequency range C (e.g. choosing the cyclic shifts as a subset, or choosing the sequence generators/roots as a subset, or choosing both cyclic shifts and the sequence generators/roots as a subset) or the sequences for carrier frequency range C can be a product of the sequences for carrier frequency range B with an additional sequence. If taking the hypotheses number in the bracket (i.e., not taking the complete timing information), the remaining timing hypotheses are carried by other signal/channel in SS block (e.g. NR-SSS and/or PBCH) and the design is common for all carrier frequencies.

In yet another example, for a given cell, if 32 timing hypotheses for frequency range A (e.g. [0, 3] GHz), 64 timing hypotheses for frequency range B (e.g. [3, 6] GHz), 512 hypotheses for frequency range C (e.g. [6, 52.6] GHz), then DMRS can carry 32 (or 16 or 8 or 4 or 2 or 1) timing hypotheses for carrier frequency range A, carry 64 (or 32 or 16 or 8 or 4 or 2) timing hypotheses for carrier frequency range B, and carry 512 (or 256 or 128 or 64 or 32 or 16) timing hypotheses for carrier frequency range C (note that the radio of timing hypotheses for different ranges is fixed, and the timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information).

To support the different number of hypotheses for different carrier frequencies, the DMRS sequences of carrier frequency range A can be a subset of the ones for carrier frequency range B (e.g. choosing the cyclic shifts as a subset, or choosing the sequence generators/roots as a subset, or choosing both cyclic shifts and the sequence generators/roots as a subset) or the sequences for carrier frequency range B can be a product of the sequences for carrier frequency range A with an additional sequence; and the DMRS sequences of carrier frequency range B can be a subset of the ones for carrier frequency range C (e.g. choosing the cyclic shifts as a subset, or choosing the sequence generators/roots as a subset, or choosing both cyclic shifts and the sequence generators/roots as a subset) or the sequences for carrier frequency range C can be a product of the sequences for carrier frequency range B with an additional sequence. If taking the hypotheses number in the bracket (i.e., not taking the complete timing information), the remaining timing hypotheses are carried by other signal/channel in SS block (e.g. NR-SSS and/or PBCH) and the design is common for all carrier frequencies.

In yet another example, for a given cell, if 64 timing hypotheses for frequency range A (e.g. [0, 3] GHz), 128 timing hypotheses for frequency range B (e.g. [3, 6] GHz), 1024 hypotheses for frequency range C (e.g. [6, 52.6] GHz), then DMRS can carry 64 (or 32 or 16 or 8 or 4 or 2 or 1) timing hypotheses for carrier frequency range A, carry 128 (or 64 or 32 or 16 or 8 or 4 or 2) timing hypotheses for carrier frequency range B, and carry 1024 (or 512 or 256 or 128 or 64 or 32 or 16) timing hypotheses for carrier frequency range C (note that the radio of timing hypotheses for different ranges is fixed, and the timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information).

To support the different number of hypotheses for different carrier frequencies, the DMRS sequences of carrier frequency range A can be a subset of the ones for carrier frequency range B (e.g. choosing the cyclic shifts as a subset, or choosing the sequence generators/roots as a subset, or choosing both cyclic shifts and the sequence generators/roots as a subset) or the sequences for carrier frequency range B can be a product of the sequences for carrier frequency range A with an additional sequence; and the DMRS sequences of carrier frequency range B can be a subset of the ones for carrier frequency range C (e.g. choosing the cyclic shifts as a subset, or choosing the sequence generators/roots as a subset, or choosing both cyclic shifts and the sequence generators/roots as a subset) or the sequences for carrier frequency range C can be a product of the sequences for carrier frequency range B with an additional sequence. If taking the hypotheses number in the bracket (i.e., not taking the complete timing information), the remaining timing hypotheses are carried by other signal/channel in SS block (e.g. NR-SSS and/or PBCH) and the design is common for all carrier frequencies.

In yet another embodiment, the combination of above two embodiments is utilized for different carrier frequency ranges. In one instance, for a given cell, if 4 timing hypotheses considered for frequency range A (e.g. [0, 3] GHz), 8 timing hypotheses considered for frequency range B (e.g. [3, 6] GHz), 64 hypotheses considered for frequency range C (e.g. [6, 52.6] GHz), then DMRS can carry 8 timing hypotheses for carrier frequency ranges B and C (e.g. the 8 timing hypotheses can refer to 3 bits SS block index within a SS burst, or 3 bits SS block burst index within a SS block burst set, or 3 LSBs of SS block index within a SS burst set, or 3 MSBs of SS block index within a SS burst set, or 3 LSBs of SFN, or 2 bits from the above timing information combined with 5 ms indication within a radio subframe), and the remaining hypotheses for carrier frequency range C are carried by other signal/channel in SS block (e.g. NR-PBCH payload or NR-PBCH scrambling or the combination), and DMRS can carry 4 timing hypotheses for carrier frequency range A, where the DMRS sequences of carrier frequency range A can be a subset of the ones for carrier frequency range B and C where the sequences for range B and C are the same (e.g. to construct the subset sequence, one can perform choosing the initial conditions as a subset, or cyclic shifts as a subset, or choosing the cyclic shifts as a subset, or choosing the sequence generators/roots as a subset, or choosing both cyclic shifts and the sequence generators/roots as a subset), or the sequences for carrier frequency range B and C can be a product of the sequences for carrier frequency range A with an additional sequence.

In yet another example, for a given cell, if 8 timing hypotheses considered for frequency range A (e.g. [0, 3] GHz), 16 timing hypotheses considered for frequency range B (e.g. [3, 6] GHz), 128 hypotheses considered for frequency range C (e.g. [6, 52.6] GHz), then DMRS can carry 16 timing hypotheses for carrier frequency ranges B and C (e.g. the 16 timing hypotheses can refer to 4 bits SS block index within a SS burst, or 4 bits SS block burst index within a SS block burst set, or 4 LSBs of SS block index within a SS burst set, or 4 MSBs of SS block index within a SS burst set, or 4 LSBs of SFN, or 3 LSBs of SS block index within a SS burst set combined with 5 ms indication within a radio subframe, or 3 MSBs of SS block index within a SS burst set combined with 5 ms indication within a radio subframe, or 3 LSBs of SFN combined with 5 ms indication within a radio subframe), and the remaining hypotheses for carrier frequency range C are carried by other signal/channel in SS block (e.g. NR-PBCH payload or NR-PBCH scrambling or the combination), and DMRS can carry 8 timing hypotheses for carrier frequency range A, where the DMRS sequences of carrier frequency range A can be a subset of the ones for carrier frequency range B and C where the sequences for range B and C are the same (e.g. to construct the subset sequence, one can perform choosing the initial conditions as a subset, the cyclic shifts as a subset, or choosing the sequence generators/roots as a subset, or choosing both cyclic shifts and the sequence generators/roots as a subset), or the sequences for carrier frequency range B and C can be a product of the sequences for carrier frequency range A with an additional sequence.

In yet another example, for a given cell, if 16 timing hypotheses for frequency range A (e.g. [0, 3] GHz), 32 timing hypotheses for frequency range B (e.g. [3, 6] GHz), 256 hypotheses for frequency range C (e.g. [6, 52.6] GHz), then DMRS can carry 32 timing hypotheses for carrier frequency ranges B and C (e.g. the 32 timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information), and the remaining hypotheses for carrier frequency range C are carried by other signal/channel in SS block (e.g. PBCH payload), and DMRS can carry 16 timing hypotheses for carrier frequency range A, where the DMRS sequences of carrier frequency range A can be a subset of the ones for carrier frequency range B and C (e.g. choosing the cyclic shifts as a subset, or choosing the sequence generators/roots as a subset, or choosing both cyclic shifts and the sequence generators/roots as a subset), or the sequences for carrier frequency range B and C can be a product of the sequences for carrier frequency range A with an additional sequence.

In yet another example, for a given cell, if 32 timing hypotheses for frequency range A (e.g. [0, 3] GHz), 64 timing hypotheses for frequency range B (e.g. [3, 6] GHz), 512 hypotheses for frequency range C (e.g. [6, 52.6] GHz), then DMRS can carry 64 timing hypotheses for carrier frequency ranges B and C (e.g. the 64 timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information), and the remaining hypotheses for carrier frequency range C are carried by other signal/channel in SS block, and DMRS can carry 32 timing hypotheses for carrier frequency range A, where the DMRS sequences of carrier frequency range A can be a subset of the ones for carrier frequency range B and C (e.g. choosing the cyclic shifts as a subset, or choosing the sequence generators/roots as a subset, or choosing both cyclic shifts and the sequence generators/roots as a subset), or the sequences for carrier frequency range B and C can be a product of the sequences for carrier frequency range A with an additional sequence.

In yet another example, for a given cell, if 64 timing hypotheses for frequency range A (e.g. [0, 3] GHz), 128 timing hypotheses for frequency range B (e.g. [3, 6] GHz), 1024 hypotheses for frequency range C (e.g. [6, 52.6] GHz), then DMRS can carry 128 timing hypotheses for carrier frequency ranges B and C (e.g. the 128 timing hypotheses can refer to SS block index within a SS burst, or SS block burst index within a SS block burst set, or SS block index within a SS burst set, or LBS of SFN, or 5 ms indication within a radio subframe, or the combination of above timing information and/or part of above timing information), and the remaining hypotheses for carrier frequency range C are carried by other signal/channel in SS block (e.g. PBCH payload), and DMRS can carry 64 timing hypotheses for carrier frequency range A, where the DMRS sequences of carrier frequency range A can be a subset of the ones for carrier frequency range B and C (e.g. choosing the cyclic shifts as a subset, or choosing the sequence generators/roots as a subset, or choosing both cyclic shifts and the sequence generators/roots as a subset), or the sequences for carrier frequency range B and C can be a product of the sequences for carrier frequency range A with an additional sequence.

In some embodiments of aspect VI for sequence type of NR-DMRS for indicating timing hypotheses (e.g. SS block index (whole or part of), and/or SS burst index (whole or part of), and/or LSB of SFN (e.g. one or two bits), and/or half frame timing location in a radio frame (i.e., first or second 5 ms within 10 ms radio frame)) are considered. Note that the sequence here can be combined with other sequence (e.g. multiplied or XORed or interleaved) to generate the final sequence for NR-DMRS.

In one example, one or more ZC-sequence(s) with one or more cyclic shift(s) can be used for indicating timing hypotheses in NR-DMRS. In another example, one or more M-sequence(s) with one or more cyclic shift(s) can be used for indicating timing hypotheses in NR-DMRS. In yet another example, interleaved two M-sequences can be used for indicating timing hypotheses in NR-DMRS. In yet another example, BPSK or QPSK modulated Gold sequence (XOR of two M-sequences) with cyclic shifts and/or initial conditions can be used for indicating timing hypotheses in NR-DMRS.

In some embodiments of aspect VII, sequence length of NR-DMRS is considered. In general, the sequence length is determined by the number of REs available within a symbol, the number of symbols to multiplex NR-PBCH and NR-DMRS, the overhead ratio of NR-DMRS, and the actual type of sequence (see Aspect VI) utilized to generate NR-DMRS (e.g. there is some limitation on the sequence length for a particular type of sequence). Meanwhile, if NR-DMRS is located in multiple symbols (can be consecutive or non-consecutive symbols) within a subframe, the following embodiments can be considered to determine the sequence length.

In one example, the sequence of NR-DMRS within each symbol can be identical among different symbols, then the sequence for generating NR-DMRS (as well as the associated sequence length) refers to the one within each symbol. In another example, there is only one sequence of NR-DMRS across all symbols (can be consecutive or non-consecutive), then the sequence for generating NR-DMRS (as well as the associated sequence length) refers to the one within all the symbols.

Based on the above consideration, the number of REs for the sequence generating NR-DMRS $N_{DMRS}$ and actual sequence length of NR-DMRS $L_{DMRS}$ can be determined as in TABLE 1 (for product and BPSK modulation based construction methods in component II) and TABLE 2 (for QPSK modulation based construction methods in component II), where $N_{DMRS}$ is determined by the payload of NR-DMRS within symbol(s), and $L_{DMRS}$ is determined also with consideration of the particular sequence type to generate the NR-DMRS. The relation between $L_{DMRS}$ and $N_{DMRS}$ can be determined as follow.

In one example, truncation (including no truncation) can be utilized to generate NR-DMRS. For example, the value for $L_{DMRS}$ after "or" in TABLE 1A and TABLE 1B and TABLE 2A and TABLE 2B corresponds to this embodiment, where $L_{DMRS} \geq N_{DMRS}$. Note that in this embodiment, the value for $L_{DMRS}$ refers to the minimum sequence length to be truncated from and generate DMRS, and the actual sequence length can be larger than $L_{DMRS}$.

In another example, repetition (including no repetition) of the whole or part of the sequence, or/and multiplexing with zero sequence (including no multiplexing), or/and concatenated with multiple sequences (including no concatenating) can be utilized to generate NR-DMRS. For example, the value for $L_{DMRS}$ before "or" in TABLE 1A and TABLE 1B and TABLE 2A and TABLE 2B corresponds to this embodiment, where $L_{DMRS} \leq N_{SMRS}$.

In yet another example, the combination of the above two embodiments can be utilized to generate NR-DMRS.

In yet another example, the length of sequence to generate DMRS is fixed, regardless of the DMRS overhead and RE mapping pattern. In this case, DMRS sequence is always truncated from a much longer PN sequence. For example, it can reuse the sequence generator of LTE CRS sequence, or LTE DMRS sequence for PDSCH, or NR DMRS sequence for NR PDSCH. For another example, it can reuse the sequence generator type of LTE CRS sequence (whose length is 2^31-1), or LTE DMRS sequence for PDSCH (whose length is 2^31-1), or NR DMRS sequence for NR PDSCH (e.g. also with length 2^31-1).

TABLE 1A

NR-DMRS sequence design

| NR-DMRS Overhead Ratio | Number of REs within a Symbol for NR-PBCH and/or NR-DMRS | Number of Symbols | Whether Using Repetition in Time or Frequency Domain | $N_{DMRS}$ |
|---|---|---|---|---|
| 1/3 | 254 | 1 | — | 84 |
| 1/3 | 254 | 2 | Yes | 84 |

TABLE 1A-continued

| NR-DMRS sequence design | | | | |
|---|---|---|---|---|
| NR-DMRS Overhead Ratio | Number of REs within a Symbol for NR-PBCH and/or NR-DMRS | Number of Symbols | Whether Using Repetition in Time or Frequency Domain | $N_{DMRS}$ |
| 1/3 | 254 | 2 | No | 168 |
| 1/3 | 288 | 1 | — | 96 |
| 1/3 | 288 | 2 | Yes | 96 |
| 1/3 | 288 | 2 | No | 192 |
| 1/3 | 126 | 1 | — | 42 |
| 1/3 | 126 | 2 | Yes | 42 |
| 1/3 | 126 | 2 | No | 84 |
| 1/3 | 126 | 4 | Yes | 42 |
| 1/3 | 126 | 4 | No | 168 |
| 1/3 | 144 | 1 | — | 48 |
| 1/3 | 144 | 2 | Yes | 48 |
| 1/3 | 144 | 2 | No | 96 |
| 1/3 | 144 | 4 | Yes | 48 |
| 1/3 | 144 | 4 | No | 192 |
| 1/4 | 254 | 1 | — | 63 |
| 1/4 | 254 | 2 | Yes | 63 |
| 1/4 | 254 | 2 | No | 126 |
| 1/4 | 288 | 1 | — | 72 |
| 1/4 | 288 | 2 | Yes | 72 |
| 1/4 | 288 | 2 | No | 144 |
| 1/4 | 126 | 1 | — | 31 |
| 1/4 | 126 | 2 | Yes | 31 |
| 1/4 | 126 | 2 | No | 62 |
| 1/4 | 126 | 4 | Yes | 31 |
| 1/4 | 126 | 4 | No | 124 |
| 1/4 | 144 | 1 | — | 36 |
| 1/4 | 144 | 2 | Yes | 36 |
| 1/4 | 144 | 2 | No | 72 |
| 1/4 | 144 | 4 | Yes | 36 |
| 1/4 | 144 | 4 | No | 144 |
| 1/6 | 254 | 1 | — | 42 |
| 1/6 | 254 | 2 | Yes | 42 |
| 1/6 | 254 | 2 | No | 84 |
| 1/6 | 288 | 1 | — | 48 |
| 1/6 | 288 | 2 | Yes | 48 |
| 1/6 | 288 | 2 | No | 96 |
| 1/6 | 126 | 1 | — | 21 |
| 1/6 | 126 | 2 | Yes | 21 |
| 1/6 | 126 | 2 | No | 42 |
| 1/6 | 126 | 4 | Yes | 21 |
| 1/6 | 126 | 4 | No | 84 |
| 1/6 | 144 | 1 | — | 24 |
| 1/6 | 144 | 2 | Yes | 24 |
| 1/6 | 144 | 2 | No | 48 |
| 1/6 | 144 | 4 | Yes | 24 |
| 1/6 | 144 | 4 | No | 96 |
| 1 | 254 | 1 | — | 254 |
| 1 | 288 | 1 | — | 288 |
| 1 | 126 | 1 | — | 126 |
| 1 | 144 | 1 | — | 144 |
| 1/3 | 254 | 3 | Yes | 84 |
| 1/3 | 254 | 3 | No | 252 |
| 1/3 | 288 | 3 | Yes | 96 |
| 1/3 | 288 | 3 | No | 288 |
| 1/3 | 126 | 3 | Yes | 42 |
| 1/3 | 126 | 3 | No | 126 |
| 1/3 | 144 | 3 | Yes | 48 |
| 1/3 | 144 | 3 | No | 144 |
| 1/4 | 254 | 3 | Yes | 63 |
| 1/4 | 254 | 3 | No | 189 |
| 1/4 | 288 | 3 | Yes | 72 |
| 1/4 | 288 | 3 | No | 216 |
| 1/4 | 126 | 3 | Yes | 31 |
| 1/4 | 126 | 3 | No | 93 |
| 1/4 | 144 | 3 | Yes | 36 |
| 1/4 | 144 | 3 | No | 108 |
| 1/6 | 254 | 3 | Yes | 42 |
| 1/6 | 254 | 3 | No | 126 |
| 1/6 | 288 | 3 | Yes | 48 |
| 1/6 | 288 | 3 | No | 144 |
| 1/6 | 126 | 3 | Yes | 21 |
| 1/6 | 126 | 3 | No | 63 |

TABLE 1A-continued

| NR-DMRS sequence design | | | | |
|---|---|---|---|---|
| NR-DMRS Overhead Ratio | Number of REs within a Symbol for NR-PBCH and/or NR-DMRS | Number of Symbols | Whether Using Repetition in Time or Frequency Domain | $N_{DMRS}$ |
| 1/6 | 144 | 3 | Yes | 24 |
| 1/6 | 144 | 3 | No | 72 |

TABLE 1B

| NR-DMRS design | | | |
|---|---|---|---|
| $L_{DMRS}$ for ZC-sequence with cyclic shifts | $L_{DMRS}$ for M-sequence with cyclic shifts | $L_{DMRS}$ for interleaved M-sequences | $L_{DMRS}$ for Gold-sequence with cyclic shifts |
| 83, or 85 | 63, or 127 | 31, or 63 | 63, or 127 |
| 83, or 85 | 63, or 127 | 31, or 63 | 63, or 127 |
| 167, or 169 | 127, or 255 | 63, or 127 | 127, or 255 |
| 95, or 97 | 63, or 127 | 31, or 63 | 63, or 127 |
| 95, or 97 | 63, or 127 | 31, or 63 | 63, or 127 |
| 191, or 193 | 127, or 255 | 63, or 127 | 127, or 255 |
| 41, or 43 | 31, or 63 | 15, or 31 | 31, or 63 |
| 41, or 43 | 31, or 63 | 15, or 31 | 31, or 63 |
| 83, or 85 | 63, or 127 | 31, or 63 | 63, or 127 |
| 41, or 43 | 31, or 63 | 15, or 31 | 31, or 63 |
| 167, or 169 | 127, or 255 | 63, or 127 | 127, or 255 |
| 47, or 49 | 31, or 63 | 15, or 31 | 31, or 63 |
| 47, or 49 | 31, or 63 | 15, or 31 | 31, or 63 |
| 95, or 97 | 63, or 127 | 31, or 63 | 63, or 127 |
| 47, or 49 | 31, or 63 | 15, or 31 | 31, or 63 |
| 191, or 193 | 127, or 255 | 63, or 127 | 127, or 255 |
| 63, or 63 | 63, or 127 | 31, or 63 | 63, or 127 |
| 63, or 63 | 63, or 127 | 31, or 63 | 63, or 127 |
| 125, or 127 | 63, or 127 | 31, or 63 | 63, or 127 |
| 71, or 73 | 63, or 127 | 31, or 63 | 63, or 127 |
| 71, or 73 | 63, or 127 | 31, or 63 | 63, or 127 |
| 143, or 145 | 127, or 255 | 63, or 127 | 127, or 255 |
| 31, or 31 | 31, or 63 | 15, or 31 | 31, or 63 |
| 31, or 31 | 31, or 63 | 15, or 31 | 31, or 63 |
| 61, or 63 | 31, or 63 | 15, or 31 | 31, or 63 |
| 31, or 31 | 31, or 63 | 15, or 31 | 31, or 63 |
| 123, or 125 | 63, or 127 | 31, or 63 | 63, or 127 |
| 35, or 37 | 31, or 63 | 15, or 31 | 31, or 63 |
| 35, or 37 | 31, or 63 | 15, or 31 | 31, or 63 |
| 71, or 73 | 63, or 127 | 31, or 63 | 63, or 127 |
| 35, or 37 | 31, or 63 | 15, or 31 | 31, or 63 |
| 143, or 145 | 127, or 255 | 63, or 127 | 127, or 255 |
| 41, or 43 | 31, or 63 | 15, or 31 | 31, or 63 |
| 41, or 43 | 31, or 63 | 15, or 31 | 31, or 63 |
| 83, or 85 | 63, or 127 | 31, or 63 | 63, or 127 |
| 47, or 49 | 31, or 63 | 15, or 31 | 31, or 63 |
| 47, or 49 | 31, or 63 | 15, or 31 | 31, or 63 |
| 95, or 97 | 63, or 127 | 31, or 63 | 63, or 127 |
| 21, or 21 | 15, or 31 | 7, or 15 | 15, or 31 |
| 21, or 21 | 15, or 31 | 7, or 15 | 15, or 31 |
| 41, or 43 | 31, or 63 | 15, or 31 | 31, or 63 |
| 21, or 21 | 15, or 31 | 7, or 15 | 15, or 31 |
| 83, or 85 | 63, or 127 | 31, or 63 | 63, or 127 |
| 23, or 25 | 15, or 31 | 7, or 15 | 15, or 31 |
| 23, or 25 | 15, or 31 | 7, or 15 | 15, or 31 |
| 47, or 49 | 31, or 63 | 15, or 31 | 31, or 63 |
| 23, or 25 | 15, or 31 | 7, or 15 | 15, or 31 |
| 95, or 97 | 63, or 127 | 31, or 63 | 63, or 127 |
| 253, or 255 | 127, or 255 | 63, or 127 | 127, or 255 |
| 287, or 289 | 127, or 255 | 63, or 127 | 127, or 255 |
| 125, or 127 | 63, or 127 | 31, or 63 | 63, or 127 |
| 143, or 145 | 63, or 127 | 31, or 63 | 63, or 127 |
| 83, or 85 | 63, or 127 | 31, or 63 | 63, or 127 |
| 251, or 253 | 127, or 255 | 63, or 127 | 127, or 255 |
| 95, or 97 | 63, or 127 | 31, or 63 | 63, or 127 |
| 287, or 289 | 255, or 511 | 127, or 511 | 255, or 511 |
| 41, or 43 | 31, or 63 | 15, or 31 | 31, or 63 |
| 125, or 127 | 63, or 127 | 31, or 63 | 63, or 127 |
| 47, or 49 | 31, or 63 | 15, or 31 | 31, or 63 |

TABLE 1B-continued

| NR-DMRS design | | | |
|---|---|---|---|
| $L_{DMRS}$ for ZC-sequence with cyclic shifts | $L_{DMRS}$ for M-sequence with cyclic shifts | $L_{DMRS}$ for interleaved M-sequences | $L_{DMRS}$ for Gold-sequence with cyclic shifts |
| 143, or 145 | 127, or 255 | 63, or 127 | 127, or 255 |
| 63, or 63 | 63, or 127 | 31, or 63 | 63, or 63 |
| 189, or 189 | 127, or 255 | 63, or 127 | 127, or 255 |
| 71, or 73 | 63, or 127 | 31, or 63 | 63, or 127 |
| 215, or 217 | 127, or 255 | 63, or 127 | 127, or 255 |
| 31, or 31 | 31, or 63 | 15, or 31 | 31, or 31 |
| 93, or 93 | 63, or 127 | 31, or 63 | 63, or 127 |
| 35, or 37 | 31, or 63 | 15, or 31 | 31, or 63 |
| 107, or 109 | 63, or 127 | 31, or 63 | 63, or 127 |
| 41, or 43 | 31, or 63 | 15, or 31 | 31, or 63 |
| 125, or 127 | 63, or 127 | 31, or 63 | 63, or 127 |
| 47, or 49 | 31, or 63 | 15, or 31 | 31, or 63 |
| 143, or 145 | 127, or 255 | 63, or 127 | 127, or 255 |
| 21, or 21 | 15, or 31 | 7, or 15 | 15, or 31 |
| 63, or 63 | 63, or 127 | 31, or 63 | 63, or 127 |
| 23, or 25 | 15, or 31 | 7, or 15 | 15, or 31 |
| 71, or 73 | 63, or 127 | 31, or 63 | 63, or 127 |

TABLE 2A

| NR-DMRS design | | | |
|---|---|---|---|
| NR-DMRS Overhead Ratio | Number of REs within a Symbol for NR-PBCH and/or NR-DMRS | Number of Symbols | Whether Using Repetition in Time or Frequency Domain |
| 1/3 | 254 | 1 | — |
| 1/3 | 254 | 2 | Yes |
| 1/3 | 254 | 2 | No |
| 1/3 | 288 | 1 | — |
| 1/3 | 288 | 2 | Yes |
| 1/3 | 288 | 2 | No |
| 1/3 | 126 | 1 | — |
| 1/3 | 126 | 2 | Yes |
| 1/3 | 126 | 2 | No |
| 1/3 | 126 | 4 | Yes |
| 1/3 | 126 | 4 | No |
| 1/3 | 144 | 1 | — |
| 1/3 | 144 | 2 | Yes |
| 1/3 | 144 | 2 | No |
| 1/3 | 144 | 4 | Yes |
| 1/3 | 144 | 4 | No |
| 1/4 | 254 | 1 | — |
| 1/4 | 254 | 2 | Yes |
| 1/4 | 254 | 2 | No |
| 1/4 | 288 | 1 | — |
| 1/4 | 288 | 2 | Yes |
| 1/4 | 288 | 2 | No |
| 1/4 | 126 | 1 | — |
| 1/4 | 126 | 2 | Yes |
| 1/4 | 126 | 2 | No |
| 1/4 | 126 | 4 | Yes |
| 1/4 | 126 | 4 | No |
| 1/4 | 144 | 1 | — |
| 1/4 | 144 | 2 | Yes |
| 1/4 | 144 | 2 | No |
| 1/4 | 144 | 4 | Yes |
| 1/4 | 144 | 4 | No |
| 1/6 | 254 | 1 | — |
| 1/6 | 254 | 2 | Yes |
| 1/6 | 254 | 2 | No |
| 1/6 | 288 | 1 | — |
| 1/6 | 288 | 2 | Yes |
| 1/6 | 288 | 2 | No |
| 1/6 | 126 | 1 | — |
| 1/6 | 126 | 2 | Yes |
| 1/6 | 126 | 2 | No |
| 1/6 | 126 | 4 | Yes |
| 1/6 | 126 | 4 | No |
| 1/6 | 144 | 1 | — |

TABLE 2A-continued

| NR-DMRS design | | | |
|---|---|---|---|
| NR-DMRS Overhead Ratio | Number of REs within a Symbol for NR-PBCH and/or NR-DMRS | Number of Symbols | Whether Using Repetition in Time or Frequency Domain |
| 1/6 | 144 | 2 | Yes |
| 1/6 | 144 | 2 | No |
| 1/6 | 144 | 4 | Yes |
| 1/6 | 144 | 4 | No |
| 1 | 254 | 1 | — |
| 1 | 288 | 1 | — |
| 1 | 126 | 1 | — |
| 1 | 144 | 1 | — |
| 1/3 | 254 | 3 | Yes |
| 1/3 | 254 | 3 | No |
| 1/3 | 288 | 3 | Yes |
| 1/3 | 288 | 3 | No |
| 1/3 | 126 | 3 | Yes |
| 1/3 | 126 | 3 | No |
| 1/3 | 144 | 3 | Yes |
| 1/3 | 144 | 3 | No |
| 1/4 | 254 | 3 | Yes |
| 1/4 | 254 | 3 | No |
| 1/4 | 288 | 3 | Yes |
| 1/4 | 288 | 3 | No |
| 1/4 | 126 | 3 | Yes |
| 1/4 | 126 | 3 | No |
| 1/4 | 144 | 3 | Yes |
| 1/4 | 144 | 3 | No |
| 1/6 | 254 | 3 | Yes |
| 1/6 | 254 | 3 | No |
| 1/6 | 288 | 3 | Yes |
| 1/6 | 288 | 3 | No |
| 1/6 | 126 | 3 | Yes |
| 1/6 | 126 | 3 | No |
| 1/6 | 144 | 3 | Yes |
| 1/6 | 144 | 3 | No |

TABLE 2B

| NR-DMRS design | | | |
|---|---|---|---|
| $N_{DMRS}$ | $L_{DMRS}$ for M-sequence with cyclic shifts | $L_{DMRS}$ for interleaved M-sequences | $L_{DMRS}$ for Gold-sequence with cyclic shifts |
| 84 | 127, or 255 | 63, or 127 | 127, or 255 |
| 84 | 127, or 255 | 63, or 127 | 127, or 255 |
| 168 | 255, or 511 | 127, or 255 | 255, or 511 |
| 96 | 127, or 255 | 63, or 127 | 127, or 255 |
| 96 | 127, or 255 | 63, or 127 | 127, or 255 |
| 192 | 255, or 511 | 127, or 255 | 255, or 511 |
| 42 | 63, or 127 | 31, or 63 | 63, or 127 |
| 42 | 63, or 127 | 31, or 63 | 63, or 127 |
| 84 | 127, or 255 | 63, or 127 | 127, or 255 |
| 42 | 63, or 127 | 31, or 63 | 63, or 127 |
| 168 | 255, or 511 | 127, or 255 | 255, or 511 |
| 48 | 63, or 127 | 31, or 63 | 63, or 127 |
| 48 | 63, or 127 | 31, or 63 | 63, or 127 |
| 96 | 127, or 255 | 63, or 127 | 127, or 255 |
| 48 | 63, or 127 | 31, or 63 | 63, or 127 |
| 192 | 255, or 511 | 127, or 255 | 255, or 511 |
| 63 | 127, or 255 | 63, or 127 | 127, or 255 |
| 63 | 127, or 255 | 63, or 127 | 127, or 255 |
| 126 | 127, or 255 | 63, or 127 | 127, or 255 |
| 72 | 127, or 255 | 63, or 127 | 127, or 255 |
| 72 | 127, or 255 | 63, or 127 | 127, or 255 |
| 144 | 255, or 511 | 127, or 255 | 255, or 511 |
| 31 | 63, or 127 | 31, or 63 | 63, or 127 |
| 31 | 63, or 127 | 31, or 63 | 63, or 127 |
| 62 | 63, or 127 | 31, or 63 | 63, or 127 |
| 31 | 63, or 127 | 31, or 63 | 63, or 127 |
| 124 | 127, or 255 | 63, or 127 | 127, or 255 |
| 36 | 63, or 127 | 31, or 63 | 63, or 127 |
| 36 | 63, or 127 | 31, or 63 | 63, or 127 |

TABLE 2B-continued

| NR-DMRS design | | | |
|---|---|---|---|
| $N_{DMRS}$ | $L_{DMRS}$ for M-sequence with cyclic shifts | $L_{DMRS}$ for interleaved M-sequences | $L_{DMRS}$ for Gold-sequence with cyclic shifts |
| 72 | 127, or 255 | 63, or 127 | 127, or 255 |
| 36 | 63, or 127 | 31, or 63 | 63, or 127 |
| 144 | 255, or 511 | 127, or 255 | 255, or 511 |
| 42 | 63, or 127 | 31, or 63 | 63, or 127 |
| 42 | 63, or 127 | 31, or 63 | 63, or 127 |
| 84 | 127, or 255 | 63, or 127 | 127, or 255 |
| 48 | 63, or 127 | 31, or 63 | 63, or 127 |
| 48 | 63, or 127 | 31, or 63 | 63, or 127 |
| 96 | 127, or 255 | 63, or 127 | 127, or 255 |
| 21 | 31, or 63 | 15, or 31 | 31, or 63 |
| 21 | 31, or 63 | 15, or 31 | 31, or 63 |
| 42 | 63, or 127 | 31, or 63 | 63, or 127 |
| 21 | 31, or 63 | 15, or 31 | 31, or 63 |
| 84 | 127, or 255 | 63, or 127 | 127, or 255 |
| 24 | 31, or 63 | 15, or 31 | 31, or 63 |
| 24 | 31, or 63 | 15, or 31 | 31, or 63 |
| 48 | 63, or 127 | 31, or 63 | 63, or 127 |
| 24 | 31, or 63 | 15, or 31 | 31, or 63 |
| 96 | 127, or 255 | 63, or 127 | 127, or 255 |
| 254 | 255, or 511 | 127, or 255 | 255, or 511 |
| 288 | 255, or 511 | 127, or 255 | 255, or 511 |
| 126 | 127, or 255 | 63, or 127 | 127, or 255 |
| 144 | 127, or 255 | 63, or 127 | 127, or 255 |
| 84 | 127, or 255 | 63, or 127 | 127, or 255 |
| 252 | 255, or 511 | 127, or 255 | 255, or 511 |
| 96 | 127, or 255 | 63, or 127 | 127, or 255 |
| 288 | 511, or 1023 | 255, or 511 | 511, or 1023 |
| 42 | 63, or 127 | 31, or 63 | 63, or 127 |
| 126 | 127, or 255 | 63, or 127 | 127, or 255 |
| 48 | 63, or 127 | 31, or 63 | 63, or 127 |
| 144 | 255, or 511 | 127, or 255 | 255, or 511 |
| 63 | 127, or 255 | 63, or 63 | 127, or 255 |
| 189 | 255, or 511 | 127, or 255 | 127, or 255 |
| 72 | 127, or 255 | 63, or 127 | 127, or 255 |
| 216 | 255, or 511 | 127, or 255 | 255, or 511 |
| 31 | 63, or 127 | 31, or 31 | 127, or 255 |
| 93 | 127, or 255 | 63, or 127 | 127, or 255 |
| 36 | 63, or 127 | 31, or 63 | 255, or 511 |
| 108 | 127, or 255 | 63, or 127 | 63, or 127 |
| 42 | 63, or 127 | 31, or 63 | 63, or 127 |
| 126 | 127, or 255 | 63, or 127 | 127, or 255 |
| 48 | 63, or 127 | 31, or 63 | 63, or 127 |
| 144 | 255, or 511 | 127, or 255 | 255, or 511 |
| 21 | 31, or 63 | 15, or 31 | 63, or 127 |
| 63 | 127, or 255 | 63, or 127 | 63, or 127 |
| 24 | 31, or 63 | 15, or 31 | 127, or 255 |
| 72 | 127, or 255 | 63, or 127 | 63, or 127 |

If the DMRS REs are not evenly distributed, there can be multiple NR-DMRS sequences mapped to the REs for DMRS transmission (length of NR-DMRS sequences can be the same or different). For each of them, denoting the number of REs as $N_{DMRS}$, then same principle above can be utilized to calculate the actual sequence length of sequences that generate DMRS sequence. For example, the following sequence lengths in TABLE 3A and TABLE 3B (for product and BPSK modulation based construction methods in Component II) and TABLE 4A and TABLE 4B (for QPSK modulation based construction methods in Component II) are considered for uneven RE mapping of NR-DMRS sequences.

TABLE 3A

| NR-DMRS design | | | | |
|---|---|---|---|---|
| NR-DMRS Overhead Ratio | Number of REs for the partial bandwidth | Number of Symbols | Whether Using Repetition | $N_{DMRS}$ |
| ⅓ | 144 | 2 | Yes | 48 |
| ⅓ | 144 | 2 | No | 96 or 97 |
| ¼ | 144 | 2 | Yes | 36 |
| ¼ | 144 | 2 | No | 72 or 73 |
| ⅙ | 144 | 2 | Yes | 24 |
| ⅙ | 144 | 2 | No | 48 or 49 |
| ⅓ | 72 | 2 | Yes | 24 |
| ⅓ | 72 | 2 | No | 48 or 49 |
| ¼ | 72 | 2 | Yes | 18 |
| ¼ | 72 | 2 | No | 36 or 37 |
| ⅙ | 72 | 2 | Yes | 12 |
| ⅙ | 72 | 2 | No | 24 or 25 |
| ⅓ | 127 | 2 | Yes | 42 |
| ⅓ | 127 | 2 | No | 84 or 85 |
| ¼ | 127 | 2 | Yes | 31 |
| ¼ | 127 | 2 | No | 62 or 63 |
| ⅙ | 127 | 2 | Yes | 21 |
| ⅙ | 127 | 2 | No | 42 or 43 |
| ⅓ | 161 | 2 | Yes | 53 |
| ⅓ | 161 | 2 | No | 106 or 107 |
| ¼ | 161 | 2 | Yes | 40 |
| ¼ | 161 | 2 | No | 80 or 81 |
| ⅙ | 161 | 2 | Yes | 26 |
| ⅙ | 161 | 2 | No | 52 or 53 |

TABLE 3B

| NR-DMRS design | | | |
|---|---|---|---|
| $L_{DMRS}$ for ZC-sequence with cyclic shifts | $L_{DMRS}$ for M-sequence with cyclic shifts | $L_{DMRS}$ for interleaved M-sequences | $L_{DMRS}$ for Gold-sequence with cyclic shifts |
| 47, or 49 | 31, or 63 | 15, or 31 | 31, or 63 |
| 95, or 97 | 63, or 127 | 31, or 63 | 63, or 127 |
| 35, or 37 | 31, or 63 | 15, or 31 | 31, or 63 |
| 71, or 73 | 63, or 127 | 31, or 63 | 63, or 127 |
| 23, or 25 | 15, or 31 | 7, or 15 | 15, or 31 |
| 47, or 49 | 31, or 63 | 15, or 31 | 31, or 63 |
| 23, or 25 | 15, or 31 | 7, or 15 | 15, or 31 |
| 47, or 49 | 31, or 63 | 15, or 31 | 31, or 63 |
| 17, or 19 | 15, or 31 | 7, or 15 | 15, or 31 |
| 35, or 37 | 31, or 63 | 15, or 31 | 31, or 63 |
| 11, or 13 | 7, or 15 | 3, or 7 | 7, or 15 |
| 23, or 25 | 15, or 31 | 7, or 15 | 15, or 31 |
| 41, or 43 | 31, or 63 | 15, or 31 | 31, or 63 |
| 83, or 85 | 63, or 127 | 31, or 63 | 63, or 127 |
| 31, or 31 | 31, or 31 | 15, or 15 | 31, or 31 |
| 61, or 63 | 31, or 63 | 15, or 31 | 31, or 63 |
| 21, or 21 | 15, or 31 | 7, or 15 | 15, or 31 |
| 41, or 43 | 31, or 63 | 15, or 31 | 31, or 63 |
| 53, or 53 | 31, or 63 | 15, or 31 | 31, or 63 |
| 105, or 107 | 63, or 127 | 31, or 63 | 63, or 127 |
| 39, or 41 | 31, or 63 | 15, or 31 | 31, or 63 |
| 79, or 81 | 63, or 127 | 31, or 63 | 31, or 63 |
| 25, or 27 | 15, or 31 | 7, or 15 | 15, or 31 |
| 51, or 53 | 31, or 63 | 15, or 31 | 31, or 63 |

TABLE 4A

| NR-DMRS design | | | | |
|---|---|---|---|---|
| NR-DMRS Overhead Ratio | Number of REs for the partial bandwidth | Number of Symbols | Whether Using Repetition | $N_{DMRS}$ |
| ⅓ | 144 | 2 | Yes | 48 |
| ⅓ | 144 | 2 | No | 96 or 97 |

TABLE 4A-continued

| NR-DMRS design | | | | |
|---|---|---|---|---|
| NR-DMRS Overhead Ratio | Number of REs for the partial bandwidth | Number of Symbols | Whether Using Repetition | $N_{DMRS}$ |
| ¼ | 144 | 2 | Yes | 36 |
| ¼ | 144 | 2 | No | 72 or 73 |
| ⅙ | 144 | 2 | Yes | 24 |
| ⅙ | 144 | 2 | No | 48 or 49 |
| ⅓ | 72 | 2 | Yes | 24 |
| ⅓ | 72 | 2 | No | 48 or 49 |
| ¼ | 72 | 2 | Yes | 18 |
| ¼ | 72 | 2 | No | 36 or 37 |
| ⅙ | 72 | 2 | Yes | 12 |
| ⅙ | 72 | 2 | No | 24 or 25 |
| ⅓ | 127 | 2 | Yes | 42 |
| ⅓ | 127 | 2 | No | 84 or 85 |
| ¼ | 127 | 2 | Yes | 31 |
| ¼ | 127 | 2 | No | 62 or 63 |
| ⅙ | 127 | 2 | Yes | 21 |
| ⅙ | 127 | 2 | No | 42 or 43 |
| ⅓ | 161 | 2 | Yes | 53 |
| ⅓ | 161 | 2 | No | 106 or 107 |
| ¼ | 161 | 2 | Yes | 40 |
| ¼ | 161 | 2 | No | 80 or 81 |
| ⅙ | 161 | 2 | Yes | 26 |
| ⅙ | 161 | 2 | No | 52 or 53 |

TABLE 4B

| NR-DMRS design | | | |
|---|---|---|---|
| $N_{DMRS}$ | $L_{DMRS}$ for M-sequence with cyclic shifts | $L_{DMRS}$ for interleaved M-sequences | $L_{DMRS}$ for Gold-sequence with cyclic shifts |
| 48 | 63, or 127 | 31, or 63 | 63, or 127 |
| 96 or 97 | 127, or 255 | 63, or 127 | 127, or 255 |
| 36 | 63, or 127 | 31, or 63 | 63, or 127 |
| 72 or 73 | 127, or 255 | 63, or 127 | 127, or 255 |
| 24 | 31, or 63 | 15, or 31 | 31, or 63 |
| 48 or 49 | 63, or 127 | 31, or 63 | 63, or 127 |
| 24 | 31, or 63 | 15, or 31 | 31, or 63 |
| 48 or 49 | 63, or 127 | 31, or 63 | 63, or 127 |
| 18 | 31, or 63 | 15, or 31 | 31, or 63 |
| 36 or 37 | 63, or 127 | 31, or 63 | 63, or 127 |
| 12 | 15, or 31 | 7, or 15 | 15, or 31 |
| 24 or 25 | 31, or 63 | 15, or 31 | 31, or 63 |
| 42 | 63, or 127 | 31, or 63 | 63, or 127 |
| 84 or 85 | 127, or 255 | 63, or 127 | 127, or 255 |
| 31 | 31, or 63 | 31, or 31 | 31, or 63 |
| 62 or 63 | 63, or 127 | 31, or 63 | 63, or 127 |
| 21 | 31, or 63 | 15, or 31 | 31, or 63 |
| 42 or 43 | 63, or 127 | 31, or 63 | 63, or 127 |
| 53 | 63, or 127 | 31, or 63 | 63, or 127 |
| 106 or 107 | 127, or 255 | 63, or 127 | 127, or 255 |
| 40 | 63, or 127 | 31, or 63 | 63, or 127 |
| 80 or 81 | 127, or 255 | 63, or 127 | 127, or 255 |
| 26 | 31, or 63 | 15, or 31 | 31, or 63 |
| 52 or 53 | 63, or 127 | 31, or 63 | 63, or 127 |

In some embodiments of aspect VIII for mapping of NR-DMRS, NR-DMRS can be mapped into consecutive REs with the same symbol as NR-PBCH within the resource grid (FDMed with NR-PBCH). For example, they can be mapped in the center of NR-SS transmission bandwidth. In another embodiment, NR-DMRS can be mapped into a separate symbol within the resource grid (TDMed with PBCH). In yet another embodiment, NR-DMRS can be mapped into non-consecutive REs with the same symbol as NR-PBCH within the resource grid (IFDMed with NR-PBCH). For example, they can be mapped uniformly and interleaved with NR-PBCH REs.

In one sub-embodiment, NR-DMRS sequence can be mapped identically to multiple symbols in time domain. In another sub-embodiment, NR-DMRS sequence can be mapped identically to multiple group of PRBs in frequency domain. For example, if the DMRS REs are evenly distributed, one copy of the NR-DMRS sequence is mapped into the center part of the bandwidth (e.g. central 12 PRBs), and another copy of the NR-DMRS sequence is mapped into the remaining part of the bandwidth (e.g. remaining 12 PRBs). For another example, if the DMRS RES are not evenly distributed (e.g. the density within central 12 PRBs is 1/X of the one within the remaining 12 PRBs), one copy of the NR-DMRS sequence is mapped into the center part of the bandwidth (e.g. central 12 PRBs), and X copies are mapped into the remaining part of the bandwidth (e.g. remaining 12 PRBs, and one particular example is mapping two copies to the above and below 6 PRBs correspondingly when X=2).

In another sub-embodiment, NR-DMRS sequence can be mapped identically to multiple group of PRBs in frequency domain, but using different phase rotations. For example, if the DMRS REs are evenly distributed, one copy of the NR-DMRS sequence is mapped into the center part of the bandwidth (e.g. central 12 PRBs), and another copy of the NR-DMRS sequence with phase rotation of $\pi$ (equivalent as opposite value of original sequence) is mapped into the remaining part of the bandwidth (e.g. remaining 12 PRBs). For another example, if the DMRS RES are not evenly distributed (e.g. the density within central 12 PRBs is 1/X of the one within the remaining 12 PRBs), one copy of the NR-DMRS sequence is mapped into the center part of the bandwidth (e.g. central 12 PRBs), and X copies with phase rotations are mapped into the remaining part of the bandwidth (e.g. remaining 12 PRBs, and one particular example is mapping two copies to the above and below 6 PRBs correspondingly when X=2).

In yet another sub-embodiment, one NR-DMRS sequence can be mapped to partial of the NR-PBCH bandwidth (e.g. central 12 PRBs), and another NR-DMRS sequence carrying only cell ID information is mapped to the remaining of the bandwidth (Note that both of the NR-DMRS sequence designs are covered in the disclosure).

In yet another sub-embodiment, one NR-DMRS sequence can be mapped to partial of the NR-PBCH bandwidth (e.g. central 12 PRBs), and another NR-DMRS sequence is mapped to the remaining of the bandwidth (Note that the two NR-DMRS sequences may or may not be the same, and both of the NR-DMRS sequence designs are covered in the disclosure).

In yet another sub-embodiment, if the DMRS RES are not evenly distributed (e.g. the density within central 12 PRBs is 1/X of the one within the remaining 12 PRBs), one NR-DMRS sequence can be mapped to partial of the NR-PBCH bandwidth (e.g. central 12 PRBs), and another X copies of NR-DMRS sequence carrying only cell ID information are mapped to the remaining of the bandwidth (one particular example is mapping two copies to the above and below 6 PRBs correspondingly when X=2. Note that both of the NR-DMRS sequence designs are covered in the disclosure). In yet another sub-embodiment, multiple NR-DMRS sequences can be mapped to multiple symbols in time domain, where the multiple sequences are constructed in similar pattern and the only difference is timing information carried (e.g. symbol index information).

In this case, with the same overhead ratio of DMRS (e.g. $1/r_{DMRS}$), there can be $K=r_{DMRS}\cdot r_{DMRS}$ number of possible patterns for mapping, such that it can indicate up to K hypotheses. Combining with the hypotheses indicated by the NR-DMRS sequence itself, we can have the following sub-designs (the notations $L_1$ and $L_2$ correspond to $L_1=|U|$ and $L_2=|V|$ in Component II.A and Component II.B). Note that k (number of hypotheses carried by the IFDM multiplexing patterns, and $k \leq K$) can be 1 in all the following sub-embodiments, which means no IFDM multiplexing pattern is utilized for indicating hypotheses. Also note that the indication methods of SS block timing by $L_1$ and $L_2$ are detailed in Component II.A and Component II.B, and the number of timing hypotheses in the remaining of the disclosure means the remaining number of timing hypotheses (which is carried purely by NR-DMRS sequence itself) besides those already carried by the IFDM multiplexing patterns.

In one sub-embodiment, the IFDM multiplexing patterns can be utilized for indicating some of the timing hypotheses, e.g. SS block index within a SS burst, or SS block burst index within a SS block burst set, or SS block index within a SS burst set, or LBS of SFN, or 5 ms indication within a radio subframe, or the combination of above timing information and/or part of above timing information.

In one sub-embodiment, the IFDM multiplexing patterns can be utilized for indicating k cell ID hypotheses (or part of the cell ID hypotheses), and the NR-DMRS sequence is utilized to indicate up to $L_1 \cdot L_2$ cell-specific SS block timing hypotheses corresponding to the cell ID carried by the IFDM multiplexing pattern.

In another sub-embodiment, $(k, L_1, L_2)$ together is utilized to indicate SS block timing hypotheses, where k is utilized to indicate the SS burst index, and $(L_1, L_2)$ is utilized to indicate the SS block index within a SS burst (note that the design in Component II.A and Component II.B can still be utilized for different carrier frequencies, e.g. carrier frequency range A is 0 to 6 GHz, and carrier frequency range B is 6 to 60 GHz).

In yet another sub-embodiment, $(k, L_1, L_2)$ together is utilized to indicate SS block timing hypotheses, where $L_1$ is utilized to indicate the SS burst index, and $(k, L_2)$ is utilized to indicate the SS block index within a SS burst (note that the design in Component II.A and Component II.B can still be utilized for different carrier frequencies, e.g. carrier frequency range A is 0 to 6 GHz, and carrier frequency range B is 6 to 60 GHz).

In yet another sub-embodiment, $(k, L_1, L_2)$ together is utilized to indicate SS block timing hypotheses, where $L_2$ is utilized to indicate the SS burst index, and $(k, L_1)$ is utilized to indicate the SS block index within a SS burst (note that the design in Component II.A and Component II.B can still be utilized for different carrier frequencies, e.g. carrier frequency range A is 0 to 6 GHz, and carrier frequency range B is 6 to 60 GHz).

In yet another sub-embodiment, $(k, L_1, L_2)$ together is utilized to indicate SS block timing hypotheses, where k is utilized to indicate the number of SS block timing index hypotheses for carrier frequency range A (e.g. 0 to 6 GHz), and $(k, L_1, L_2)$ is utilized to indicate the number of SS block timing index hypotheses for carrier frequency range B (e.g. 6 to 60 GHz).

In yet another sub-embodiment, $(k, L_1, L_2)$ together is utilized to indicate SS block timing hypotheses, where $(k, L_1)$ is utilized to indicate the number of SS block timing index hypotheses for carrier frequency range A (e.g. 0 to 6 GHz), and $(k, L_1, L_2)$ is utilized to indicate the number of SS block timing index hypotheses for carrier frequency range B (e.g. 6 to 60 GHz). In yet another sub-embodiment, $(k, L_1, L_2)$ together is utilized to indicate SS block timing hypotheses, where $(k, L_2)$ is utilized to indicate the number of SS block timing index hypotheses for carrier frequency range A (e.g. 0 to 6 GHz), and $(k, L_1, L_2)$ is utilized to indicate the number of SS block timing index hypotheses for carrier frequency range B (e.g. 6 to 60 GHz).

In some embodiments of component II for sequence design for NR-DMRS, for example product based construction method, the sequence $s_{DMRS}(m)$ for generating NR-DMRS can be defined by a product of two subsequences $s_{DMRS}(m)=s_1(m)\cdot s_2(m) m=0, 1, \ldots, L_{DMRS}-1$. In another embodiment (BPSK modulation based construction method), the sequence $s_{DMRS}(m)$ for generating NR-DMRS can be defined by PBSK modulated signal c(n) $(0 \leq m \leq L_{DMRS}-1)$ with $s_{DMRS}(m)=1-2\cdot c(m)$, $c(m)=(s_1(m)+s_2(m)) \bmod 2$ $m=0, 1, \ldots, L_{DMRS}-1$.

In yet another embodiment (QPSK modulation based construction method), the sequence $s_{DMRS}(n)$ for generating NR-DMRS can be defined by QPSK modulated signal c(m) with truncating the last element or truncating the center element $$s_{DMRS}(n) = \frac{1-2\cdot c(2n)}{\sqrt{2}} + \frac{1-2\cdot c(2n+1)}{\sqrt{2}}$$

$$jn = 0, 1, \ldots, (L_{DMRS}-1)/2,$$

$$c(m) = (s_1(m) + s_2(m)) \bmod 2 m = 0, 1, \ldots, L_{DMRS}-1.$$

For all the above embodiments, functionalities of $s_1$ (m) and $s_2$ (m) can be as follows.

In one sub-embodiment, $s_1(m)$ carries the timing hypotheses, e.g. SS block index (whole or part of), and/or SS burst index (whole or part of), and/or LBS of SFN (e.g. one or two or three bits), and/or SS block timing location in a radio frame (i.e., first or second 5 ms within 10 ms radio frame if periodicity is 5 ms), and $s_2$ (m) carries the cell ID (or part of it) and/or UE ID and/or slot index and/or symbol index information.

In another sub-embodiment, $s_1(m)$ carries the part of the timing hypotheses, e.g. SS block index (whole or part of), and/or SS burst index (whole or part of), and/or LBS of SFN (e.g. one or two or three bits), and/or SS block timing location in a radio frame (i.e., first or second 5 ms within 10 ms radio frame if periodicity is 5 ms), and $s_2(m)$ carries the remaining part of timing hypotheses and/or cell ID (or part of it) and/or UE ID and/or slot index and/or symbol index information (For example, cell ID information is in the initial conditions, and timing hypotheses are in the cyclic shifts of the sequences).

In another sub-embodiment, $s_1(m)$ carries the part of the cell ID information, and $s_2(m)$ carries the remaining part of cell ID information and timing hypotheses, e.g. SS block index (whole or part of), and/or SS burst index (whole or part of), and/or LBS of SFN (e.g. one or two or three bits), and/or SS block timing location in a radio frame (i.e., first or second 5 ms within 10 ms radio frame if periodicity is 5 ms) (For example, cell ID information and timing hypotheses are carried in the initial conditions of the sequences).

In another sub-embodiment, both $s_1(m)$ and $s_2(m)$ carry the timing hypotheses, e.g. SS block index (whole or part of), and/or SS burst index (whole or part of), and/or LBS of SFN (e.g. one or two or three bits), and/or SS block timing location in a radio frame (i.e., first or second 5 ms within 10 ms radio frame if periodicity is 5 ms), and cell ID information (or part of it). For example, cell ID information is in the initial conditions, and timing hypotheses are in the cyclic shifts of the sequences. For another example, combination of cell ID information and timing hypotheses are in the initial condition of the sequences.

In another sub-embodiment, $s_1(m)$ is a constant sequence (e.g. 1 for product based embodiment and 0 for BPSK and QPSK modulation based embodiments) and $s_2(m)$ is a scrambling sequence carrying both the timing hypotheses (if applicable) (e.g. SS block index (whole or part of), and/or SS burst index (whole or part of), and/or LBS of SFN (e.g. one or two or three bits), and/or SS block timing location in a radio frame (i.e., first or second 5 ms within 10 ms radio frame if periodicity is 5 ms)) and the cell ID (or part of it) information.

In another sub-embodiment, $s_2(m)$ is a constant sequence (e.g. 1 for product based embodiment and 0 for BPSK and QPSK modulation based embodiments) and $s_1(m)$ carries the timing hypotheses (if applicable), e.g. SS block index (whole or part of), and/or SS burst index (whole or part of), and/or LBS of SFN (e.g. one or two or three bits), and/or SS block timing location in a radio frame (i.e., first or second 5 ms within 10 ms radio frame if periodicity is 5 ms). The cell ID information is carried by a common scrambling sequence for NR-DMRS and NR-PBCH.

The particular designs of the sequence $s_1(m)$ and $s_2(m)$ are as follow (note that the combination of different design options for $s_1$ (m) and $s_2$ (m) are supported).

In some embodiments of component II.A for sequence Design for $s_1(m)$, sequence $s_1$ (m) does not carry any timing information (equivalent as DMRS is only constructed by $s_2$ (m)), then $s_1(m)=1$ m=0, 1, . . . , $L_{DMRS}-1$. In another embodiment, sequence $s_1(m)$ carries the timing hypotheses, e.g. SS block index (whole or part of), and/or SS burst index (whole or part of), and/or LBS of SFN (e.g. one or two or three bits), and/or SS block timing location in a radio frame (i.e., first or second 5 ms within 10 ms radio frame if periodicity is 5 ms), then one of the following options can be utilized for defining $s_1(m)$ (also see design aspect V in Component I).

In one example of option 1 using ZC-sequence(s) with possible cyclic shift(s), sequence $s_1(m)$ is defined by $$s_1(m) = d_{ZC}^{(u)}((m+v)\bmod L_{DMRS})\quad m = 0, 1, \ldots, L_{DMRS}-1$$

$$s_2(m) = d_{ZC}^{(u)}((m+v)\bmod L_{DMRS})\quad m = 0, 1, \ldots, L_{DMRS}-1$$

where $$d_{ZC}^{(u)}(m) = e^{-j\frac{\pi u m(m+1)}{L_{DMRS}}}\quad m = 0, 1, \ldots, d_{ZC}^{(u)}(m)-1.$$

$L_{DMRS}$ is determined as in TABLE 1A, TABLE 1B, TABLE 2A, TABLE 2B, TABLE 3A, TABLE 3B, TABLE 4A, and TABLE 4B (corresponding column), and u is the root index of ZC-sequence with $u \in U$ ($1 \le u \le L_{DMRS}-1$), and v is the cyclic shift index with v E V ($0 \le v \le L_{DMRS}-1$). $|V| \cdot |U|$ is equal to or larger than the number of timing hypotheses carried by NR-DMRS.

Note that the number of timing hypotheses carried by NR-DMRS can be different for different carrier frequency ranges (also see design aspect V in component I). For instance, if the number of timing hypotheses carried by NR-DMRS for carrier frequency range A is smaller than the one for carrier frequency range B (e.g. carrier frequency range A is 0 to 6 GHz, and carrier frequency range B is 6 to 60 GHz). In this scenario, the corresponding design sub-options can be considered (using $V_A$ and $V_B$ for the corresponding sets of root indices, and $U_A$ and $U_B$ for the corresponding sets of cyclic shift indices). Note that the design sub-option can be generalized to more than two frequency ranges.

In one example of sub-option 1, $V_A=V_B$ and $U_A \subset U_B$, which means the same sequences are utilized, and different cyclic shifts are utilized for different frequency ranges. One particular example of this sub-option can be $|U_A|=1$, and $|U_B|$ is the multiplying difference between the number of hypotheses, which means $|V_A|$ number of sequences are utilized for carrier frequency range A without cyclic shift (equivalent as one default shift), and to carry higher number of hypotheses for carrier frequency range B, cyclic shifts on these $|V_A|$ number of sequences are utilized. Meanwhile, one special case of this example is $|V_A|=|V_B|=1$, which means no cyclic shift.

In one example of sub-option 2, $V_A \subset V_B$ and $U_A=U_B$, which means the same cyclic shifts are utilized, and different base sequences are utilized for different frequency ranges. One particular example of this sub-option can be $|V_A|=1$, and $|V_B|$ is the multiplying difference between the number of hypotheses, which means only one sequence is utilized for carrier frequency range A, and to carry higher number of hypotheses for carrier frequency range B, multiple sequences (with the same cyclic shifts) are utilized. Meanwhile, one special case of this example is $|U_A|=|U_B|=1$, which means only one ZC-sequence is utilized. Another special case of this example is $|U_A|=|U_B|=2$, which means two ZC-sequences are utilized, and they can be using conjugate roots.

In one example of sub-option 3, $V_A \subset V_B$ and $U_A \subset U_B$, which means the both cyclic shifts and base sequences can be different for different frequency ranges.

In another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can be common for both carrier frequencies, and the remaining timing hypotheses are carried by other signal/channel (e.g. NR-SSS or NR-PBCH) implicitly or explicitly. For example, if 8 timing hypotheses for frequency range A, and 64 timing hypotheses for frequency range B, then a common DMRS-sequence design carrying 2/4/8 timing hypotheses can be used for both carrier frequencies.

In yet another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can reflect the differences on the number of hypotheses, and carrying method for the remaining timing hypotheses by other signal/channel (e.g. NR-SSS or NR-PBCH implicitly or explicitly) if common. For example, if 8 timing hypotheses for frequency range A, and 64 timing hypotheses for frequency range B, then 8/4/2/1 hypotheses are carried by DMRS in frequency range A, and 64/32/16/8 hypotheses are carried by DMRS in frequency range B (note that the corresponding ratio of the number of hypotheses is fixed), and the remaining 1/2/4/8 hypotheses are carried by other signal/channel.

Note that the above embodiments can be combined when the number of hypotheses carried by DMRS are different for more than 2 carrier frequency ranges. For example, if DMRS carries 4 timing hypotheses for carrier frequency range A (0 to 3 GHz), 8 timing hypotheses for carrier frequency range B (3 to 6 GHz), and 64 timing hypotheses for carrier frequency range C (6 to 60 GHz), the following design for DMRS can be considered: common DMRS sequence design carrying 4 hypotheses, and the remaining hypotheses for range B and C are carried by other signal/channel; common DMRS sequence design carrying 2 hypotheses, and the remaining hypotheses for range A, B and C are carried by other signal/channel; common DMRS sequence design carrying 8 hypotheses for range B and C, the DMRS sequence design carrying 4 hypotheses for range A (a subset of sequences comparing with range B and C); separate DMRS design for each carrier frequency, and the sequences for range A is a subset of sequences for range B, and the sequences for range B is a subset of sequences for range C.

In one example of option 2 using M-sequence(s) with possible cyclic shift(s), sequence $s_1$ (m) is defined by M-sequence(s) with cyclic shift(s) (Note that for product based construction method, $s_1(m)$ is defined by BPSK modulated M-sequence(s) with cyclic shift(s)) $s_1(m)=d_M^{(u)}((m+v) \bmod L_{DMRS})$ $m=0, 1, \ldots, L_{DMRS}-1$ where $L_{DMRS}$ is determined as in TABLE 1A, TABLE 1B, TABLE 2A, TABLE 2B, TABLE 3A, TABLE 3B, TABLE 4A, and TABLE 4B (corresponding column), and u is the number index of M-sequence for sequence length $L_{DMRS}$ with $u \in U$, and v is the cyclic shift index with $v \in V$ $(0 \le v \le L_{DMRS}-1)$. $|V| \cdot |U|$ is equal to or larger than the number of timing hypotheses carried by NR-DMRS. $d_M^{(u)}(m)$ refers to the uth M-sequence with length $L_{DMRS}$, and it can be selected from TABLE 5, TABLE 6, TABLE 7, TABLE 8, and TABLE 9 for $L_{DMRS}$ as 255, 127, 63, 31, 15, correspondingly, and the initial condition is $d_M^{(u)}(0)= \ldots =d_M^{(u)}(p_{DMRS}-2)=0$ and $d_M^{(u)}(p_{DMRS}-1)=1$, where $p_{DMRS}$ $\log(L_{DMRS}+1)$. V and U are determined by the sequence length (i.e., $L_{DMRS}$) as well as the number of hypotheses carried by DMRS (i.e., $N_{hyp}$). For example, $V=\{0, \ldots, L_{DMRS}-1\}$, and $|U|=\lceil N_{hyp}/L_{DMRS} \rceil$. For another example, only one M-sequence generator is utilized, e.g. $|U|=1$, and different cyclic shifts are utilized to represent the timing hypothesis, e.g. $V=\{0, \ldots, N_{hyp}-1\}$. In this example, it can be $U=\{2\}$ or $\{3\}$ for $L_{DMRS}=31$, $U=\{2\}$ or $\{4\}$ for $L_{DMRS}=63$, $U=\{2\}$ or $\{3\}$ or $\{4\}$ or $\{6\}$ for $L_{DMRS}=127$.

TABLE 5

| Recursive construction method | | | |
|---|---|---|---|
| u | Recursive construction method | Corresponding polynomial | Corresponding taps of register |
| 1 | $d_M(i+8) = [d_M(i+7) + d_M(i+6) + d_M(i+1) + d_M(i)] \bmod 2,\ 0 \le i \le 246$ | $x^8 + x^7 + x^6 + x + 1$ | [1, 2, 7, 8] |
| 2 | $d_M(i+8) = [d_M(i+7) + d_M(i+2) + d_M(i+1) + d_M(i)] \bmod 2,\ 0 \le i \le 246$ | $x^8 + x^7 + x^2 + x + 1$ | [1, 6, 7, 8] |
| 3 | $d_M(i+8) = [d_M(i+7) + d_M(i+5) + d_M(i+3) + d_M(i)] \bmod 2,\ 0 \le i \le 246$ | $x^8 + x^7 + x^5 + x^3 + 1$ | [1, 3, 5, 8] |
| 4 | $d_M(i+8) = [d_M(i+5) + d_M(i+3) + d_M(i+1) + d_M(i)] \bmod 2,\ 0 \le i \le 246$ | $x^8 + x^5 + x^3 + x + 1$ | [3, 5, 7, 8] |
| 5 | $d_M(i+8) = [d_M(i+6) + d_M(i+5) + d_M(i+4) + d_M(i)] \bmod 2,\ 0 \le i \le 246$ | $x^8 + x^6 + x^5 + x^4 + 1$ | [2, 3, 4, 8] |
| 6 | $d_M(i+8) = [d_M(i+4) + d_M(i+3) + d_M(i+2) + d_M(i)] \bmod 2,\ 0 \le i \le 246$ | $x^8 + x^4 + x^3 + x^2 + 1$ | [4, 5, 6, 8] |
| 7 | $d_M(i+8) = [d_M(i+6) + d_M(i+5) + d_M(i+3) + d_M(i)] \bmod 2,\ 0 \le i \le 246$ | $x^8 + x^6 + x^5 + x^3 + 1$ | [2, 3, 5, 8] |
| 8 | $d_M(i+8) = [d_M(i+5) + d_M(i+3) + d_M(i+2) + d_M(i)] \bmod 2,\ 0 \le i \le 246$ | $x^8 + x^5 + x^3 + x^2 + 1$ | [3, 5, 6, 8] |
| 9 | $d_M(i+8) = [d_M(i+6) + d_M(i+5) + d_M(i+2) + d_M(i)] \bmod 2,\ 0 \le i \le 246$ | $x^8 + x^6 + x^5 + x^2 + 1$ | [2, 3, 6, 8] |
| 10 | $d_M(i+8) = [d_M(i+6) + d_M(i+3) + d_M(i+2) + d_M(i)] \bmod 2,\ 0 \le i \le 246$ | $x^8 + x^6 + x^3 + x^2 + 1$ | [2, 5, 6, 8] |
| 11 | $d_M(i+8) = [d_M(i+6) + d_M(i+5) + d_M(i+1) +$ | $x^8 + x^6 + x^5 + x + 1$ | [2, 3, 7, 8] |

TABLE 5-continued

| Recursive construction method | | | |
|---|---|---|---|
| u | Recursive construction method | Corresponding polynomial | Corresponding taps of register |
| | $d_M(i)]\bmod 2,\ 0 \le i \le 246$ | | |
| 12 | $d_M(i+8) = [d_M(i+7) + d_M(i+3) + d_M(i+2) + d_M(i)]\bmod 2,\ 0 \le i \le 246$ | $x^8 + x^7 + x^3 + x^2 + 1$ | [1, 5, 6, 8] |
| 13 | $d_M(i+8) = [d_M(i+7) + d_M(i+6) + d_M(i+5) + d_M(i+4) + d_M(i+2) + d_M(i)]\bmod 2,\ 0 \le i \le 246$ | $x^8 + x^7 + x^6 + x^5 + x^4 + x^2 + 1$ | [1, 2, 3, 4, 6, 8] |
| 14 | $d_M(i+8) = [d_M(i+6) + d_M(i+4) + d_M(i+3) + d_M(i+2) + d_M(i+1) + d_M(i)]\bmod 2,\ 0 \le i \le 246$ | $x^8 + x^6 + x^4 + x^3 + x^2 + x + 1$ | [2, 4, 5, 6, 7, 8] |
| 15 | $d_M(i+8) = [d_M(i+7) + d_M(i+6) + d_M(i+5) + d_M(i+2) + d_M(i+1) + d_M(i)]\bmod 2,\ 0 \le i \le 246$ | $x^8 + x^7 + x^6 + x^5 + x^2 + x + 1$ | [1, 2, 3, 6, 7, 8] |
| 16 | $d_M(i+8) = [d_M(i+7) + d_M(i+6) + d_M(i+3) + d_M(i+2) + d_M(i+1) + d_M(i)]\bmod 2,\ 0 \le i \le 246$ | $x^8 + x^7 + x^6 + x^3 + x^2 + x + 1$ | [1, 2, 5, 6, 7, 8] |

TABLE 6

| Recursive construction method | | | |
|---|---|---|---|
| u | Recursive construction method | Corresponding polynomial | Corresponding taps of register |
| 1 | $d_M(i+7) = [d_M(i+6) + d_M(i)]\bmod 2,\ 0 \le i \le 119$ | $x^7 + x^6 + 1$ | [1, 7] |
| 2 | $d_M(i+7) = [d_M(i+1) + d_M(i)]\bmod 2,\ 0 \le i \le 119$ | $x^7 + x + 1$ | [6, 7] |
| 3 | $d_M(i+7) = [d_M(i+4) + d_M(i)]\bmod 2,\ 0 \le i \le 119$ | $x^7 + x^4 + 1$ | [3, 7] |
| 4 | $d_M(i+7) = [d_M(i+3) + d_M(i)]\bmod 2,\ 0 \le i \le 119$ | $x^7 + x^3 + 1$ | [4, 7] |
| 5 | $d_M(i+7) = [d_M(i+6) + d_M(i+5) + d_M(i+4) + d_M(i)]\bmod 2,\ 0 \le i \le 119$ | $x^7 + x^6 + x^5 + x^4 + 1$ | [1, 2, 3, 7] |
| 6 | $d_M(i+7) = [d_M(i+3) + d_M(i+2) + d_M(i+1) + d_M(i)]\bmod 2,\ 0 \le i \le 119$ | $x^7 + x^3 + x^2 + x + 1$ | [4, 5, 6, 7] |
| 7 | $d_M(i+7) = [d_M(i+6) + d_M(i+5) + d_M(i+2) + d_M(i)]\bmod 2,\ 0 \le i \le 119$ | $x^7 + x^6 + x^5 + x^2 + 1$ | [1, 2, 5, 7] |
| 8 | $d_M(i+7) = [d_M(i+5) + d_M(i+2) + d_M(i+1) + d_M(i)]\bmod 2,\ 0 \le i \le 119$ | $x^7 + x^5 + x^2 + x + 1$ | [2, 5, 6, 7] |
| 9 | $d_M(i+7) = [d_M(i+5) + d_M(i+4) + d_M(i+3) + d_M(i)]\bmod 2,\ 0 \le i \le 119$ | $x^7 + x^5 + x^4 + x^3 + 1$ | [2, 3, 4, 7] |
| 10 | $d_M(i+7) = [d_M(i+4) + d_M(i+3) + d_M(i+2) + d_M(i)]\bmod 2,\ 0 \le i \le 119$ | $x^7 + x^4 + x^3 + x^2 + 1$ | [3, 4, 5, 7] |

TABLE 6-continued

| u | Recursive construction method | Corresponding polynomial | Corresponding taps of register |
|---|---|---|---|
| | Recursive construction method | | |
| 11 | $d_M(i+7) = [d_M(i+6) + d_M(i+4) + d_M(i+2) + d_M(i)] \bmod 2,\ 0 \le i \le 119$ | $x^7 + x^6 + x^4 + x^2 + 1$ | [1, 3, 5, 7] |
| 12 | $d_M(i+7) = [d_M(i+5) + d_M(i+3) + d_M(i+1) + d_M(i)] \bmod 2,\ 0 \le i \le 119$ | $x^7 + x^5 + x^3 + x + 1$ | [2, 4, 6, 7] |
| 13 | $d_M(i+7) = [d_M(i+6) + d_M(i+4) + d_M(i+1) + d_M(i)] \bmod 2,\ 0 \le i \le 119$ | $x^7 + x^6 + x^4 + x + 1$ | [1, 3, 6, 7] |
| 14 | $d_M(i+7) = [d_M(i+6) + d_M(i+3) + d_M(i+1) + d_M(i)] \bmod 2,\ 0 \le i \le 119$ | $x^7 + x^6 + x^3 + x + 1$ | [1, 4, 6, 7] |
| 15 | $d_M(i+7) = [d_M(i+5) + d_M(i+4) + d_M(i+3) + d_M(i+2) + d_M(i+1) + d_M(i)] \bmod 2,\ 0 \le i \le 119$ | $x^7 + x^5 + x^4 + x^3 + x^2 + x + 1$ | [2, 3, 4, 5, 6, 7] |
| 16 | $d_M(i+7) = [d_M(i+6) + d_M(i+5) + d_M(i+4) + d_M(i+3) + d_M(i+2) + d_M(i)] \bmod 2,\ 0 \le i \le 119$ | $x^7 + x^6 + x^5 + x^4 + x^3 + x^2 + 1$ | [1, 2, 3, 4, 5, 7] |
| 17 | $d_M(i+7) = [d_M(i+6) + d_M(i+5) + d_M(i+3) + d_M(i+2) + d_M(i+1) + d_M(i)] \bmod 2,\ 0 \le i \le 119$ | $x^7 + x^6 + x^5 + x^3 + x^2 + x + 1$ | [1, 2, 4, 5, 6, 7] |
| 18 | $d_M(i+7) = [d_M(i+6) + d_M(i+5) + d_M(i+4) + d_M(i+2) + d_M(i+1) + d_M(i)] \bmod 2,\ 0 \le i \le 119$ | $x^7 + x^6 + x^5 + x^4 + x^2 + x + 1$ | [1, 2, 3, 5, 6, 7] |

TABLE 7

| u | Recursive construction method | Corresponding polynomial | Corresponding taps of register |
|---|---|---|---|
| | Recursive construction method | | |
| 1 | $d_M(i+6) = [d_M(i+5) + d_M(i)] \bmod 2,\ 0 \le i \le 56$ | $x^6 + x^5 + 1$ | [1, 6] |
| 2 | $d_M(i+6) = [d_M(i+1) + d_M(i)] \bmod 2,\ 0 \le i \le 56$ | $x^6 + x + 1$ | [5, 6] |
| 3 | $d_M(i+6) = [d_M(i+5) + d_M(i+4) + d_M(i+1) + d_M(i)] \bmod 2,\ 0 \le i \le 56$ | $x^6 + x^5 + x^4 + x + 1$ | [1, 2, 5, 6] |
| 4 | $d_M(i+6) = [d_M(i+5) + d_M(i+2) + d_M(i+1) + d_M(i)] \bmod 2,\ 0 \le i \le 56$ | $x^6 + x^5 + x^2 + x + 1$ | [1, 4, 5, 6] |
| 5 | $d_M(i+6) = [d_M(i+5) + d_M(i+3) + d_M(i+2) + d_M(i)] \bmod 2,\ 0 \le i \le 56$ | $x^6 + x^5 + x^3 + x^2 + 1$ | [1, 3, 4, 6] |
| 6 | $d_M(i+6) = [d_M(i+4) + d_M(i+3) + d_M(i+1) + d_M(i)] \bmod 2,\ 0 \le i \le 56$ | $x^6 + x^4 + x^3 + x + 1$ | [2, 3, 5, 6] |

TABLE 8

| u | Recursive construction method | Corresponding polynomial | Corresponding taps of register |
|---|---|---|---|
| | Recursive construction method | | |
| 1 | $d_M(i+5) = [d_M(i+3) + d_M(i)] \bmod 2,\ 0 \le i \le 27$ | $x^5 + x^3 + 1$ | [2, 5] |

TABLE 8-continued

| Recursive construction method | | | |
|---|---|---|---|
| u | Recursive construction method | Corresponding polynomial | Corresponding taps of register |
| 2 | $d_M(i+5) = [d_M(i+3) + d_M(i)] \bmod 2,\ 0 \le i \le 27$ | $x^5 + x^2 + 1$ | [3, 5] |
| 3 | $d_M(i+5) = [d_M(i+4) + d_M(i+3) + d_M(i+2) + d_M(i)] \bmod 2,\ 0 \le i \le 27$ | $x^5 + x^4 + x^3 + x^2 + 1$ | [1, 2, 3, 5] |
| 4 | $d_M(i+5) = [d_M(i+3) + d_M(i+2) + d_M(i+1) + d_M(i)] \bmod 2,\ 0 \le i \le 27$ | $x^5 + x^3 + x^2 + x + 1$ | [2, 3, 4, 5] |
| 5 | $d_M(i+5) = [d_M(i+4) + d_M(i+3) + d_M(i+1) + d_M(i)] \bmod 2,\ 0 \le i \le 27$ | $x^5 + x^4 + x^3 + x + 1$ | [1, 2, 4, 5] |
| 6 | $d_M(i+5) = [d_M(i+4) + d_M(i+2) + d_M(i+1) + d_M(i)] \bmod 2,\ 0 \le i \le 27$ | $x^5 + x^4 + x^2 + x + 1$ | [1, 3, 4, 5] |

TABLE 9

| Recursive construction method | | | |
|---|---|---|---|
| u | Recursive construction method | Corresponding polynomial | Corresponding taps of register |
| 1 | $d_M(i+4) = [d_M(i+3) + d_M(i)] \bmod 2,\ 0 \le i \le 12$ | $x^4 + x^3 + 1$ | [1, 4] |
| 2 | $d_M(i+4) = [d_M(i+3) + d_M(i)] \bmod 2,\ 0 \le i \le 12$ | $x^4 + x + 1$ | [3, 4] |

In one embodiment, note that the number of timing hypotheses carried by NR-DMRS can be different for different carrier frequency ranges (also see design aspect V in component I). For instance, if the number of timing hypotheses carried by NR-DMRS for carrier frequency range A is smaller than the one for carrier frequency range B (e.g. carrier frequency range A is 0 to 6 GHz, and carrier frequency range B is 6 to 60 GHz). In this scenario, the corresponding design sub-options can be considered (using $V_A$ and $V_B$ for the corresponding sets of root indices, and $U_A$ and $U_B$ for the corresponding sets of cyclic shift indices). Note that the design sub-option can be generalized to more than two frequency ranges.

In one example of sub-option 1, $V_A=V_B$ and $U_A \subset U_B$, which means the same sequences are utilized, and different cyclic shifts are utilized for different frequency ranges. One particular example of this sub-option can be $|U_A|=1$, and $|U_B|$ is the multiplying difference between the number of hypotheses, which means $|V_A|$ number of sequences are utilized for carrier frequency range A without cyclic shift (equivalent as one default shift), and to carry higher number of hypotheses for carrier frequency range B, cyclic shifts on these $|V_A|$ number of sequences are utilized. Meanwhile, one special case of this example is $|V_A|=|V_B|=1$, which means no cyclic shift. For example, if 8 timing hypotheses for frequency range A, and 64 timing hypotheses for frequency range B, then for carrier frequency range A, 8 M-sequence with no shift is utilized, and for carrier frequency range B, 8 M-sequences (same as range A) where each with 8 shifts are utilized.

In one example of sub-option 2, $V_A \subset V_B$ and $U_A=U_B$, which means the same cyclic shifts are utilized, and different base sequences are utilized for different frequency ranges. One particular example of this sub-option can be $|V_A|=1$, and $|V_B|$ is the multiplying difference between the number of hypotheses, which means only one sequence is utilized for carrier frequency range A, and to carry higher number of hypotheses for carrier frequency range B, multiple sequences (with the same cyclic shifts) are utilized. Meanwhile, one special case of this example is $|U_A|=|U_B|=1$, which means only one M-sequence is utilized. For example, if 8 timing hypotheses for frequency range A, and 64 timing hypotheses for frequency range B, then for carrier frequency range A, 1 M-sequence with 8 shifts is utilized, and for carrier frequency range B, 8 M-sequences where each with 8 shifts (same as range A) are utilized.

In one example of sub-option 3, $V_A \subset V_B$ and $U_A \subset U_B$, which means the both cyclic shifts and base sequences can be different for different frequency ranges.

In another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can be common for both carrier frequencies, and the remaining timing hypotheses are carried by other signal/channel (e.g. NR-SSS or NR-PBCH) implicitly or explicitly. For example, if 8 timing hypotheses for frequency range A, and 64 timing hypotheses for frequency range B, then a common DMRS-sequence design carrying 2/4/8 timing hypotheses (e.g. 1 M-sequence with 2/4/8 shifts or 2/4/8 M-sequence with 1 shift) can be used for both carrier frequencies.

In yet another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can reflect the differences on the number of hypotheses, and carrying method for the remaining timing hypotheses by other signal/channel (e.g. NR-SSS or NR-PBCH implicitly or explicitly) if common. For example, if 8 timing hypotheses for frequency range A, and 64 timing hypotheses for frequency range B, then 8/4/2/1 hypotheses are carried by DMRS in frequency range A, and 64/32/16/8 hypotheses are carried by DMRS in frequency range B (note that the corresponding ratio of the number of hypotheses is fixed), and the remaining 1/2/4/8 hypotheses are carried by other signal/channel.

Note that the above embodiments can be combined when the number of hypotheses carried by DMRS is different for more than 2 carrier frequency ranges. For example, if DMRS carries 4 timing hypotheses for carrier frequency range A (0 to 3 GHz), 8 timing hypotheses for carrier frequency range B (3 to 6 GHz), and 64 timing hypotheses for carrier frequency range C (6 to 60 GHz), the following design for DMRS can be considered: common DMRS sequence design carrying 4 hypotheses (4 M-sequence with 1 shift, or 2 M-sequences with 2 shift, or 1 M-sequence with 4 shifts), and the remaining hypotheses for range B and C are carried by other signal/channel; common DMRS sequence design carrying 2 hypotheses (2 M-sequence with 1 shift, or 1 M-sequence with 2 shifts), and the remaining hypotheses for range A, B and C are carried by other signal/channel; common DMRS sequence design carrying 8 hypotheses for range B and C (8 M-sequence with 1 shift, or 2 M-sequences with 4 shift, or 4 M-sequences with 2 shifts, or 1 M-sequence with 8 shifts), the DMRS sequence design carrying 4 hypotheses for range A (either down-select M-sequence generators or shifts from the design for range B and C, i.e., a subset of sequences comparing with range B and C); and separate DMRS design for each carrier frequency, and the sequences for range A is a subset of sequences for range B, and the sequences for range B is a subset of sequences for range C (e.g. using the same M-sequence generator for three ranges, and the cyclic shifts for range A are a subset of the ones for range B, and cyclic shifts for range B are a subset of the ones for range C).

In one example of option 3 using interleaved M-sequences, sequence $s_1(m)$ is defined by two M-sequences (Note that for product based construction method, $s_1(m)$ is defined by two BPSK modulated M-sequences) $s_1(2m)=d_M^{(u_1)}((m+v)\bmod L_{DMRS})$ $m=0, 1, \ldots, L_{DMRS}-1$ and $s_1(2m+1)=d_M^{(u_2)}((m+v)\bmod L_{DMRS})m=0, 1, \ldots, L_{DMRS}-1$ where $L_{DMRS}$ is determined as in TABLE 1A, TABLE 1B, TABLE 2A, TABLE 2B, TABLE 3A, TABLE 3B, TABLE 4A, and TABLE 4B (corresponding column), and $u_1$ and $u_2$ are the number indices of M-sequences for sequence length $L_{DMRS}$, and v is the cyclic shift index with $v \in V$ $(0 \le v \le L_{DMRS}-1)$. $|V|^2$ is equal to or larger than the number of timing hypotheses carried by NR-DMRS. $d_M^{(u_1)}(m)$ and $d_M^{(u_2)}(m)$ refers to the $u_1$th and $u_2$th M-sequence with length $L_{DMRS}$, and it can be selected from TABLE 5, TABLE 6, TABLE 7, TABLE 8, TABLE 9, and TABLE 10 for $L_{DMRS}$ as 255, 127, 63, 31, 15, 7, correspondingly, and the initial condition is $d_M^{(u)}(0)= \ldots =d_M^{(u)}(p_{DMRS}-2)=0$ and $d_M^{(u)}(p_{DMRS}-1)=1$, where $p_{DMRS}=\log(L_{DMRS}+1)$.

TABLE 10

| Recursive construction method | | | |
|---|---|---|---|
| u | Recursive construction method | Corresponding polynomial | Corresponding taps of register |
| 1 | $d_M(i+3) = [d_M(i+2) + d_M(i)]\bmod 2,\ 0 \le i \le 5$ | $x^3 + x^2 + 1$ | [1, 3] |
| 2 | $d_M(i+3) = [d_M(i+1) + d_M(i)]\bmod 2,\ 0 \le i \le 5$ | $x^3 + x + 1$ | [2, 3] |

Note that the number of timing hypotheses carried by NR-DMRS can be different for different carrier frequency ranges (also see design aspect V in component I). For instance, if the number of timing hypotheses carried by NR-DMRS for carrier frequency range A is smaller than the one for carrier frequency range B (e.g. carrier frequency range A is 0 to 6 GHz, and carrier frequency range B is 6 to 60 GHz). In this scenario, one embodiment is setting $V_A \subset V_B$, where $V_A$ and $V_B$ are the corresponding sets of root indices for frequency range A and B).

In another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can be common for both carrier frequencies, and the remaining timing hypotheses are carried by other signal/channel (e.g. NR-SSS or NR-PBCH) implicitly or explicitly. For example, if 8 timing hypotheses for frequency range A, and 64 timing hypotheses for frequency range B, then a common DMRS-sequence design carrying 2/4/8 timing hypotheses can be used for both carrier frequencies.

In yet another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can reflect the differences on the number of hypotheses, and carrying method for the remaining timing hypotheses by other signal/channel (e.g. NR-SSS or NR-PBCH implicitly or explicitly) if common. For example, if 8 timing hypotheses for frequency range A, and 64 timing hypotheses for frequency range B, then 8/4/2/1 hypotheses are carried by DMRS in frequency range A, and 64/32/16/8 hypotheses are carried by DMRS in frequency range B (note that the corresponding ratio of the number of hypotheses is fixed), and the remaining 1/2/4/8 hypotheses are carried by other signal/channel.

Note that the above embodiments can be combined when the number of hypotheses carried by DMRS is different for more than 2 carrier frequency ranges. For example, if DMRS carries 4 timing hypotheses for carrier frequency range A (0 to 3 GHz), 8 timing hypotheses for carrier frequency range B (3 to 6 GHz), and 64 timing hypotheses for carrier frequency range C (6 to 60 GHz), the following design for DMRS can be considered: common DMRS sequence design carrying 4 hypotheses, and the remaining hypotheses for range B and C are carried by other signal/channel; common DMRS sequence design carrying 2 hypotheses, and the remaining hypotheses for range A, B and C are carried by other signal/channel; common DMRS sequence design carrying 8 hypotheses for range B and C, the DMRS sequence design carrying 4 hypotheses for range A (a subset of sequences comparing with range B and C); and separate DMRS design for each carrier frequency, and the sequences for range A is a subset of sequences for range B, and the sequences for range B is a subset of sequences for range C (e.g. using the same M-sequence generator for three ranges, and the cyclic shifts for range A are a subset of the ones for range B, and cyclic shifts for range B are a subset of the ones for range C).

In one example of option 4 using Gold-sequence with shifts (product of two BPSK modulated M-sequences and each with cyclic shifts), sequence $s_1(m)$ is defined by the product of two BPSK modulated M-sequence(s) with cyclic shift(s) $s_1(m)=(1-2*d_M^{(u1)}((m+v1)\bmod L_{DMRS}))\cdot(1-2*d_M^{(u2)}((m+v2)\bmod L_{DMRS}))$ $m=0, 1, \ldots, L_{DMRS}-1$ where $L_{DMRS}$ is determined as in TABLE 1A, TABLE 1B, TABLE 2A, TABLE 2B, TABLE 3A, TABLE 3B, TABLE 4A, and TABLE 4B (corresponding column), and u1, u2 are the number indices ($u1 \neq u2$) of M-sequence for sequence length $L_{DMRS}$, and v1, v2 are the cyclic shift indices with $v1 \in V1$ and $v2 \in V2$, where V1 and V2 are subsets of $\{0, \ldots, L_{DMRS}-1\}$. $|V1| \cdot |V2|$ is equal to or larger than the number of timing hypotheses carried by NR-DMRS. $d_M^{(ui)}(m)$ refers to the uith M-sequence with length $L_{DMRS}$, and it can be selected from TABLE 5, TABLE 6, TABLE 7, TABLE 8, TABLE 9, and TABLE 10 for $L_{DMRS}$ as 255, 127, 63, 31, 15, 7, correspondingly, and the initial condition is $d_M^{(ui)}(O)$ $d= \ldots =d_M^{(ui)}p_{DMRS}-2)=0$ and $d_M^{(ui)}(p_{DMRS}-1)=1$, where $p_{DMRS}=\log(L_{DMRS}+1)$. V1 and V2 are determined by the sequence length (i.e., $L_{DMRS}$) as well as the number of hypotheses carried by DMRS (i.e., $N_{hyp}$). For example, $V1=\{0, \ldots, L_{DMRS}-1\}$, and $V2=\{0, \ldots, \lceil N_{hyp}/L_{DMRS}\rceil\}$.

In one embodiment, the same M-sequence generators (i.e., u1, u2) are utilized to generate Gold sequence for different carrier frequency ranges.

In another embodiment, if the number of timing hypotheses carried by NR-DMRS can be different for different carrier frequency ranges (also see design aspect V in component I). For instance, if the number of timing hypotheses carried by NR-DMRS for carrier frequency range A is smaller than the one for carrier frequency range B (e.g. carrier frequency range A is 0 to 6 GHz, and carrier frequency range B is 6 to 60 GHz). In this scenario, the corresponding design sub-options can be considered (using V1A and $V_B$ and $U1_A$ and $U2_B$ for the corresponding sets of cyclic shift indices). Note that the design sub-option can be generalized to more than two frequency ranges.

In one instance of sub-option 1, $V1_A=V_B$ and $V2_A \subset V2_B$, or $V2_A=V2_B$ and $V1_A \subset V1_B$, which means one of the cyclic shift sets is a subset of the other carrier frequency range. In one instance of sub-option 2, $V1_A \subset V_B$ and $V2_A \subset V2_B$, means both of the cyclic shift sets are subsets of the other carrier frequency range.

In another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can be common for both carrier frequencies, and the remaining timing hypotheses are carried by other signal/channel (e.g. NR-SSS or NR-PBCH) implicitly or explicitly. For example, if 8 timing hypotheses for frequency range A, and 64 timing hypotheses for frequency range B, then a common DMRS-sequence design carrying 2/4/8 timing hypotheses can be used for both carrier frequencies.

In yet another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can reflect the differences on the number of hypotheses, and carrying method for the remaining timing hypotheses by other signal/channel (e.g. NR-SSS or NR-PBCH implicitly or explicitly) if common. For example, if 8 timing hypotheses for frequency range A, and 64 timing hypotheses for frequency range B, then 8/4/2/1 hypotheses are carried by DMRS in frequency range A, and 64/32/16/8 hypotheses are carried by DMRS in frequency range B (note that the corresponding ratio of the number of hypotheses is fixed), and the remaining 1/2/4/8 hypotheses are carried by other signal/channel.

Note that the above embodiments can be combined when the number of hypotheses carried by DMRS is different for more than 2 carrier frequency ranges. For example, if DMRS carries 4 timing hypotheses for carrier frequency range A (0 to 3 GHz), 8 timing hypotheses for carrier frequency range B (3 to 6 GHz), and 64 timing hypotheses for carrier frequency range C (6 to 60 GHz), the following design for DMRS can be considered: common DMRS sequence design carrying 4 hypotheses, and the remaining hypotheses for range B and C are carried by other signal/channel; common DMRS sequence design carrying 2 hypotheses, and the remaining hypotheses for range A, B and C are carried by other signal/channel; common DMRS sequence design carrying 8 hypotheses for range B and C, the DMRS sequence design carrying 4 hypotheses for range A (a subset of sequences comparing with range B and C); and separate DMRS design for each carrier frequency, and the sequences for range A is a subset of sequences for range B, and the sequences for range B is a subset of sequences for range C (e.g. using the same M-sequence generator and cyclic shift for three ranges as one of the M-sequence in Gold-sequence construction, and the cyclic shifts of the other M-sequence for range A are a subset of the ones for range B, and cyclic shifts of the other M-sequence for range B are a subset of the ones for range C).

In one example of option 5 using M-sequence(s) with different initial condition to represent timing hypotheses, sequence $s_1(m)$ is defined by M-sequence with different initial conditions (Note that for product based construction method, $s_1(m)$ is defined by BPSK modulated M-sequence(s) with different initial conditions) $s_1(m)=d_M^{(u)}(m)$ $m=0, 1, \ldots, L_{DMRS}-1$ where $L_{DMRS}$ is determined as in TABLE 1A, TABLE 1B, TABLE 2A, TABLE 2B, TABLE 3A, TABLE 3B, TABLE 4A, and TABLE 4B (corresponding column), and $d_M^{(u)}(m)$ refers to the uth M-sequence with length $L_{DMRS}$, and it can be selected from TABLE 5, TABLE 6, TABLE 7, TABLE 8, and TABLE 9 for $L_{DMRS}$ as 255, 127, 63, 31, 15, correspondingly, and the initial condition $[d_M^{(u)}(0), \ldots, d_M^{(u)}(p_{DMRS}-1)]$ is determined by the timing hypothesis carried in $s_1(m)$ as well as possible cell ID information if it is not fully carried by $s_2(m)$. In this example, it can be u=2 or 3 for $L_{DMRS}=31$, U=2 or 4 for $L_{DMRS}=63$, u=2 or 3 or 4 or 6 for $L_{DMRS}=127$.

In one embodiment, note that the number of timing hypotheses carried by NR-DMRS can be different for different carrier frequency ranges (also see design aspect V in component I). For instance, if the number of timing hypotheses carried by NR-DMRS for carrier frequency range A is smaller than the one for carrier frequency range B (e.g. carrier frequency range A is 0 to 6 GHz, and carrier frequency range B is 6 to 60 GHz). Then, the set of initial conditions for range A can be a subset of the set of initial conditions for range B.

In another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can be common for both carrier frequencies, and the remaining timing hypotheses are carried by other signal/channel (e.g. NR-SSS or NR-PBCH) implicitly or explicitly. For example, if 8 timing hypotheses for frequency range A, and 64 timing hypotheses for frequency range B, then a common DMRS-sequence design carrying 2/4/8 timing hypotheses (e.g. 1 M-sequence with 2/4/8 shifts or 2/4/8 M-sequence with 1 shift) can be used for both carrier frequencies.

In yet another embodiment, the number of timing hypotheses carried by NR-DMRS can be the same for different carrier frequency ranges (also see design aspect V in component I), although the number of timing hypotheses carried by SS block are different. For instance, if the number of timing hypotheses carried by SS block for carrier frequency range A is smaller than the one for carrier frequency range B (e.g. carrier frequency range A is 0 to 6 GHz, and carrier frequency range B is 6 to 60 GHz), then the DMRS sequence can reflect the differences on the number of hypotheses, and carrying method for the remaining timing hypotheses by other signal/channel (e.g. NR-SSS or NR-PBCH implicitly or explicitly) if common. For example, if 8 timing hypotheses for frequency range A, and 64 timing hypotheses for frequency range B, then 8/4/2/1 hypotheses are carried by DMRS in frequency range A, and 64/32/16/8 hypotheses are carried by DMRS in frequency range B (note that the corresponding ratio of the number of hypotheses is fixed), and the remaining 1/2/4/8 hypotheses are carried by other signal/channel.

Note that the above embodiments can be combined when the number of hypotheses carried by DMRS is different for more than 2 carrier frequency ranges. For example, if DMRS carries 4 timing hypotheses for carrier frequency range A (0 to 3 GHz), 8 timing hypotheses for carrier frequency range B (3 to 6 GHz), and 64 timing hypotheses for carrier frequency range C (6 to 60 GHz), the following design for DMRS can be considered: common DMRS sequence design carrying 4 hypotheses (4 different initial conditions), and the remaining hypotheses for range B and C are carried by other signal/channel; common DMRS sequence design carrying 2 hypotheses (2 different initial conditions), and the remaining hypotheses for range A, B and C are carried by other signal/channel; common DMRS sequence design carrying 8 hypotheses for range B and C (8 different initial conditions), the DMRS sequence design carrying 4 hypotheses for range A (down-select to 4 initial conditions); separate DMRS design for each carrier frequency, and the sequences for range A is a subset of sequences for range B, and the sequences for range B is a subset of sequences for range C.

In some embodiments of component II.B for sequence Design for $s_2(m)$, the NR-DMRS sequence only contains timing information, and the cell ID information is carried separately (e.g. by IDFM multiplexing pattern), and $s_2(m)=1$ $m=0, 1, \ldots, L_{DMRS}-1$.

In another embodiment, sequence $s_2(m)$ carries at least the cell ID (or part of it), and/or UE ID and/or slot index and/or symbol index information, and $$s_2(m) = \frac{1}{\sqrt{2}}(1 - 2 \cdot c(2m)) + j\frac{1}{\sqrt{2}}(1 - 2 \cdot c(2m+1))$$

where c(n) is a pseudo-random sequence constructed from gold sequence where $c(n)=(x_1(n)+x_2(n)) \bmod 2$ and $x_1(n)$, $x_2(n)$ are M-sequences with initial condition $c_{1,int}$ and $c_{2,int}$, respectively.

In one sub-embodiment, $c_{1,int}$ is a function of cell ID (or part of the cell ID, e.g. cell ID mod $L_{DMRS}$) only, and $c_{2,int}$ is fixed. In another sub-embodiment, both $c_{1,int}$ and $c_{2,int}$ are functions of cell ID (or part of the cell ID, e.g. cell ID mod $L_{DMRS}$).

In another embodiment, sequence $s_2$ (m) carries the cell ID (or part of it) and timing hypotheses, and $$s_2(m) = \frac{1}{\sqrt{2}}(1 - 2 \cdot c(2m)) + j\frac{1}{\sqrt{2}}(1 - 2 \cdot c(2m+1))$$

where c(n) is a pseudo-random sequence constructed from gold sequence where $c(n)=(x_1(n)+x_2(n)) \bmod 2$ and $x_1(n)$, $x_2(n)$ are M-sequences with initial condition $c_{1,int}$ and $c_{2,int}$, respectively.

In one sub-embodiment, $c_{1,int}$ is a function of cell ID (or part of the cell ID, e.g. cell ID mod $L_{DMRS}$) only, and $c_{2,int}$ is a function of timing hypotheses. In another sub-embodiment, $c_{1,int}$ is a function of cell ID (or part of the cell ID, e.g. cell ID mod $L_{DMRS}$) and timing hypotheses, and $c_{2,int}$ is fixed. In yet another sub-embodiment, both $c_{1,int}$ and $c_{2,int}$ are functions of cell ID (or part of the cell ID, e.g. cell ID mod $L_{DMRS}$) and timing hypotheses.

In yet another embodiment, sequence $s_2$ (m) carries the cell ID information (or part of it), and $s_2(m)$ is defined by M-sequence(s) with cyclic shift(s) $s_2(m)=d_M^{(u)}((m+v) \bmod L_{DMRS})$ $m=0, 1, \ldots, L_{DMRS}-1$ where $L_{DMRS}$ is determined as in TABLE 1A, TABLE 1B, TABLE 2A, TABLE 2B, TABLE 3A, TABLE 3B, TABLE 4A, and TABLE 4B (corresponding column), and u is the number index of M-sequence for sequence length $L_{DMRS}$ with $u \in U$, and v is the cyclic shift index with $v \in V$ $(0 \le v \le L_{DMRS}-1)$. $|V| \cdot |U|$ is equal to or larger than the number of cell ID carried by the scrambling sequence (note that it may not contain all the cell ID, but only a part of the information, e.g. LSB or HLS of cell ID). $d_M^{(u)}(m)$ refers to the uth M-sequence with length $L_{DMRS}$, and it can be selected from TABLE 5, TABLE 6, TABLE 7, TABLE 8, and TABLE 9 for $L_{DMRS}$ as 255, 127, 63, 31, 15, correspondingly, and the initial condition is $d_M^{(u)}(0)= \ldots =d_M^{(u)}(p_{DMRS}-2)=0$ and $d_M^{(u)}(p_{DMRS}-1)=1$, where $p_{DMRS}=\log(L_{DMRS}+1)$. For example, $V=\{0, \ldots, L_{DMRS}-1\}$, and $|U|=\lceil \overline{N}_{ID}/L_{DMRS} \rceil$, where $\overline{N}_{ID}$ is the number of cell IDs contained in the scrambling sequence (e.g. after truncation or wrapping around of actual cell ID). For another example, only one M-sequence generator is utilized, e.g. $|U|=1$, and different cyclic shifts are utilized to represent the timing hypothesis, e.g. $V=\{0, \ldots, \overline{N}_{ID}-1\}$. In this example, it can be $U=\{2\}$ or $\{3\}$ for $L_{DMRS}=31$, $U=(2)$ or $\{4\}$ for $L_{DMRS}=63$, $U=\{2\}$ or $\{3\}$ or $\{4\}$ or $\{6\}$ for $L_{DMRS}=127$.

In one sub-embodiment, if $s_1(m)$ also utilizes M-sequence(s) to construct, the generator(s) for $s_2(m)$ can be paired generator(s) to make $s_1(m)$, $s_2(m)$ Gold-sequence (i.e., the DMRS-sequence is based on Gold-sequence with potential cyclic shifts within each M-sequences and truncation). For example, if No. 2 generator is utilized for $s_1(m)$ with $L_{DMRS}=31$, No. 3 generator can be utilized for $s_2(m)$ (or swapped); if No. 2 generator is utilized for $s_1(m)$ with $L_{DMRS}$=63, No. 4 generator can be utilized for $s_2(m)$ (or swapped); if No. 2 generator is utilized for $s_1(m)$ with $L_{DMRS}$=127, No. 3 generator can be utilized for $s_2$ (m) (or swapped); if No. 4 generator is utilized for $s_1(m)$ with $L_{DMRS}$=127, No. 6 generator can be utilized for $s_2(m)$ (or swapped).

In yet another embodiment, sequence $s_2$ (m) carries the cell ID information (or part of it), and $s_2$ (m) is defined by M-sequence(s) with different initial conditions (Note that for product based construction method, $s_2(m)$ is defined by BPSK modulated M-sequence(s) with different initial conditions) $s_2(m)=d_M^{(u)}(m)$ m=0, 1, . . . , $L_{DMRS}-1$ where $L_{DMRS}$ is determined as in TABLE 1A, TABLE 1B, TABLE 2A, TABLE 2B, TABLE 3A, TABLE 3B, TABLE 4A, and TABLE 4B (corresponding column), and $d_M^{(u)}(m)$ refers to the uth M-sequence with length $L_{DMRS}$, and it can be selected from TABLE 5, TABLE 6, TABLE 7, TABLE 8, and TABLE 9 for $L_{DMRS}$ as 255, 127, 63, 31, 15, correspondingly, and the initial condition $[d_M^{(u)}(0), \ldots, d_M^{(u)}(p_{DMRS}-1)]$ is determined by the cell ID information carried by $s_2(m)$ as well as possible timing hypothesis not carried in $s_1(m)$. In this example, it can be u=2 or 3 for $L_{DMRS}$=31, u=2 or 4 for $L_{DMRS}$=63, u=2 or 3 or 4 or 6 for $L_{DMRS}$=127.

In one sub-embodiment, if $s_1(m)$ also utilizes M-sequence(s) to construct, the generator(s) for $s_2(m)$ can be paired generator(s) to make $s_1(m)\cdot s_2(m)$ Gold-sequence (i.e., the DMRS-sequence is based on Gold-sequence with potential cyclic shifts within each M-sequences and truncation). For example, if No. 2 generator is utilized for $s_1(m)$ with $L_{DMRS}$=31, No. 3 generator can be utilized for $s_2(m)$ (or swapped); if No. 2 generator is utilized for $s_1(m)$ with $L_{DMRS}$=63, No. 4 generator can be utilized for $s_2(m)$ (or swapped); if No. 2 generator is utilized for $s_1(m)$ with $L_{DMRS}$=127, No. 3 generator can be utilized for $s_2$ (m) (or swapped); if No. 4 generator is utilized for $s_1(m)$ with $L_{DMRS}$=127, No. 6 generator can be utilized for $s_2(m)$ (or swapped).

In yet another embodiment, sequence $s_2$ (m) carries both the cell ID information (or part of it) and part of the timing hypotheses, then the sequence design of $s_2(m)$ can use the same options as component II.A, and the hypotheses in component II.A refers to both the cell ID information (or part of it) and part of the timing hypotheses carried by $s_2$ (m). Note that the design option of $s_2$ (m) can be either the same or different from $s_1$ (m).

In one sub-embodiment, if both $s_1(m)$ and $s_2$ (m) are using M-sequence based options, their generator(s) can be paired generator(s) to make $s_1(m)\cdot s_2(m)$ Gold-sequence (i.e., the DMRS-sequence is based on Gold-sequence with potential cyclic shifts within each M-sequences and truncation). For example, if No. 2 generator is utilized for $s_1(m)$ with $L_{DMRS}$=31, No. 3 generator can be utilized for $s_2(m)$ (or swapped); if No. 2 generator is utilized for $s_1(m)$ with $L_{DMRS}$=63, No. 4 generator can be utilized for $s_2$ (m) (or swapped); if No. 2 generator is utilized for $s_1(m)$ with $L_{DMRS}$=127, No. 3 generator can be utilized for $s_2(m)$ (or swapped); if No. 4 generator is utilized for $s_1(m)$ with $L_{DMRS}$=127, No. 6 generator can be utilized for $s_2(m)$ (or swapped).

In some embodiments of component III for NR-DMRS sequence design examples, 288 REs for NR-PBCH and NR-DMRS in each OFDM symbol are considered and two symbols are utilized for NR-PBCH and NR-DMRS mapping.

The following designs for NR-DMRS sequences are supported. In one example of sequence option 1, BPSK modulated Gold-sequence constructed from a length-L M-sequence with A cyclic shifts and another length-L M-sequence with B cyclic shifts, then truncated to length N, the corresponding number of REs for NR-DMRS. In such example, A=8 for carrier frequency range [3 60] GHz, and A=4 for carrier frequency range [0 3] GHz; B=L where 1000 cell IDs are mapped to the L hypotheses (e.g. mod L). In such example, A=16 for carrier frequency range [6 60] GHz, A=8 for carrier frequency range [3 6] GHz, and A=4 for carrier frequency range [0 3] GHz; B=L where 1000 cell IDs are mapped to the L hypotheses (e.g. mod L). In such example, A=64 for carrier frequency range [3 60] GHz, and A=32 for carrier frequency range [0 3] GHz; B=L. 1000 cell IDs are mapped to hypotheses in both of the M-sequences. In such example, A=L for carrier frequency range [6 60] GHz, A=64 for carrier frequency range [3 6] GHz, and A=32 for carrier frequency range [0 3] GHz; B=L. 1000 cell IDs are mapped to hypotheses in both of the M-sequences.

In another example of sequence option 2, BPSK modulated Gold-sequence constructed from a length-L M-sequence with A cyclic shifts and another length-L M-sequence with B initial conditions, then truncated to length N, the corresponding number of REs for NR-DMRS. In such example, A=8 for carrier frequency range [3 60] GHz, and A=4 for carrier frequency range [0 3] GHz; B=1000 where 1000 cell IDs are mapped to the 1000 hypotheses. In such example, A=16 for carrier frequency range [6 60] GHz, A=8 for carrier frequency range [3 6] GHz, and A=4 for carrier frequency range [0 3] GHz; B=1000 where 1000 cell IDs are mapped to the 1000 hypotheses. In such example, A=1 for all carrier frequency ranges, and B=16000 for carrier frequency range [6 60] GHz, B=8000 for carrier frequency range [3 6] GHz, and B=4000 for carrier frequency range [0 3] GHz. The combination of timing hypotheses and cell IDs is mapped to different cyclic shifts. In such example, A=1 for all carrier frequency ranges, and B=8000 for carrier frequency range [3 60] GHz, and B=4000 for carrier frequency range [0 3] GHz. The combination of timing hypotheses and cell IDs is mapped to different cyclic shifts.

In yet another example of sequence option 3, BPSK modulated Gold-sequence constructed from a length-L M-sequence with A initial conditions and another length-L M-sequence with B initial conditions, then truncated to length N, the corresponding number of REs for NR-DMRS. In such example, A=8 for carrier frequency range [3 60] GHz, and A=4 for carrier frequency range [0 3] GHz; B=1000 where 1000 cell IDs are mapped to the 1000 hypotheses. In such example, A=16 for carrier frequency range [6 60] GHz, A=8 for carrier frequency range [3 6] GHz, and A=4 for carrier frequency range [0 3] GHz; B=1000 where 1000 cell IDs are mapped to the 1000 hypotheses. In such example, A=1 for all carrier frequency ranges, and B=16000 for carrier frequency range [6 60] GHz, B=8000 for carrier frequency range [3 6] GHz, and B=4000 for carrier frequency range [0 3] GHz. The combination of timing hypotheses and cell IDs is mapped to different cyclic shifts. In such example, A=1 for all carrier frequency ranges, and B=8000 for carrier frequency range [3 60] GHz, and B=4000 for carrier frequency range [0 3] GHz. The combination of timing hypotheses and cell IDs is mapped to different cyclic shifts.

In yet another example of sequence option 4, BPSK modulated Gold-sequence constructed from a length-L M-sequence without cyclic shift and another length-L M-sequence with B cyclic shifts or initial conditions, then truncated to length N, the corresponding number of REs for NR-DMRS. In such example, B=L when using cyclic shifts and B=1000 when using initial conditions.

In yet another example of sequence option 5, QPSK modulated Gold-sequence constructed from a length-L M-sequence with A cyclic shifts and another length-L M-sequence with B cyclic shifts, then truncated to length N, the corresponding number of REs for NR-DMRS. In such example, A=8 for carrier frequency range [3 60] GHz, and A=4 for carrier frequency range [0 3] GHz; B=L where 1000 cell IDs are mapped to the L hypotheses (e.g. mod L). In such example, A=16 for carrier frequency range [6 60] GHz, A=8 for carrier frequency range [3 6] GHz, and A=4 for carrier frequency range [0 3] GHz; B=L where 1000 cell IDs are mapped to the L hypotheses (e.g. mod L). In such example, A=64 for carrier frequency range [3 60] GHz, and A=32 for carrier frequency range [0 3] GHz; B=L. 1000 cell IDs are mapped to hypotheses in both of the M-sequences. In such example, A=L for carrier frequency range [6 60] GHz, A=64 for carrier frequency range [3 6] GHz, and A=32 for carrier frequency range [0 3] GHz; B=L. 1000 cell IDs are mapped to hypotheses in both of the M-sequences.

In yet another example of sequence option 6, QPSK modulated Gold-sequence constructed from a length-L M-sequence with A cyclic shifts and another length-L M-sequence with B initial conditions, then truncated to length N, the corresponding number of REs for NR-DMRS. In such example, A=8 for carrier frequency range [3 60] GHz, and A=4 for carrier frequency range [0 3] GHz; B=1000 where 1000 cell IDs are mapped to the 1000 hypotheses. In such example, A=16 for carrier frequency range [6 60] GHz, A=8 for carrier frequency range [3 6] GHz, and A=4 for carrier frequency range [0 3] GHz; B=1000 where 1000 cell IDs are mapped to the 1000 hypotheses. In such example, A=1 for all carrier frequency ranges, and B=16000 for carrier frequency range [6 60] GHz, B=8000 for carrier frequency range [3 6] GHz, and B=4000 for carrier frequency range [0 3] GHz. The combination of timing hypotheses and cell IDs is mapped to different cyclic shifts. In such example, A=1 for all carrier frequency ranges, and B=8000 for carrier frequency range [3 60] GHz, and B=4000 for carrier frequency range [0 3] GHz. The combination of timing hypotheses and cell IDs is mapped to different cyclic shifts.

In yet another example of sequence option 7, QPSK modulated Gold-sequence constructed from a length-L M-sequence with A initial conditions and another length-L M-sequence with B initial conditions, then truncated to length N, the corresponding number of REs for NR-DMRS. In such example, A=8 for carrier frequency range [3 60] GHz, and A=4 for carrier frequency range [0 3] GHz; B=1000 where 1000 cell IDs are mapped to the 1000 hypotheses. In such example, A=16 for carrier frequency range [6 60] GHz, A=8 for carrier frequency range [3 6] GHz, and A=4 for carrier frequency range [0 3] GHz; B=1000 where 1000 cell IDs are mapped to the 1000 hypotheses. In such example, A=1 for all carrier frequency ranges, and B=16000 for carrier frequency range [6 60] GHz, B=8000 for carrier frequency range [3 6] GHz, and B=4000 for carrier frequency range [0 3] GHz. The combination of timing hypotheses and cell IDs is mapped to different cyclic shifts. In such example, A=1 for all carrier frequency ranges, and B=8000 for carrier frequency range [3 60] GHz, and B=4000 for carrier frequency range [0 3] GHz. The combination of timing hypotheses and cell IDs is mapped to different cyclic shifts.

In yet another example of sequence option 8, QPSK modulated Gold-sequence constructed from a length-L M-sequence without cyclic shift and another length-L M-sequence with B cyclic shifts or initial conditions, then truncated to length N, the corresponding number of REs for NR-DMRS. In such example, B=L when using cyclic shifts and B=1000 when using initial conditions.

Note that in all above sequence options, the number of cell ID is assumed as 1000. If the number of cell ID is another number (e.g. N_ID is approximately 1000, but determined by NR-PSS and NR-SSS design), the value of 1000, 2000, 4000, 8000, and 16000 may be replaced by N_ID, 2*N_ID, 4*N_ID, 8*N_ID, 16*N_ID.

In some embodiments, the following design for RE mapping are supported (can be combined with one or more of the above sequence options). In one example of mapping option 1, ⅓ NR-DMRS overhead with even allocation in frequency domain, and NR-DMRS sequence is repeated in the two OFDM symbols. In this mapping option, following sequence can be used to be mapped into each of the repeated NR-DMRS sequences: NR-DMRS sequence option 1 or 2 or 3 or 4 with L=127 and N=96; and NR-DMRS sequence option 5 or 6 or 7 or 8 with L=255 and N=96

In one example of mapping option 2, ¼ NR-DMRS overhead with even allocation in frequency domain, and NR-DMRS sequence is repeated in the two OFDM symbols. In this mapping option, following sequence can be used to be mapped into each of the repeated NR-DMRS sequences: NR-DMRS sequence option 1 or 2 or 3 or 4 with L=127 and N=72; and NR-DMRS sequence option 5 or 6 or 7 or 8 with L=255 and N=72.

In one example of mapping option 3, ⅓ NR-DMRS overhead with even allocation in frequency domain, and NR-DMRS sequence is repeated in frequency domain (e.g. one copy mapped into the central 12 PRBs and the other copy mapped into the remaining 12 PRBs). In this mapping option, following sequence can be used to be mapped into each of the repeated NR-DMRS sequences: NR-DMRS sequence option 1 or 2 or 3 or 4 with L=127 and N=96; and NR-DMRS sequence option 5 or 6 or 7 or 8 with L=255 and N=96.

In one example of mapping option 4, ¼ NR-DMRS overhead with even allocation in frequency domain, and NR-DMRS sequence is repeated in frequency domain (e.g. one copy mapped into the central 12 PRBs and the other copy mapped into the remaining 12 PRBs). In this mapping option, following sequence can be used to be mapped into each of the repeated NR-DMRS sequences: NR-DMRS sequence option 1 or 2 or 3 or 4 with L=127 and N=72; and NR-DMRS sequence option 5 or 6 or 7 or 8 with L=255 and N=72.

In one example of mapping option 5, ⅓ NR-DMRS overhead with even allocation in frequency domain, and NR-DMRS sequence is repeated in both frequency domain and time domain (e.g. one copy mapped into the central 12 PRBs of the first symbol, one copy mapped into the central 12 PRBs of the second symbol, one copy mapped into the remaining 12 PRBs of the first symbol, and one copy mapped into the remaining 12 PRBs of the second symbol). In this mapping option, following sequence can be used to be mapped into each of the repeated NR-DMRS sequences: NR-DMRS sequence option 1 or 2 or 3 or 4 with L=63 and N=48; and NR-DMRS sequence option 5 or 6 or 7 or 8 with L=127 and N=48.

In one example of mapping option 6, ¼ NR-DMRS overhead with even allocation in frequency domain, and NR-DMRS sequence is repeated in both frequency domain and time domain (e.g. one copy mapped into the central 12 PRBs of the first symbol, one copy mapped into the central 12 PRBs of the second symbol, one copy mapped into the remaining 12 PRBs of the first symbol, and one copy mapped into the remaining 12 PRBs of the second symbol).

In this mapping option, following sequence can be used to be mapped into each of the repeated NR-DMRS sequences: NR-DMRS sequence option 1 or 2 or 3 or 4 with L=63 and N=36; and NR-DMRS sequence option 5 or 6 or 7 or 8 with L=127 and N=36.

In one example of mapping option 7, ⅓ NR-DMRS overhead with even allocation in frequency domain, and NR-DMRS sequence is repeated in an interleaved pattern (staggered pattern) in the two OFDM symbols (e.g. one copy mapped into even RE location in the first symbol and odd RE location in the second symbol, and the other copy mapped into odd RE location in the first symbol and even RE location in the second symbol). In this mapping option, following sequence can be used to be mapped into each of the repeated NR-DMRS sequences: NR-DMRS sequence option 1 or 2 or 3 or 4 with L=127 and N=96; and NR-DMRS sequence option 5 or 6 or 7 or 8 with L=255 and N=96.

In one example of mapping option 8, ¼ NR-DMRS overhead with even allocation in frequency domain, and NR-DMRS sequence is repeated in an interleaved pattern (staggered pattern) in the two OFDM symbols (e.g. one copy mapped into even RE location in the first symbol and odd RE location in the second symbol, and the other copy mapped into odd RE location in the first symbol and even RE location in the second symbol). In this mapping option, following sequence can be used to be mapped into each of the repeated NR-DMRS sequences: NR-DMRS sequence option 1 or 2 or 3 or 4 with L=127 and N=72; and NR-DMRS sequence option 5 or 6 or 7 or 8 with L=255 and N=72.

In one example of mapping option 9, ⅓ NR-DMRS overhead with even allocation in frequency domain, and one of the NR-DMRS sequences carrying timing hypotheses is mapped to the central part of the bandwidth (e.g. the central 12 PRBs), and the other NR-DMRS sequence not carrying timing hypotheses is mapped the remaining part of the bandwidth (e.g. the remaining 12 PRBs). In this mapping option, following sequence can be used: first NR-DMRS sequence uses option 1 or 2 or 3 with L=127 and N=96, or option 5 or 6 or 7 with L=255 and N=96; and second NR-DMRS sequence uses option 4 with L=127 and N=96, or option 8 with L=255 and N=96.

In one example of mapping option 10, ¼ NR-DMRS overhead with even allocation in frequency domain, and one of the NR-DMRS sequences carrying timing hypotheses is mapped to the central part of the bandwidth (e.g. the central 12 PRBs), and the other NR-DMRS sequence not carrying timing hypotheses is mapped the remaining part of the bandwidth (e.g. the remaining 12 PRBs). In this mapping option, following sequence can be used: first NR-DMRS sequence uses option 1 or 2 or 3 with L=127 and N=72, or option 5 or 6 or 7 with L=255 and N=72; and second NR-DMRS sequence uses option 4 with L=127 and N=72, or option 8 with L=255 and N=72.

In one example of mapping option 11, ⅓ NR-DMRS overhead with even allocation in frequency domain, and one of the NR-DMRS sequences carrying timing hypotheses is mapped to the central part of the bandwidth (e.g. the central 127 subcarriers, which is the same as NR-PSS and NR-SSS), and the other NR-DMRS sequence not carrying timing hypotheses is mapped the remaining part of the bandwidth. In this mapping option, following sequence can be used: first NR-DMRS sequence uses option 1 or 2 or 3 with L=127 and N=84 or 85, or option 5 or 6 or 7 with L=255 and N=84 or 85; and second NR-DMRS sequence uses option 4 with L=127 and N=84 or 85, or option 8 with L=255 and N=84 or 85.

In one example of mapping option 12, ¼ NR-DMRS overhead with even allocation in frequency domain, and one of the NR-DMRS sequences carrying timing hypotheses is mapped to the central part of the bandwidth (e.g. the central 127 subcarriers, which is the same as NR-PSS and NR-SSS), and the other NR-DMRS sequence not carrying timing hypotheses is mapped the remaining part of the bandwidth. In this mapping option, following sequence can be used: first NR-DMRS sequence uses option 1 or 2 or 3 with L=31 and N=31 or L=63 and N=32, or option 5 or 6 or 7 with L=63 and N=31 or L=127 and N=32; and second NR-DMRS sequence uses option 4 with L=31 and N=31 or L=63 and N=32, or option 8 with L=63 and N=31 or L=127 and N=32.

In one example of mapping option 13, ⅓ NR-DMRS overhead with even allocation in frequency domain, and single NR-DMRS sequence is mapped in the two OFDM symbols. In this mapping option, following sequence can be used: NR-DMRS sequence option 1 or 2 or 3 or 4 with L=255 and N=192; and NR-DMRS sequence option 5 or 6 or 7 or 8 with L=511 and N=192.

In one example of mapping option 14, ¼ NR-DMRS overhead with even allocation in frequency domain, and single NR-DMRS sequence is mapped in the two OFDM symbols. In this mapping option, following sequence can be used: NR-DMRS sequence option 1 or 2 or 3 or 4 with L=255 and N=144; and NR-DMRS sequence option 5 or 6 or 7 or 8 with L=511 and N=144.

In one example of mapping option 15, ⅓ NR-DMRS overhead with even allocation in frequency domain, and two NR-DMRS sequences are mapped in an interleaved pattern (staggered pattern) in the two OFDM symbols (e.g. one copy mapped into even RE location in the first symbol and odd RE location in the second symbol, and the other copy mapped into odd RE location in the first symbol and even RE location in the second symbol). The first NR-DMRS sequence carries timing hypothesis, while the second NR-DMRS sequence does not carry timing hypothesis. In this mapping option, following sequence can be used: first NR-DMRS sequence uses option 1 or 2 or 3 with L=127 and N=96, or option 5 or 6 or 7 with L=255 and N=96; and second NR-DMRS sequence uses option 4 with L=127 and N=96, or option 8 with L=255 and N=96.

In one example of mapping option 16, ¼ NR-DMRS overhead with even allocation in frequency domain, and two NR-DMRS sequences are mapped in an interleaved pattern (staggered pattern) in the two OFDM symbols (e.g. one copy mapped into even RE location in the first symbol and odd RE location in the second symbol, and the other copy mapped into odd RE location in the first symbol and even RE location in the second symbol). The first NR-DMRS sequence carries timing hypothesis, while the second NR-DMRS sequence does not carry timing hypothesis. In this mapping option, following sequence can be used: first NR-DMRS sequence uses option 1 or 2 or 3 with L=127 and N=72, or option 5 or 6 or 7 with L=255 and N=72; and second NR-DMRS sequence uses option 4 with L=127 and N=72, or option 8 with L=255 and N=72.

In one example of mapping option 17, ⅓ NR-DMRS overhead with even allocation in frequency domain, but only occupying the remaining 12 PRB (or 161 REs) except from the central 12 PRBs (or 127 REs where NR-PSS and NR-SSS are transmitted). NR-DMRS is repeated in two OFDM symbols. In this mapping option, following sequence can be used: NR-DMRS sequence option 1 or 2 or 3 or 4 with L=63 and N=48 (or 53); and NR-DMRS sequence option 5 or 6 or 7 or 8 with L=127 and N=48 (or 53).

In one example of mapping option 18, ¼ NR-DMRS overhead with even allocation in frequency domain, but only occupying the remaining 12 PRB (or 161 REs) except from the central 12 PRBs (or 127 REs where NR-PSS and NR-SSS are transmitted). NR-DMRS is repeated in two OFDM symbols. In this mapping option, following sequence can be used: NR-DMRS sequence option 1 or 2 or 3 or 4 with L=63 and N=36 (or 40); and NR-DMRS sequence option 5 or 6 or 7 or 8 with L=127 and N=36 (or 40).

In one example of mapping option 19, ¼ NR-DMRS overhead with even allocation in the central 12 PRBs (or 127 REs where NR-PSS and NR-SSS are transmitted) and ⅓ NR-DMRS overhead with even allocation in the remaining 12 PRBs (or 161 REs). DMRS sequence is repeated in two OFDM symbols, In this mapping option, following sequence can be used: NR-DMRS sequence option 1 or 2 or 3 or 4 with L=127 and N=84 (or 82); and NR-DMRS sequence option 5 or 6 or 7 or 8 with L=255 and N=84 (or 82).

In one example of mapping option 20, ⅙ NR-DMRS overhead with even allocation in the central 12 PRBs (or 127 REs where NR-PSS and NR-SSS are transmitted) and ⅓ NR-DMRS overhead with even allocation in the remaining 12 PRBs (or 161 REs). DMRS sequence is repeated in two OFDM symbols, In this mapping option, following sequence can be used: NR-DMRS sequence option 1 or 2 or 3 or 4 with L=127 and N=72 (or 68); and NR-DMRS sequence option 5 or 6 or 7 or 8 with L=255 and N=72 (or 68).

In one example of mapping option 21, ¼ NR-DMRS overhead with even allocation in the central 12 PRBs (or 127 REs where NR-PSS and NR-SSS are transmitted) and ⅓ NR-DMRS overhead with even allocation in the remaining 12 PRBs (or 161 REs). One DMRS sequence is mapped to the central 12 PRBs (or 127 REs) across two symbols, and the other is mapped into the remaining 12 PRBs (or 161 REs). In this mapping option, following sequence can be used: first sequence can use NR-DMRS sequence option 1 or 2 or 3 or 4 with L=127 and N=72 (or 80), or option 5 or 6 or 7 or 8 with L=255 and N=72 (or 80); and second sequence can use NR-DMRS sequence option 1 or 2 or 3 or 4 with L=127 and N=96 (or 84), or option 5 or 6 or 7 or 8 with L=255 and N=96 (or 84).

In one example of mapping option 22, ⅙ NR-DMRS overhead with even allocation in the central 12 PRBs (or 127 REs where NR-PSS and NR-SSS are transmitted) and ⅓ NR-DMRS overhead with even allocation in the remaining 12 PRBs (or 161 REs). One DMRS sequence is mapped to the central 12 PRBs (or 127 REs) across two symbols, and the other is mapped into the remaining 12 PRBs (or 161 REs). In this mapping option, following sequence can be used: first sequence can use NR-DMRS sequence option 1 or 2 or 3 or 4 with L=63 and N=48 (or 52), or option 5 or 6 or 7 or 8 with L=127 and N=48 (or 52); and second sequence can use NR-DMRS sequence option 1 or 2 or 3 or 4 with L=127 and N=96 (or 84), or option 5 or 6 or 7 or 8 with L=255 and N=96 (or 84).

In one example of mapping option 23, ⅙ NR-DMRS overhead with even allocation in the central 12 PRBs and ⅓ NR-DMRS overhead with even allocation in the remaining 12 PRBs. One DMRS sequence is mapped to the central 12 PRBs across two symbols, and its another two copies are mapped into the above remaining 6 PRBs and below remaining 6 PRBs correspondingly. In this mapping option, following sequence can be used: NR-DMRS sequence option 1 or 2 or 3 or 4 with L=63 and N=48; and NR-DMRS sequence option 5 or 6 or 7 or 8 with L=127 and N=48.

In one example of mapping option 24, ⅙ NR-DMRS overhead with even allocation in the central 12 PRBs and ⅓ NR-DMRS overhead with even allocation in the remaining 12 PRBs. One DMRS sequence carrying timing hypotheses is mapped to the central 12 PRBs across two symbols, and the two copies of another DMRS sequence not carrying timing hypotheses are mapped into the above remaining 6 PRBs and below remaining 6 PRBs correspondingly. In this mapping option, following sequence can be used: first sequence can use NR-DMRS sequence option 1 or 2 or 3 with L=63 and N=48, or NR-DMRS sequence option 5 or 6 or 7 with L=127 and N=48; and second sequence can use NR-DMRS sequence option 4 with L=63 and N=48, or NR-DMRS sequence option 8 with L=127 and N=48.

Note that in all mapping options above, the value of L is determined by assuming NR-DMRS sequence for PBCH is truncated from the closest Gold-sequence length. If a common PN sequence (e.g. Gold-sequence) length is utilized (as specified in aspect VII of component I) regardless of the DMRS overhead and RE mapping pattern, for example, as in LTE-CRS, or LTE-DMRS, or NR-DMRS for NR-PDSCH, L can be replaced by the particular length of the PN sequence.

In one sub-embodiment, for all mapping options above, if L=127, the M-sequence generators for DMRS can reuse the ones for NR-SSS sequence to save construction complexity. For example, the M-sequence generators are $f(x)=x^7+x^4+1$ and $g(x)=x^7+x+1$.

In some embodiments of component IV for more NR-DMRS sequence design examples, within an SS block, two symbols are utilized for NR-PBCH and its DMRS, where each symbol has N_RE REs mapped for NR-PBCH and its DMRS. The overhead of DMRS is ¼ (i.e., N_RE/4 REs mapped for DMRS within each symbol), and subcarriers for DMRS are evenly distributed in frequency-domain. For another example, consider another scenario: within an SS block, three or four or five symbols are utilized for NR-PBCH and its DMRS, where each symbol has N_RE REs mapped for NR-PBCH and its DMRS. The overhead of DMRS is k (i.e., k*N_RE REs mapped for DMRS within each symbol), and subcarriers for DMRS are evenly distributed in frequency-domain.

For yet another example, consider yet another scenario: within an SS block, three or four or five symbols are utilized for NR-PBCH and its DMRS, where each symbol may have different or same number of REs mapped for NR-PBCH, and the total number of REs for NR-PBCH within the SS block is N_DMRS. For all of the above scenarios, assume N_t timing hypotheses and N_ID cell IDs (e.g. N_ID=1008) are carried by DMRS sequence for all carrier frequency ranges supported in NR (note that if the actual number of timing hypotheses is smaller than N_t for certain carrier frequency range, the number of timing hypotheses carried by DMRS can equal to the actual number of timing hypotheses for that carrier frequency range. For example, if 8 timing hypotheses are carried by DMRS (i.e. 8 DMRS sequences), and only 4 maximum number of timing hypotheses are needed for the frequency range 0 to 3 GHz, a subset of 4 DMRS sequences can be selected from the overall 8 DMRS sequences and utilized for the frequency range 0 to 3 GHz).

In one embodiment, the value of N_RE can be 288, where subcarriers in 24 RBs are all mapped for NR-PBCH and its DMRS. In another embodiment, the value of N_RE can be 254, where subcarriers in 24 RBs are not all mapped for NR-PBCH and its DMRS (e.g. the remaining ones are left as guard band). In yet another embodiment, the value of N_RE can be 12*N_PRB, where subcarriers in N_PRB RBs are all mapped for NR-PBCH and its DMRS.

In one embodiment, the subcarrier indices I_DMRS within each symbol to be mapped for DMRS can be determined by (I_DMRS mod 4)=0. In another embodiment, the subcarrier indices I_DMRS within each symbol to be mapped for DMRS can be determined by (I_DMRS mod 4)=1. In yet another embodiment, the subcarrier indices I_DMRS within each symbol to be mapped for DMRS can be determined by (I_DMRS mod 4)=2. In yet another embodiment, the subcarrier indices I_DMRS within each symbol to be mapped for DMRS can be determined by (I_DMRS mod 4)=3.

In one embodiment, the number of timing hypotheses can be N_t=8 (e.g. 3 LSBs of the SS block timing index within SS burst set, or 3 bits within the SFN, or 2 LSBs of the SS block timing index within SS burst set as well as 1 bit for the half radio frame indication). In another embodiment, the number of timing hypotheses can be N_t=4 (e.g. 2 bits of the SS block timing index within SS burst set, or 2 bits within the SFN). In yet another embodiment, the number of timing hypotheses can be N_t=16 (e.g. 3 LSBs of the SS block timing index within SS burst set as well as 1 bit for the half radio frame indication).

If N_t=16, the timing index utilized in this embodiment means I_t=8*I_HF+I_SSB, or I_t=2*I_SSB+I_HF, where I_HF is the 1 bit indicator of the half radio frame, and I_SSB is the 3 bits indicator of 3 LSBs of SS block index within the 5 ms. If N_t=8, the timing index utilized in this embodiment can mean I_t=I_SSB for carrier frequency range [3, 52.6] GHz, where I_SSB is the 3 bits indicator of 3 LSBs of SS block index within the 5 ms, and I_t=4*I_HF+I_SSB for carrier frequency range [0, 3] GHz, where I_SSB is the 2 bits indicator of 2 LSBs of SS block index within the 5 ms and I_HF is the 1 bit indicator of the half radio frame, or can mean I_t=I_SSB for the whole carrier frequency range [0, 52.6] GHz, where I_SSB is the 3 bits indicator of 3 LSBs of SS block index within the 5 ms. If N_t=4, the timing index utilized in this embodiment means I_t=I_SSB, where I_SSB is the 2 bits indicator of 2 LSBs of SS block index within the 5 ms.

In yet another embodiment, there can be two type of DMRS sequences supported, where one type of DMRS sequence carries N_t timing hypotheses (e.g. N_t=16 or N_t=8 or N_t=4), and the other type of DMRS sequence does not carry any timing hypotheses (e.g. N_t=0). For the type of DMRS sequence not carrying any timing hypotheses, I_t=0 always in the following sequence design options and sub-options.

For the above considered scenario, the following designs for DMRS sequence of NR-PBCH are supported by combination of above design considerations in component I and component II. In one embodiment of sequence option 1, BPSK modulated Gold-sequence constructed by XOR of two length-L M-sequences, where one of the M-sequence $s_A(n)$ is generated with generator $g_A(x)$ and initial condition $c_A$, and the other M-sequence $s_B(n)$ is generated with generator $g_B(x)$ and initial condition $c_B$. There is an possible output shift offset Nc (note that Nc=0 if the shift offset does not exist) such that the BPSK modulated Gold-sequence $s(n)=1-2*((s_A(n+Nc)+s_B(n+Nc)) \bmod 2)$ and s(n) is truncated to the desired DMRS sequence length N_DMRS.

In one example of sequence sub-option 1a, the length of Gold-sequence L is the same as LTE-CRS (e.g. 2^31−1) or NR-DMRS for PDSCH (e.g. also 2^31−1 or larger), and one of the M-sequence $s_A(n)$ is given by $g_A(x)=x^{31}+x^3+1$ with initial condition $c_A$ fixed (e.g. $c_A$=i), and the other M-sequence $s_B(n)$ is given by $g_B(x)=x^{31}+x^3+x+x+1$ with initial condition $c_B$ carrying both N_ID cell ID and N_t timing hypotheses, e.g. $c_B$=c1*N_ID*I_t+c2*I_ID+c3, where I_t is the corresponding timing index carried by the DMRS sequence (0≤I_t≤N_t−1), I_ID the cell ID index for the DMRS sequence (0≤I_ID≤N_ID−1), c1 and c2 are two integer constants (e.g. c1=1, c2=1, c3=0, or c1=1, c2=1, c3=1, or c1=c2=8, c3=0). There is an output shift offset Nc (e.g. Nc=1600 as in LTE).

In one example of sequence sub-option 1b, the length of Gold-sequence L is the same as LTE-CRS (e.g. 2^31−1) or NR-DMRS for PDSCH (e.g. also 2^31−1 or larger), and one of the M-sequence $s_A(n)$ is given by $g_A(x)=x^{31}+x^3+1$ with initial condition $c_A$ carrying N_t timing hypotheses, e.g, $c_A$=c1*I_t+c2, where I_t is the corresponding timing index carried by the DMRS sequence (0≤I_t≤N_t−1) and c1 and c2 are two integer constants (e.g. c1=1, c2=0, or c1=N_ID, c2=0), and the other M-sequence $s_B(n)$ is given by $g_B(x)=x^{31}+x^3+x+x+1$ with initial condition $c_B$ carrying N_ID cell ID, e.g. $c_B$=c3*I_ID+c4, where I_ID the cell ID index for the DMRS sequence (0≤I_ID≤N_ID−1), c3 and c4 are two integer constants (e.g. c3=1, c4=0, or c3=N_t, c4=0). There is an output shift offset Nc (e.g. Nc=1600 as in LTE).

In one example of sequence sub-option 1c, the length of Gold-sequence L is 1023, and one of the M-sequence $s_A(n)$ is given by $g_A(x)=x^{10}+x^3+1$ with initial condition $c_A$ carrying N_t timing hypotheses, e.g, $c_A$=c1*I_t+c2, where I_t is the corresponding timing index carried by the DMRS sequence (0≤I_t≤N_t−1) and c1 and c2 are two integer constants (e.g. c1=1, c2=0, or c1=N_ID, c2=0), and the other M-sequence $s_B(n)$ is given by $g_B(x)=x^{10}+x^7+1$ with initial condition $c_B$ carrying N_ID cell ID, e.g. $c_B$=c3*I_ID+c4, where I_ID the cell ID index for the DMRS sequence (0≤I_ID≤N_ID−1), c3 and c4 are two integer constants (e.g. c3=1, c4=0, or c3=N_t, c4=0). There is no output shift offset Nc (e.g. Nc=0).

In one example of sequence sub-option Id, the length of Gold-sequence L is 127, and one of the M-sequence $s_A(n)$ is given by $g_A(x)$ as one example in TABLE 6 (e.g. one particular example of $g_A(x)$ is the same as one of the generators for NR-SSS, i.e., $g_A(x)=x^7+x^4+1$), and the other M-sequence $s_B(n)$ is given by $g_B(x)$ as another example in TABLE 6 but different from $g_A(x)$ (e.g. one particular example of $g_B(x)$ is the same as the other generator for NR-SSS, i.e., $g_B(x)=x^7+x+1$). The combination of initial conditions $c_A$ and $c_B$ is utilized to represent the N_ID cell IDs and N_t timing hypotheses. There is no output shift offset Nc (e.g. Nc=0). In the following examples, I_t is the corresponding timing index carried by the DMRS sequence (0≤I_t≤N_t−1), I_ID the cell ID index for the DMRS sequence (0≤I_ID≤N_ID−1), and c1, c2, c3 are integer constants.

In one example, $c_A=\lfloor(c1*N_ID*I_t+c2*I_ID+c3)/127\rfloor$, and $c_B=(c1*N_ID*I_t+c2*I_ID+c3) \bmod 127$. E.g. c1=c2=1 and c3=0. E.g. c1=c2=2 and c3=0. In another example, if N_t=8, $c_A=c1*(3*\lfloor I_ID_1/112\rfloor+I_ID_2)+c2*I_t$, and $c_B=I_ID_1 \bmod 112$, where I_ID=3*I_ID_1+I_ID_2, and 0≤I_ID_1≤335, 0≤I_ID_2≤2. E.g. c1=8, c2=1. In yet another example, if N_t=4, $c_A=c1*(3*\lfloor I_ID_1/112\rfloor+I_ID_2)+c2*I_t$, and $c_B=I_ID_1 \bmod 112$, where I_ID=3*I_ID_1+I_ID 2, and 0≤I_ID_1≤335, 0≤I_ID_2≤2. E.g. c1=5, c2=1. E.g. c1=4, c2=1. E.g. c1=8, c2=1. In yet another example, if N_t=8, $c_A=\lfloor(c1*N_ID*I_t+c2*I_ID+c3)/90\rfloor$, and $c_B=(c1*N_ID*I_t+c2*I_ID+c3) \bmod 90$. E.g.

c1=c2=1 and c3=0. In yet another example, if N_t=4, $c_A=\lfloor(c1*N_ID*I_t+c2*I_ID+c3)/64\rfloor$, and $c_B=(c1*N_ID*I_t+c2*I_ID+c3) \bmod 64$. E.g. c1=c2=1 and c3=0.

In one example of sequence sub-option 1e, the length of Gold-sequence L is 255, and one of the M-sequence $s_A(n)$ is given by $g_A(x)$ as one example in TABLE 5 (e.g. $g_A(x)=x^8+x^7+x^6+x+1$), and the other M-sequence $s_B(n)$ is given by $g_B(x)$ as another example in TABLE 5 but different from $g_A(x)$ (e.g. $g_B(x)=x^8+x^7+x^2+x+1$). The combination of initial conditions $c_A$ and $c_B$ is utilized to represent the N_ID cell IDs and N_t timing hypotheses. There is no output shift offset Nc (e.g. Nc=0). In the following examples, I_t is the corresponding timing index carried by the DMRS sequence (0≤I_t≤N_t−1), I_ID the cell ID index for the DMRS sequence (0≤I_ID≤N_ID−1), and c1, c2, c3, c4 are integer constants.

In one example, $c_A=\lfloor(c1*N_ID*I_t+c2*I_ID+c3)/255\rfloor$, and $c_B=(c1*N_ID*I_t+c2*I_ID+c3) \bmod 255$. E.g. c1=c2=1 and c3=0. E.g. c1=c2=2 and c3=0. In another example, if N_t=8, $c_A=c^{4}*\lfloor(c1*N_ID*I_t+c2*I_ID+c3)/90\rfloor$, and $c_B=c4*((c1*N_ID*I_t+c2*I_ID+c3) \bmod 90)$. E.g. c1=c2=1 and c3=0, c4=2. E.g. c1=c2=1 and c3=0, c4=1. In yet another example, if N_t=4, $c_A=c4*\lfloor(c1*N_ID*I_t+c2*I_ID+c3)/64\rfloor$, and $c_B=c4*((c1*N_ID*I_t+c2*I_ID+c3) \bmod 64)$. E.g. c1=c2=1 and c3=0, c4=3. E.g. c1=c2=1 and c3=0, c4=1.

In one embodiment of sequence option 2, QPSK modulated Gold-sequence constructed by XOR of two length-L M-sequences, where one of the M-sequence $s_A(n)$ is generated with generator $g_A(x)$ and initial condition $c_A$, and the other M-sequence $s_B(n)$ is generated with generator $g_B(x)$ and initial condition $c_B$. There is an possible output shift offset Nc (note that Nc=0 if the shift offset does not exist) such that the QPSK modulated Gold-sequence $s(n)=(1-2*((s_A(2n+Nc)+s_B(2n+Nc)) \bmod 2))/\sqrt{2}+j*(1-2*((s_A(2n+Nc+1)+s_B(2n+Nc+1)) \bmod 2))/\sqrt{2}$ and s(n) is truncated to the desired DMRS sequence length N_DMRS.

In one example of sequence sub-option 2a, the length of Gold-sequence L is the same as LTE-CRS (e.g. 2^31−1) or NR-DMRS for PDSCH (e.g. also 2^31−1 or larger), and one of the M-sequence $s_A(n)$ is given by $g_A(x)=x^{31}+x^3+1$ with initial condition $c_A$ fixed (e.g. $c_A=1$), and the other M-sequence $s_B(n)$ is given by $g_B(x)=x^{31}+x^3+x+x+1$ with initial condition $c_B$ carrying both N_ID cell ID and N_t timing hypotheses.

In one example, $c_B=c1*N_ID*I_t+c2*I_ID+c3$, where I_t is the corresponding timing index carried by the DMRS sequence (0≤I_t≤N_t−1), I_ID the cell ID index for the DMRS sequence (0≤I_ID≤N_ID−1), c1 and c2 are two integer constants (e.g. c1=1, c2=1, c3=0, or c1=1, c2=1, c3=1, or c1=c2=8, c3=0). There is an output shift offset Nc (e.g. Nc=1600 as in LTE, or other value).

In another example, $c_B=c1*I_t+c2*I_ID+c3$, where I_t is the corresponding timing index carried by the DMRS sequence (0≤I_t≤N_t−1), I_ID the cell ID index for the DMRS sequence (0≤I_ID≤N_ID−1), c1 and c2 are two integer constants (e.g. c1=2^10, c2=1, c3=0, or c1=2^12, c2=1, c3=0). There is an output shift offset Nc (e.g. Nc=1600 as in LTE, or other value).

In yet another example, $c_B=c1*I_t+c2*\lfloor I_ID/4\rfloor+c3$, where I_t is the corresponding timing index carried by the DMRS sequence (0≤I_t≤N_t−1), I_ID the cell ID index for the DMRS sequence (0≤I_ID≤N_ID−1), c1 and c2 are two integer constants (e.g. c1=2^10, c2=1, c3=0, or c1=2^12, c2=4, c3=0). There is an output shift offset Nc (e.g. Nc=1600 as in LTE, or other value).

In yet another example, $c_B=c0*I_t*I_ID+c1*I_t+c2*I_ID+c3$, where I_t is the corresponding timing index carried by the DMRS sequence (0≤I_t≤N_t−1), I_ID the cell ID index for the DMRS sequence (0≤I_ID≤N_ID−1), c0, c1, c2, c3 are constants. There is an output shift offset Nc (e.g. Nc=1600 as in LTE, or Nc can be other integer value). Note that the term of c0*I_t*I_ID in the initial condition is to avoid coherent combining of interference among cells.

In yet another example, $c_B=c0*(I_t+1)*(I_ID+1)+c1*(I_t+1)+c2*(I_ID+1)+c3$, where I_t is the corresponding timing index carried by the DMRS sequence (0≤I_t≤N_t−1), I_ID the cell ID index for the DMRS sequence (0≤I_ID≤N_ID−1), c0, c1, c2, c3 are constants. There is an output shift offset Nc (e.g. Nc=1600 as in LTE, or Nc can be other integer value). Note that the term of c0*(I_t+1)*(I_ID+1) in the initial condition is to avoid coherent combining of interference among cells. E.g. c0=2^8, c1=2^2, c2=0, c3=0; c0=2^10, c1=2^4, c2=0, c3=0; c0=2^11, c1=2^5, c2=0, c3=0.

In yet another example, $c_B=c0*(I_t+1)*(2*I_ID+1)+c1*(I_t+1)+c2*(I_ID+1)+c3$, where I_t is the corresponding timing index carried by the DMRS sequence (0≤I_t≤N_t−1), I_ID the cell ID index for the DMRS sequence (0≤I_ID≤N_ID−1), c0, c1, c2, c3 are constants. There is an output shift offset Nc (e.g. Nc=1600 as in LTE, or Nc can be other integer value). Note that the term of c0*(I_t+1)*(I_ID+1) in the initial condition is to avoid coherent combining of interference among cells. E.g. c0=2^8, c1=2^2, c2=0, c3=0; c0=2^10, c1=2^4, c2=0, c3=0; c0=2^11, c1=2^5, c2=0, c3=0; c0=2^12, c1=2^4, c2=0, c3=0.

In yet another example, if there is a cell-specific shift of the RE location for DMRS, $c_B=c0*I_t*\lfloor I_ID/4\rfloor+c1*I_t+c2*\lfloor I_ID/4\rfloor+c3$, where I_t is the corresponding timing index carried by the DMRS sequence (0≤I_t≤N_t−1), I_ID the cell ID index for the DMRS sequence (0≤I_ID≤N_ID−1), c0, c1, c2, c3 are integers. There is an output shift offsetNc (e.g. Nc=1600 as in LTE, or Nc can be other integer value). Note that the term of $c0*I_t*\lfloor I_ID/4\rfloor$ in the initial condition is to avoid coherent combining of interference among cells.

One possible variant of this example is c3=mod(I_ID,4). For this particular example, the parameters c0, c1, c2 can be selected such that the real part of normalized cross-correlation is minimized. E.g.

| Example # | c0 | c1 | c2 |
|---|---|---|---|
| 1 | 2^10 | 2^2 | 2^10 |
| 2 | 2^11 | 2^5 | 2^11 |
| 3 | 2^11 | 2^6 | 2^11 |
| 4 | 2^12 | 2^6 | 2^12 |

In yet another example, if there is a cell-specific shift of the RE location for DMRS, $c_B=c0*(I_t+1)*(\lfloor I_ID/4\rfloor+1)+c1*(I_t+1)+c2*(\lfloor I_ID/4\rfloor+1)+c3$, where I_t is the corresponding timing index carried by the DMRS sequence (0≤I_t≤N_t−1), I_ID the cell ID index for the DMRS sequence (0≤I_ID≤N_ID−1), c0, c1, c2, c3 are integers. There is an output shift offset Nc (e.g. Nc=1600 as in LTE, or Nc can be other integer value). Note that the term of $c0*(I_t+1)*(\lfloor I_ID/4\rfloor+1)$ in the initial condition is to avoid coherent combining of interference among cells, and $\lfloor I_ID/4\rfloor$ means cells are grouped (since there is a cell-specific shift on RE locations and the periodicity of the shift is 4) and helps to further reduce the maximum cross-correlation among sequences. E.g. c0=2^12, c1=2^6, c2=0, c3=0; c0=2^10, c1=2^2, c2=0, c3=0; c0=2^11, c1=2^6, c2=0, c3=0;

c0=2 ^11, c1=2^6, c2=0, c3=0; c0=2^12, c1=2^7, c2=0, c3=0; c0=2^12, c1=0, c2=2, c3=0.

One possible variant of the aforementioned example is c3=mod(I_ID,4), such that the sequence is still cell-specific instead of group-cell specific. For this particular example, the parameters c0, c1, c2 can be selected such that the real part of (maximum and/or mean) normalized cross-correlation is minimized (for both inter-cell and intra-cell scenario). E.g.

| Example # | c0 | c1 | c2 |
|---|---|---|---|
| 1 | 2^10 | 2^2 | 0 |
| 2 | 2^11 | 2^6 | 0 |
| 3 | 2^12 | 2^6 | 0 |

In yet another example, if there is a cell-specific shift of the RE location for DMRS, $c_B$=c0*(I_t+1)*(2*⌊I_ID/4⌋+1)+c1*(I_t+1)+c2*(⌊I_ID/4⌋+1)+c3, where I_t is the corresponding timing index carried by the DMRS sequence (0≤I_t≤N_t−1), I_ID the cell ID index for the DMRS sequence (0≤I_ID≤N_ID−1), c0, c1, c2, c3 are integers. There is an output shift offset Nc (e.g. Nc=1600 as in LTE, or Nc can be other integer value). Note that the term of c0*(I_t+1)*(2*⌊I_ID/4⌋+1) in the initial condition is to avoid coherent combining of interference among cells. E.g. c0=2^12, c1=2^6, c2=0, c3=0; c0=2^10, c1=2^2, c2=0, c3=0; c0=2^11, c1=2^6, c2=0, c3=0; c0=2^11, c1=2^6, c2=0, c3=0; c0=2^12, c1=2^7, c2=0, c3=0; c0=2^12, c1=0, c2=2, c3=0.

One possible variant of the aforementioned example is c3=mod(I_ID,4). For this particular example, the parameters c0, c1, c2 can be selected such that the real part of normalized cross-correlation is minimized.

In one example of sequence sub-option 2b, the length of Gold-sequence L is the same as LTE-CRS (e.g. 2^31−1) or NR-DMRS for PDSCH (e.g. also 2^31−1 or larger), and one of the M-sequence $s_A(n)$ is given by $g_A(x)=x^{31}+x^3+1$ with initial condition $c_A$ carrying N_t timing hypotheses, e.g, $c_A$=c1*I_t+c2, where I_t is the corresponding timing index carried by the DMRS sequence (0≤I_t≤N_t−1) and c1 and c2 are two integer constants (e.g. c1=1, c2=0, or c1=N_ID, c2=0), and the other M-sequence $s_B(n)$ is given by $g_B(x)=x^{31}+x^3+x+x+1$ with initial condition $c_B$ carrying N_ID cell ID, e.g. $c_B$=c3*I_ID+c4, where I_ID the cell ID index for the DMRS sequence (0≤I_ID≤N_ID−1), c3 and c4 are two integer constants (e.g. c3=1, c4=0, or c3=N_t, c4=0). There is an output shift offset Nc (e.g. Nc=1600 as in LTE).

In one example of sequence sub-option 2c, the length of Gold-sequence L is 1023, and one of the M-sequence $s_A(n)$ is given by $g_A(x)=x^{10}+x^3+1$ with initial condition $c_A$ carrying N_t timing hypotheses, e.g, $c_A$=c1*I_t+c2, where I_t is the corresponding timing index carried by the DMRS sequence (0≤I_t≤N_t−1) and c1 and c2 are two integer constants (e.g. c1=1, c2=0, or c1=N_ID, c2=0), and the other M-sequence $s_B(n)$ is given by $g_B(x)=x^{10}+x^7+1$ with initial condition $c_B$ carrying N_ID cell ID, e.g. $c_B$=c3*I_ID+c4, where I_ID the cell ID index for the DMRS sequence (0≤I_ID≤N_ID−1), c3 and c4 are two integer constants (e.g. c3=1, c4=0, or c3=N_t, c4=0). There is no output shift offset Nc (e.g. Nc=0).

In one example of sequence sub-option 2d, the length of Gold-sequence L is 127, and one of the M-sequence $s_A(n)$ is given by $g_A(x)$ as one example in TABLE 6 (e.g. one particular example of $g_A(x)$ is the same as one of the generators for NR-SSS, i.e., $g_A(x)=x^7+x^4+1$), and the other M-sequence $s_B(n)$ is given by $g_B(x)$ as another example in TABLE 6 but different from $g_A(x)$ (e.g. one particular example of $g_B(x)$ is the same as the other generator for NR-SSS, i.e., $g_B(x)=x^7+x+1$). The combination of initial conditions $c_A$ and $c_B$ is utilized to represent the N_ID cell IDs and N_t timing hypotheses. There is no output shift offset Nc (e.g. Nc=0).

In the following examples, I_t is the corresponding timing index carried by the DMRS sequence (0≤I_t≤N_t−1), I_ID the cell ID index for the DMRS sequence (0≤I_ID≤N_ID−1), and c1, c2, c3 are integer constants. In one example, $c_A$=⌊(c1*N_ID*I_t+c2*I_ID+c3)/127⌋, and $c_B$=(c1*N_ID*I_t+c2*I_ID+c3) mod 127. E.g. c1=c2=1 and c3=0. E.g. c1=c2=2 and c3=0. In another example, if N_t=8, $c_A$=c1*(3*⌊I_ID_1/112⌋+I_ID_2)+c2*I_t, and $c_B$=I_ID_1 mod 112, where I_ID=3*I_ID_1+I_ID_2, and 0≤I_ID_1≤335, 0≤I_ID_2≤2. E.g. c1=8, c2=1. In yet another example, if N_t=4, $c_A$=c1*(3*⌊I_ID_1/112⌋+I_ID_2)+c2*I_t, and $c_B$=I_ID_1 mod 112, where I_ID=3*I_ID_1+I_ID 2, and 0≤I_ID_1≤335, 0≤I_ID_2≤2. E.g. c1=5, c2=1. E.g. c1=4, c2=1. E.g. c1=8, c2=1. In yet another example, if N_t=8, $c_A$=⌊(c1*N_ID*I_t+c2*I_ID+c3)/90⌋, and $c_B$=(c1*N_ID*I_t+c2*I_ID+c3) mod 90. E.g. c1=c2=1 and c3=0. In yet another example, if N_t=4, $c_A$=⌊(c1*N_ID*I_t+c2*I_ID+c3)/64⌋, and $c_B$=(c1*N_ID*I_t+c2*I_ID+c3) mod 64. E.g. c1=c2=1 and c3=0.

In one example of sequence sub-option 2e, the length of Gold-sequence L is 255, and one of the M-sequence $s_A(n)$ is given by $g_A(x)$ as one example in TABLE 5 (e.g. $g_A(x)=x^8+x^7+x^6+x+1$), and the other M-sequence $s_B(n)$ is given by $g_B(x)$ as another example in TABLE 5 but different from $g_A(x)$ (e.g. $x^8+x^7+x^2+x+1$). The combination of initial conditions $c_A$ and $c_B$ is utilized to represent the N_ID cell IDs and N_t timing hypotheses. There is no output shift offset Nc (e.g. Nc=0). In the following examples, I_t is the corresponding timing index carried by the DMRS sequence (0≤I_t≤N_t−1), I_ID the cell ID index for the DMRS sequence (0≤I_ID≤N_ID−1), and c1, c2, c3, c4 are integer constants.

In one example, $c_A$=⌊(c1*N_ID*I_t+c2*I_ID+c3)/255⌋, and $c_B$=(c1*N_ID*I_t+c2*I_ID+c3) mod 255. E.g. c1=c2=1 and c3=0. E.g. c1=c2=2 and c3=0. In another example, if N_t=8, $c_A$=$c^4$*⌊(c1*N_ID*I_t+c2*I_ID+c3)/90⌋, and $c_B$=c4*((c1*N_ID*I_t+c2*I_ID+c3) mod 90). E.g. c1=c2=1 and c3=0, c4=2. E.g. c1=c2=1 and c3=0, c4=1. In yet another example, if N_t=4, $c_A$=$c^4$*⌊(c1*N_ID*I_t+c2*I_ID+c3)/64⌋, and $c_B$=c4*((c1*N_ID*I_t+c2*I_ID+c3) mod 64). E.g. c1=c2=1 and c3=0, c4=3. E.g. c1=c2=1 and c3=0, c4=1.

In one example of sequence sub-option 2f, the length of Gold-sequence L is 511, and one of the M-sequence $s_A(n)$ is given by $g_A(x)$ (e.g. $g_A(x)=x^9+x^5+1$), and the other M-sequence $s_B(n)$ different from $g_A(x)$ (e.g. $x^9+x^4+1$). The combination of initial conditions $c_A$ and $c_B$ is utilized to represent the N_ID cell IDs and N_t timing hypotheses. There is no output shift offset Nc (e.g. Nc=0). In the following examples, I_t is the corresponding timing index carried by the DMRS sequence (0≤I_t≤N_t−1), I_ID the cell ID index for the DMRS sequence (0≤I_ID≤N_ID−1), and c1, c2, c3, c4 are integer constants.

In one example, $c_A$=⌊(c1*N_ID*I_t+c2*I_ID+c3)/511⌋, and $c_B$=(c1*N_ID*I_t+c2*I_ID+c3) mod 511. E.g. c1=c2=1 and c3=0. E.g. c1=c2=2 and c3=0. In another example, if N_t=8, $c_A$=$c^4$*⌊(c1*N_ID*I_t+c2*I_ID+c3)/90⌋, and $c_B$=c4*((c1*N_ID*I_t+c2*I_ID+c3) mod 90). E.g. c1=c2=1 and c3=0, c4=4. E.g. c1=c2=1 and c3=0, c4=1. In yet another example, if N_t=4, $c_A$=$c^4$*⌊(c1*N_ID*I_t+ c2*I_ID+c3)/64⌋, and $c_B$=c4*((c1*N_ID*I_t+c2*I_ID+c3) mod 64). E.g. c1=c2=1 and c3=0, c4=7. E.g. c1=c2=1 and c3=0, c4=1.

The following designs for RE mapping are supported in the present disclosure and can be combined with one or more of the above sequence options/sub-options.

In one embodiment of mapping option 1, NR-DMRS sequence is repeated in time domain in the two OFDM symbols. In this mapping option, all above sequence options/sub-options can be used to be mapped into each of the repeated NR-DMRS sequences, where the number of timing hypotheses carried by both sequences are N_t (e.g. N_t=16 or N_t=8 or N_t=4), and the desired DMRS sequence length is N_DMRS=72 for N_RE=288, and N_DMRS=63 for N_RE=254.

In one embodiment of mapping option 2, NR-DMRS sequence is repeated in frequency domain across the OFDM symbols (e.g. one copy mapped into the central 12 PRBs of two symbols and the other copy mapped into the remaining 12 PRBs of two symbols). In this mapping option, all above sequence options/sub-options can be used to be mapped into each of the repeated NR-DMRS sequences, where the number of timing hypotheses carried by both sequences are N_t (e.g. N_t=16 or N_t=8 or N_t=4), and the desired DMRS sequence length is N_DMRS=72 for N_RE=288, and N_DMRS=63 for N_RE=254.

In one embodiment of mapping option 3, two types of DMRS sequences, where the first type of NR-DMRS sequence carrying N_t (e.g. N_t=16 or N_t=8 or N_t=4) timing hypotheses is mapped to the central part of the bandwidth (e.g. the central 12 PRBs of two symbols), and the second type of NR-DMRS sequence not carrying timing hypotheses is mapped the remaining part of the bandwidth (e.g. the remaining 12 PRBs of two symbols). In this mapping option, all above sequence options/sub-options can be used, where for the first type of DMRS sequence, N_t>0 (e.g. N_t=16 or N_t=8 or N_t=4), and for the second type of DMRS sequence, N_t=0, and the desired DMRS sequence length is N_DMRS=72 for N_RE=288, and N_DMRS=63 for N_RE=254.

In one embodiment of mapping option 4, single NR-DMRS sequence is mapped across all the OFDM symbols, in a frequency first and timing second order. In this mapping option, all above sequence options/sub-options can be used, where the number of timing hypotheses carried by the sequence for a given cell is N_t (e.g. N_t=16 or N_t=8 or N_t=4), and the desired DMRS sequence length is N_DMRS=144, or N_DMRS=126, or N_DMRS=N_RE/2 in general for two PBCH symbols within an SS block with ¼ density, where N_RE may be calculated based on the number of PRBs for NR-PBCH (e.g. N_RE=12*N_PRB), or N_DMRS=N_RE*k*N_symbol in general for N_symbol PBCH symbols within an SS block with k density, where N_RE may be calculated based on the number of PRBs for NR-PBCH (e.g. N_RE=12*N_PRB), or N_DMRS=N_PRB*k in general for N_PRB PRBs mapped for NR-PBCH and its DMRS within an SS block with k density.

Figure 13:
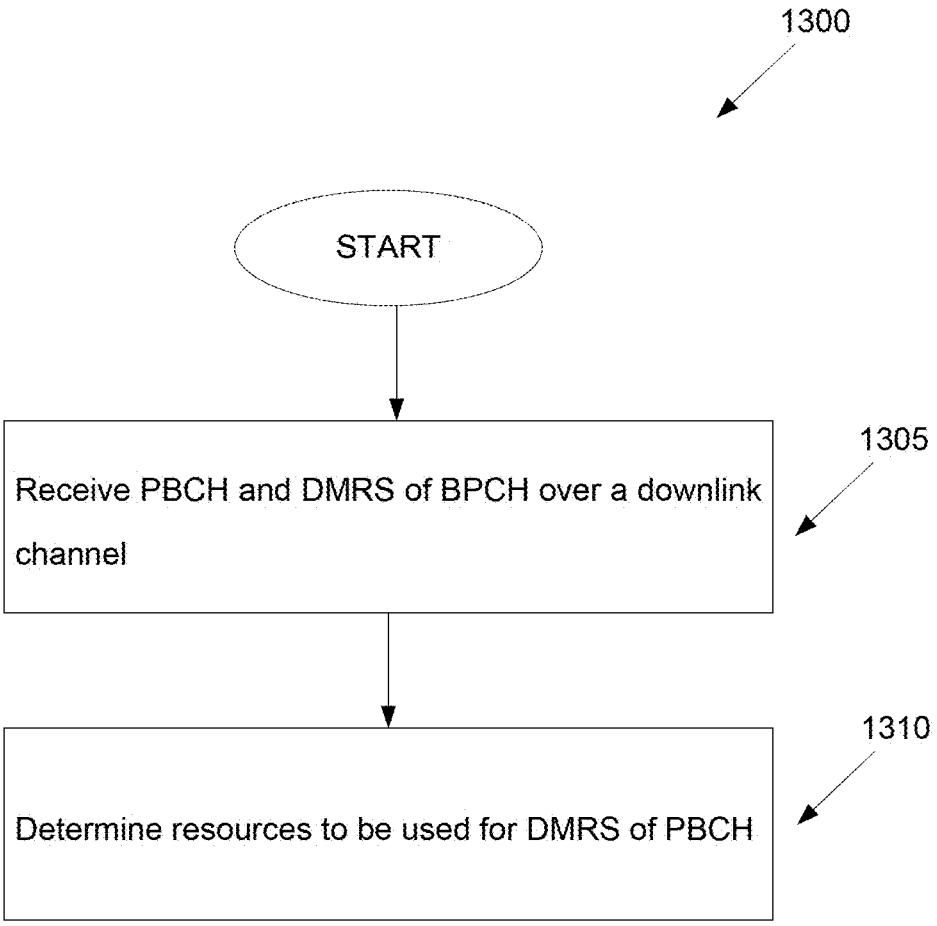
FIG. 13 illustrates a flow chart of a method for designing DMRS sequence according to embodiments of the present disclosure.

FIG. 13 illustrates a flow chart of a method 1300 for designing DMRS sequences, as may be performed by a UE, according to embodiments of the present disclosure. The embodiment of the method 1300 illustrated in FIG. 13 is for illustration only. FIG. 13 does not limit the scope of this disclosure to any particular implementation of the beam sweeping operation 1300.

As shown in FIG. 13, the method 1300 begins at step 1305. In step 1305, a UE receives a demodulation reference signal (DMRS) of a physical broadcasting channel (PBCH) over a downlink channel. In some embodiments, in step 1305, the UE receives PBCH and DMRS of BPCH from a base station (BS) over a downlink channel.

In step 1310, the UE determines resources to be used for the DMRS of the PBCH. In step 1310, a pseudo-noise (PN) sequence is mapped to the resources to be used for the DMRS of the PBCH. The PN sequence in step 1310 is generated based on an initial condition including a physical cell ID and timing information comprising at least one of an index of SSB or an index of a half frame within a frame based on a carrier frequency range. In step 1310, the index of SSB comprises at least one of a partial or whole index of SSB. In some embodiments, the UE in step 1310 determines one DMRS sequence from eight candidate DMRS sequences for a cell according to one of carrier frequency ranges comprising a carrier frequency range A, a carrier frequency range B, and/or a carrier frequency range C. In such embodiments, the carrier frequency range A is zero to three giga-hertz (GHz), the carrier frequency range B is three to six GHz, and the carrier frequency range C is six to 52.6 GHz.

In some embodiments, the eight candidate DMRS sequences are generated in step 1310 based on timing information in three bits, comprising the index of SSB in two bits and, the index of a half frame within a frame in one bit for the carrier frequency range A, the index of SSB in three bits for the carrier frequency range B, and partial of the index of SSB in three least significant bits (LSB) for the carrier frequency range C. In some embodiments, remaining timing information, in step 1310, for the carrier frequency range B and the carrier frequency range C is transmitted as part of a payload of the PBCH, respectively. In some embodiments, the initial condition in step 1310 comprises at least a term constructed by a product of the timing information included in a DMRS sequence and a grouped cell ID with a group size of four. In such embodiments, the initial condition is given by c_B=2^11*(I_t+1)*(⌊I_ID/4⌋+1)+2^6*(I_t+1)+mod(I_ID,4) where an I_ID is the cell ID, and an I_t is the timing information included in the DMRS sequence.

Figure 14:
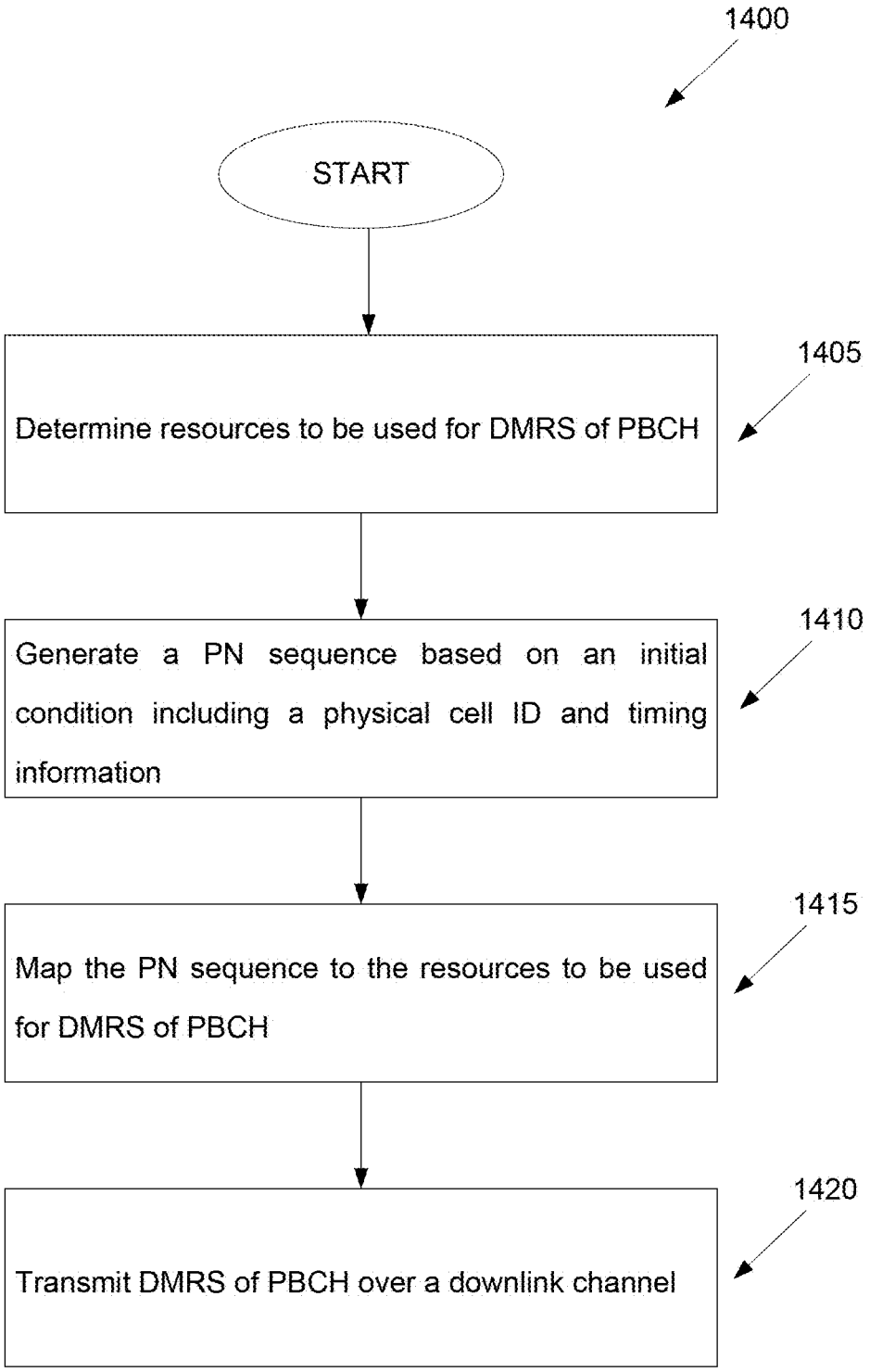
FIG. 14 illustrates another flow chart of a method for designing DMRS sequence according to embodiments of the present disclosure.

FIG. 14 illustrates a flow chart of a method 1400 for designing DMRS sequence, as may be performed by a BS, according to embodiments of the present disclosure. The embodiment of the method 1400 illustrated in FIG. 14 is for illustration only. FIG. 14 does not limit the scope of this disclosure to any particular implementation of the beam sweeping operation 1400.

As show in FIG. 14, the method 1400 beings in step 1405. In step 1405, the BS determines resources to be used for a demodulation reference signal (DMRS) of a physical broadcasting channel (PBCH).

In some embodiments, the BS in step 1405 determines one DMRS sequence from eight candidate DMRS sequences for a cell according to one of carrier frequency ranges comprising a carrier frequency range A, a carrier frequency range B, and a carrier frequency range C, wherein the carrier frequency range A is zero to three giga-hertz (GHz), the carrier frequency range B is three to six GHz, and the carrier frequency range C is six to 52.6 GHz. In such embodiment, the eight candidate DMRS sequences are generated based on timing information in three bits, comprising the index of SSB in two bits and the index of a half frame within a frame in one bit for the carrier frequency range A, the index of SSB in three bits for the carrier frequency range B, and partial of the index of SSB in three least significant bits (LSB) for the carrier frequency range C.

Next, in step 1410, the BS generates a pseudo-noise (PN) sequence based on an initial condition including a physical cell ID and timing information comprising at least one of an index of SSB or an index of a half frame within a frame based on a carrier frequency range, wherein the index of SSB comprises at least one of a partial or whole index of SSB.

In some embodiments, the initial condition in step 1410 comprises at least a term constructed by a product of the timing information included in a DMRS sequence and a grouped cell ID with a group size of four. In such embodiments, the initial condition is given by $c_B=2^{11}*(I_t+1)*(\lfloor I_ID/4\rfloor+1)+2^{6}*(I_t+1)+mod(I_ID,4)$ where an I_ID is the cell ID, and an I_t is the timing information included in the DMRS sequence.

In some embodiments, the initial condition comprises I_t=4*I_HF+I_SSB for a carrier frequency range A, and I_t=I_SSB for a carrier frequency range B and a carrier frequency range C. In such embodiments, an I_HF is the index of a half frame within a frame, and an I_SSB is the index of SSB for the carrier frequency range A and the carrier frequency range B, and is partial of the index of SSB in three least significant bits (LSB) for the carrier frequency range C.

Subsequently, in step 1415, the BS maps the PN sequence to the resources to be used for the DMRS of the PBCH.

Finally, in step 1420, the BS transmits the DMRS of the PBCH over a downlink channel. In some embodiments, The BS in step 1420 transmits remaining timing information for the carrier frequency range B and the carrier frequency range C is transmitted as part of a payload of the PBCH, respectively.

In some embodiments, the BS in step 1420 transmits PBCH and DMRS of BPCH to a user equipment (UE) over a downlink channel.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for controlling reference signal in a wireless communication system, the UE comprising:

a transceiver configured to receive, from a base station (BS), a demodulation reference signal (DMRS) of a physical broadcasting channel (PBCH) over a downlink channel; and a processor operably connected to the transceiver, the processor configured to determine resources to be used for the DMRS of the PBCH, wherein a pseudo-noise (PN) sequence that is mapped to the resources to be used for the DMRS of the PBCH is generated by a base station (BS), and wherein the PN sequence is generated based on an initial condition c_B given $$c_B=2^{11}*(I_t+1)*(\lfloor I_ID/4\rfloor+1)+2^{6}*(I_t+1)+mod(I_ID,4),$$

where I_ID is a physical cell identification (ID) and I_t is timing information included in a DMRS sequence.

2. The UE of claim 1, wherein the processor is further configured to determine one DMRS sequence from eight candidate DMRS sequences for a cell according to one of carrier frequency ranges comprising a carrier frequency range A, a carrier frequency range B, and a carrier frequency range C, wherein the carrier frequency range A is zero to three giga-hertz (GHz), the carrier frequency range B is three to six GHz, and the carrier frequency range C is six to 52.6 GHz.

3. The UE of claim 2, wherein the eight candidate DMRS sequences are generated based on three bits of the timing information, the timing information comprising an index of a synchronization signal block (SSB) in two bits and, an index of a half frame within a frame in one bit for the carrier frequency range A, an index of the SSB in three bits for the carrier frequency range B, and part of an index of the SSB in three least significant bits (LSB) for the carrier frequency range C.

4. The UE of claim 2, wherein partial timing information for the carrier frequency range B and the carrier frequency range C is transmitted as part of a payload of the PBCH.

5. The UE of claim 1, wherein the I_t=4*I_HF+I_SSB for a carrier frequency range A and the I_t=I_SSB for a carrier frequency range B and a carrier frequency range C, wherein I_HF is the index of a half frame within a frame and I_SSB is an index of a synchronization signal block (SSB) for the carrier frequency range A and the carrier frequency range B, and is part of the index of the SSB in three least significant bits (LSB) for the carrier frequency range C.

6. A base station (BS) for controlling reference signal in a wireless communication system, the BS comprising:

a processor configured to:

determine resources to be used for a demodulation reference signal (DMRS) of a physical broadcasting channel (PBCH), generate a pseudo-noise (PN) sequence based on an initial condition c_B given by:

$$c_B=2^{11}*(I_t+1)*(\lfloor I_ID/4\rfloor+1)+2^{6}*(I_t+1)+mod(I_ID,4),$$

where I_ID is a physical cell identification (ID) and I_IT is timing information included in a DMRS sequence, and map the PN sequence to the resources to be used for the DMRS of the PBCH; and a transceiver operably connected to the processor, the transceiver configured to transmit, to a user equipment (UE), the DMRS of the PBCH over a downlink channel.

7. The BS of claim 6, wherein the processor is further configured to determine one DMRS sequence from eight candidate DMRS sequences for a cell according to one of carrier frequency ranges comprising a carrier frequency range A, a carrier frequency range B, and a carrier frequency range C, wherein the carrier frequency range A is zero to three giga-hertz (GHz), the carrier frequency range B is three to six GHz, and the carrier frequency range C is six to 52.6 GHz.

8. The BS of claim 7, wherein the eight candidate DMRS sequences are generated based on three bits of the timing information, the timing information comprising an index of a synchronization signal block (SSB) in two bits and, an index of a half frame within a frame in one bit for the carrier frequency range A, an index of the SSB in three bits for the carrier frequency range B, and part of an index of the SSB in three least significant bits (LSB) for the carrier frequency range C.

9. The BS of claim 7, wherein partial timing information for the carrier frequency range B and the carrier frequency range C is transmitted as part of a payload of the PBCH.

10. The BS of claim 6, wherein the I_t=4*I_HF+I_SSB for a carrier frequency range A and the I_t=I_SSB for a carrier frequency range B and a carrier frequency range C, wherein I_HF is the index of a half frame within a frame and I_SSB is an index of a synchronization signal block (SSB) for the carrier frequency range A and the carrier frequency range B, and is part of the index of the SSB in three least significant bits (LSB) for the carrier frequency range C.

11. A method of a user equipment (UE) for controlling reference signal in a wireless communication system, the method comprising:

receiving, from a base station (BS), a demodulation reference signal (DMRS) of a physical broadcasting channel (PBCH) over a downlink channel; and determining resources to be used for the DMRS of the PBCH, wherein a pseudo-noise (PN) sequence that is mapped to the resources to be used for the DMRS of the PBCH is generated by a base station (BS), [and]

wherein the PN sequence is generated based on an initial condition c_B given by:

$$c_B=2^{11}*(I_t+1)*(\lfloor I_ID/4\rfloor+1)+2^{6}*(I_t+1)+\mathrm{mod}(I_ID,4),$$

where I_ID is a physical cell identification (ID) and I_t is timing information included in a DMRS sequence.

12. The method of claim 11, further comprising determining one DMRS sequence from eight candidate DMRS sequences for a cell according to one of carrier frequency ranges comprising a carrier frequency range A, a carrier frequency range B, and a carrier frequency range C, wherein the carrier frequency range A is zero to three giga-hertz (GHz), the carrier frequency range B is three to six GHz, and the carrier frequency range C is six to 52.6 GHz.

13. The method of claim 12, wherein the eight candidate DMRS sequences are generated based on three bits of the timing information, the timing information comprising an index of a synchronization signal block (SSB) in two bits and, an index of a half frame within a frame in one bit for the carrier frequency range A, an index of the SSB in three bits for the carrier frequency range B, and part of an index of the SSB in three least significant bits (LSB) for the carrier frequency range C.

14. The method of claim 12, wherein partial timing information for the carrier frequency range B and the carrier frequency range C is transmitted as part of a payload of the PBCH.

*15. A method performed by a base station in a communication system, the method comprising:*

*identifying a demodulation reference signal (DMRS) sequence associated with a pseudo-noise (PN) sequence,*

*wherein an initial value c_B of the PN sequence is defined based on*

$$c_B=2^{11}*(I_t+1)*(\lfloor I_ID/4\rfloor+1)+2^{6}*(I_t+1)+\mathrm{mod}(I_ID,4),$$

*where I_ID is a physical cell identification (ID) and I_t is timing information defined based on at least one of a system frame number (SFN) or a synchronization signal block (SSB) index, and*

*wherein the DMRS sequence is for a physical broadcast channel (PBCH);*

*identifying resources for transmitting the DMRS sequence; and*

*transmitting, to a terminal, the DMRS sequence on the resources.*

*16. The method of claim 15, wherein the DMRS sequence is identified among a plurality of candidate DMRS sequences based on a number of SSB indices.*

*17. The method of claim 15, wherein the timing information is defined based on two bits of the SSB index and one bit of a half frame index in case that a number of SSB indices is 4.*

*18. The method of claim 15, wherein the timing information is defined based on three bits of the SSB index in case that a number of the SSB indices is 8.*

*19. The method of claim 15, wherein the timing information is defined based on three least significant bits (LSBs) of SSB index in case that a number of the SSB indices is 64.*

*20. The method of claim 15,*

*wherein I_t=I_SSB in case that a number of SSB indices is 8 or 64, and*

*wherein I_SSB is three least significant bits (LSBs) of the SSB index in case that the number of SSB indices is 8, and the I_SSB is three LSBs of the SSB index in case that the number of the SSB indices is 64.*

*21. The method of claim 15, wherein the I t=4* I HF+I SSB in case that a number of SSB indices is 4, and*

*wherein I_HF is a half frame index and I_SSB is two least significant bits (LSBs) of the SSB index in case that the number of SSB indices is 4.*

*22. The method of claim 15, wherein the timing information includes two bits of the SSB index and one bit of a half frame index.*

*23. A method performed by a terminal in a communication system, the method comprising:*

*identifying resources for receiving a demodulation reference signal (DMRS) sequence, associated with a pseudo-noise (PN) sequence, wherein the DMRS sequence is for a physical broadcast channel (PBCH); and*

*receiving, from a base station, the DMRS sequence,*

*wherein an initial value c_B of the PN sequence is defined based on*

$$c_B=2^{11}*(I_t+1)*(\lfloor I_ID/4\rfloor+1)+2^{6}*(I_t+1)+\mathrm{mod}(I_ID,4),$$

*where I_ID is a physical cell identification (ID) and I_t is timing information defined based on at least one of a system frame number (SFN) or a synchronization signal block (SSB) index.*

*24. The method of claim 23, wherein the DMRS sequence is identified among a plurality of candidate DMRS sequences based on a number of SSB indices.*

*25. The method of claim 23, wherein the timing information is defined based on two bits of the SSB index and one bit of a half frame index in case that a number of SSB indices is 4.*

*26. The method of claim 23, wherein the timing information is defined based on three bits of the SSB index in case that a number of the SSB indices is 8.*

*27. The method of claim 23, wherein the timing information is defined based on three least significant bits (LSBs) of SSB index in case that a number of the SSB indices is 64.*

*28. The method of claim 23,*

*wherein I_t=I_SSB in case that a number of SSB indices is 8 or 64, and*

*wherein I_SSB is three least significant bits (LSBs) of the SSB index in case that the number of SSB indices is 8, and the I_SSB is three LSBs of the SSB index in case that the number of the SSB indices is 64.*

29. The method of claim 23, wherein the I_t=4*I_HF+I_SSB in case that a number of SSB indices is 4, and wherein I_HF is a half frame index and I_SSB is two least significant bits (LSBs) of the SSB index in case that the number of SSB indices is 4.

30. The method of claim 23, wherein the timing information includes two bits of the SSB index and one bit of a half frame index.

31. A base station in a communication system, the base station comprising:

a transceiver; and a controller coupled with the transceiver and configured to:

identify a demodulation reference signal (DMRS) sequence associated with a pseudo-noise (PN) sequence, wherein an initial value c_B of the PN sequence is defined based on $$c_B=2^{11}*(I_t+1)*(\lfloor I_ID/4\rfloor+1)+2^{6}*(I_t+1)+mod(I_ID,4),$$

where I_ID is a physical cell identification (ID) and I_t is timing information defined based on at least one of a system frame number (SFN) or a synchronization signal block (SSB) index, and wherein the DMRS sequence is for a physical broadcast channel (PBCH), identify resources for transmitting the DMRS sequence, and transmit, to a terminal, the DMRS sequence on the resources.

32. The base station of claim 31, wherein the DMRS sequence is identified among a plurality of candidate DMRS sequences based on a number of SSB indices.

33. The base station of claim 31, wherein the timing information is defined based on two bits of the SSB index and one bit of a half frame index in case that a number of SSB indices is 4.

34. The base station of claim 31, wherein the timing information is defined based on three bits of the SSB index in case that a number of the SSB indices is 8.

35. The base station of claim 31, wherein the timing information is defined based on three least significant bits (LSBs) of SSB index in case that a number of the SSB indices is 64.

36. The base station of claim 31, wherein I_t=I_SSB in case that a number of SSB indices is 8 or 64, and wherein I_SSB is three least significant bits (LSBs) least significant bits (LSBs) of the SSB index in case that the number of SSB indices is 8, and the I_SSB is three LSBs of the SSB index in case that the number of the SSB indices is 64.

37. The base station of claim 31, wherein the I_t=4*I_HF+I_SSB in case that a number of SSB indices is 4, and wherein I_HF is a half frame index and I_SSB is two least significant bits (LSBs) of the SSB index in case that the number of SSB indices is 4.

38. The base station of claim 31, wherein the timing information includes two bits of the SSB index and one bit of a half frame index.

39. A terminal in a communication system, the terminal comprising:

a transceiver; and a controller coupled with the transceiver and configured to:

identify resources for receiving a demodulation reference signal (DMRS) sequence associated with a pseudo-noise (PN) sequence, wherein the DMRS sequence is for a physical broadcast channel (PBCH), and receive, from a base station, the DMRS sequence, wherein an initial value c_B of the PN sequence is defined based on $$c_B=2^{11}*(I_t+1)*(\lfloor I_ID/4\rfloor+1)+2^{6}*(I_t+1)+mod(I_ID,4),$$

where I_ID is a physical cell identification (ID) and I_t is timing information defined based on at least one of a system frame number (SFN) or a synchronization signal block (SSB) index.

40. The terminal of claim 39, wherein the DMRS sequence is identified among a plurality of candidate DMRS sequences based on a number of SSB indices.

41. The terminal of claim 39, wherein the timing information is defined based on two bits of the SSB index and one bit of a half frame index in case that a number of SSB indices is 4.

42. The terminal of claim 39, wherein the timing information is defined based on three bits of the SSB index in case that a number of the SSB indices is 8.

43. The terminal of claim 39, wherein the timing information is defined based on three least significant bits (LSBs) of SSB index in case that a number of the SSB indices is 64.

44. The terminal of claim 39, wherein I_t=I_SSB in case that a number of SSB indices is 8 or 64, and wherein I_SSB is three least significant bits (LSBs) of the SSB index in case that the number of SSB indices is 8, and the I_SSB is three LSBs of the SSB index in case that the number of the SSB indices is 64.

45. The terminal of claim 39, wherein the I t=4*I HF+I SSB in case that a number of SSB indices is 4, and wherein I_HF is a half frame index and I_SSB is two least significant bits (LSBs) of the SSB index in case that the number of SSB indices is 4.

46. The terminal of claim 39, wherein the timing information includes two bits of the SSB index and one bit of a half frame index.

* * * * *